US012664643B2

(12) United States Patent
Sakamoto

(10) Patent No.: US 12,664,643 B2
(45) Date of Patent: *Jun. 23, 2026

(54) INSPECTION STATE NOTIFICATION METHOD, INSPECTION STATE NOTIFICATION SYSTEM, AND RECORDING MEDIUM

(71) Applicant: Evident CORPORATION, Nagano (JP)

(72) Inventor: Yohei Sakamoto, Hachioji (JP)

(73) Assignee: Evident Corporation, Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/894,992

(22) Filed: Sep. 24, 2024

(65) Prior Publication Data

US 2025/0014173 A1     Jan. 9, 2025

Related U.S. Application Data

(63) Continuation of application No. 18/107,077, filed on Feb. 8, 2023, now Pat. No. 12,125,194.

(30) Foreign Application Priority Data

Mar. 24, 2022     (JP) ................................. 2022-048909

(51) Int. Cl.
*G06T 7/00* (2017.01)
*G06T 7/246* (2017.01)
(Continued)

(52) U.S. Cl.
CPC .............. *G06T 7/001* (2013.01); *G06T 7/248* (2017.01); *G06T 15/00* (2013.01);
(Continued)

(58) Field of Classification Search
CPC ......... G06T 7/001; G06T 7/248; G06T 15/00; G06T 2207/10016; G06T 2207/10068;
(Continued)

(56) References Cited

U.S. PATENT DOCUMENTS

2015/0300920 A1     10/2015  DeAscanis et al.
2015/0341600 A1     11/2015  Hatcher, Jr et al.
(Continued)

FOREIGN PATENT DOCUMENTS

CN          104718446 A      6/2015
JP          2015534046 A     11/2015
(Continued)

OTHER PUBLICATIONS

Notice of Allowance issued Jun. 24, 2024 received in U.S. Appl. No. 18/107,077.
(Continued)

*Primary Examiner* — Michael E Teitelbaum
(74) *Attorney, Agent, or Firm* — K&L Gates LLP

(57) ABSTRACT

A three-dimensional data generation method includes the following processing. A processor acquires two or more images of a component inside a turbine. The processor detects two or more correspondence regions that are the same regions in at least two images. The processor determines whether at least part of a region of each image is a change region or a non-change region. The processor generates three-dimensional data by using a correspondence region determined to be the change region without using a correspondence region determined to be the non-change region.

19 Claims, 33 Drawing Sheets

(51) Int. Cl.
    *G06T 15/00*      (2011.01)
    *H04N 23/50*     (2023.01)

(52) U.S. Cl.
    CPC ............... *G06T 2207/10016* (2013.01); *G06T 2207/10068* (2013.01); *G06T 2207/30164* (2013.01); *G06T 2207/30244* (2013.01); *H04N 23/555* (2023.01)

(58) Field of Classification Search
    CPC . G06T 2207/30164; G06T 2207/30244; G06T 17/00; H04N 23/555; G01B 11/24; G01B 11/005
    See application file for complete search history.

(56)            References Cited

U.S. PATENT DOCUMENTS

| | | |
|---|---|---|
| 2017/0167289 A1 | 6/2017 | Diwinsky et al. |
| 2022/0082473 A1 | 3/2022 | Oke et al. |

FOREIGN PATENT DOCUMENTS

| | | |
|---|---|---|
| JP | 2020-126432 A | 8/2020 |
| WO | 2014031957 A1 | 2/2014 |

OTHER PUBLICATIONS

Japanese Office Action dated May 27, 2025 received in 2022-048909.

FIG. 21

| NUMBER | NAME |
| --- | --- |
| 1 | STATOR BLADE |
| 2-1 | FIRST ROTOR BLADE |
| 2-2 | SECOND ROTOR BLADE |
| ⋮ | ⋮ |
| 2-x | X-TH ROTOR BLADE |
| 3 | SHROUD |

IMGn

RG20    IMGn

INSPECTION STATE NOTIFICATION METHOD, INSPECTION STATE NOTIFICATION SYSTEM, AND RECORDING MEDIUM

This application is a continuation application of U.S. application Ser. No. 18/107,077 filed on Feb. 8, 2023, which priority is claimed on Japanese Patent Application No. 2022-048909, filed on Mar. 24, 2022, the content of each of which are incorporated herein by reference.

BACKGROUND OF THE INVENTION

Field of the Invention

The present invention relates to a three-dimensional data generation method, a three-dimensional data generation device, and a recording medium for generating three-dimensional data indicating a three-dimensional shape inside a turbine.

Description of Related Art

Industrial endoscope devices have been used for inspection of abnormalities (damage, corrosion, and the like) occurring inside industrial equipment such as boilers, turbines, engines, pipes, and the like. Various subjects are targets for inspection using industrial endoscope devices. Turbines used for aircraft and power generation facilities are especially important subjects in the inspection using industrial endoscope devices.

In general, an industrial endoscope device uses a single-eye optical adaptor and an optical adaptor used for measurement. The single-eye optical adaptor is used for normal observation of a subject. The optical adaptor used for measurement is used for restoring three-dimensional (3D) information of a subject. For example, the optical adaptor used for measurement is a stereo optical adaptor having two visual fields. An industrial endoscope device can measure the size of an abnormality that has been found by using the 3D information. A user can check a shape (unevenness or the like) of the subject restored by using the 3D information. The industrial endoscope device can record proof that an inspection has been performed by restoring a wide range of the structure of the subject that is an inspection target as the 3D information. As described above, the 3D information contributes to improving the quality of the inspection and streamlining the inspection.

In recent years, techniques have been developed that restore a wide range of a structure of a subject as 3D information. For example, techniques have been developed that acquire an image of a subject by using a single-eye optical adaptor and restore 3D information of the subject by using the image. Such a technique executes 3D restoration processing based on a change of relative movement of a distal end portion of an endoscope to the subject and restores the 3D information. In addition, optical adaptors used for measurement that have stereo optical systems including devised optical systems have been developed. Such an optical adaptor used for measurement has an angle of view close to that of a single-eye optical adaptor. By using the optical adaptor used for measurement and by applying the above-described techniques, an industrial endoscope device can restore a wide range of a structure of a subject as 3D information.

Turbines are used for aircraft engines or power generators. Rotor blades of the turbines are major subjects in inspection using an industrial endoscope device. One or more steps, each of which includes rotatable rotor blades and fixed stator blades, are disposed along a rotation axis inside a turbine in each of a compressor section and a turbine section. A shroud is disposed outside the rotor blades.

In general, abnormalities on rotor blades are searched for when the rotor blades are rotating in an inspection of the rotor blades. In such an inspection, stator blades or a shroud as well as the rotor blades often come into a visual field of an endoscope. The stator blades and the shroud do not move differently from the rotor blades. In a case in which the stator blades or the shroud along with the rotor blades are seen in an image acquired by using a single-eye optical adaptor or a stereo optical adaptor, an industrial endoscope device may fail to restore 3D information of a subject.

Japanese Unexamined Patent Application, First Publication No. 2020-126432 discloses a technique of restoring 3D information of a subject by using an image in which a moving object and a stationary object are seen in order to resolve the above-described problem. The technique uses an image acquired by a camera installed in a running car so as to restore 3D information of a subject around the car.

SUMMARY OF THE INVENTION

According to a first aspect of the present invention, a three-dimensional data generation method of generating three-dimensional data indicating a three-dimensional shape inside a turbine by using a processor is provided. The method includes acquiring two or more images of a component inside the turbine. The component includes a first object capable of moving inside the turbine and a second object that is stationary inside the turbine. The two or more images are generated by an imaging apparatus including a tubular insertion unit that acquires an optical image inside the turbine. The insertion unit is inserted into the turbine through a hole formed in the turbine. A moving direction of the insertion unit when the insertion unit is inserted into the turbine is different from a moving direction of the first object. A relative position of the first object to the insertion unit is different between timings at which the imaging apparatus generates images while the first object moves. The method includes detecting two or more correspondence regions that are the same regions of the component in at least two images included in the two or more images. The method includes determining whether at least part of a region of each of the two or more images is a change region or a non-change region. The change region is a region of the component of which coordinates in an image generated by the imaging apparatus change. The non-change region is a region of the component of which coordinates in an image generated by the imaging apparatus do not change. The method includes generating the three-dimensional data by using a correspondence region determined to be the change region among the two or more correspondence regions without using a correspondence region determined to be the non-change region among the two or more correspondence regions.

According to a second aspect of the present invention, in the first aspect, after the two or more correspondence regions are detected, determination as to whether the at least part of the region is the change region or the non-change region may be executed.

According to a third aspect of the present invention, in the first aspect, after determination as to whether the at least part of the region is the change region or the non-change region is executed, the two or more correspondence regions may be detected by using the change region without using the non-change region.

According to a fourth aspect of the present invention, in the first aspect, the first object may include a rotor blade. The second object may include a stator blade or a shroud.

According to a fifth aspect of the present invention, in the first aspect, part of the first object may be concealed by the second object in the two or more images.

According to a sixth aspect of the present invention, in the fifth aspect, the second object may include an object that conceals part of the first object in the two or more images. The second object may include an object, part of which is concealed by the first object in the two or more images.

According to a seventh aspect of the present invention, in the first aspect, the imaging apparatus may generate the two or more images at two or more different timings. Determination as to whether the at least part of the region is the change region or the non-change region may be executed based on a moving amount of each of the correspondence regions between at least two images included in the two or more images.

According to an eighth aspect of the present invention, in the first aspect, determination as to whether the at least part of the region is the change region or the non-change region may be executed based on a difference of a pixel value between at least two images included in the two or more images.

According to a ninth aspect of the present invention, in the first aspect, determination as to whether the at least part of the region is the change region or the non-change region may be executed by determining a subject seen in one image included in the two or more images.

According to a tenth aspect of the present invention, in the first aspect, the method may include determining a position of the insertion unit inside the turbine. The method may include executing processing of notifying a user of information indicating a change of the position of the insertion unit when the position has changed.

According to an eleventh aspect of the present invention, in the first aspect, the method may include calculating an area of the non-change region in an image included in the two or more images before generating the three-dimensional data. The method may include executing processing of notifying a user of an alert when the area is larger than a predetermined value.

According to a twelfth aspect of the present invention, in the first aspect, the first object may rotate inside the turbine due to a driving force generated by a driving device. The method may include determining whether the first object has rotated once inside the turbine. The method may include executing processing of notifying a user of information indicating that the first object has rotated once inside the turbine when it is determined that the first object has rotated once inside the turbine.

According to a thirteenth aspect of the present invention, in the first aspect, the first object may rotate inside the turbine due to a driving force generated by a driving device. Detection of the two or more correspondence regions, determination as to whether the at least part of the region is the change region or the non-change region, and generation of the three-dimensional data may be repeatedly executed while the first object rotates. The generation of the three-dimensional data may be stopped and the detection of the two or more correspondence regions and the determination as to whether the at least part of the region is the change region or the non-change region may be continued when the rotation of the first object has been stopped.

According to a fourteenth aspect of the present invention, in the thirteenth aspect, the generation of the three-dimensional data may be restarted when the first object starts to rotate again.

According to a fifteenth aspect of the present invention, in the thirteenth aspect, the method may include determining a rotation state of the first object by using an image included in the two or more images.

According to a sixteenth aspect of the present invention, in the thirteenth aspect, the method may include determining a rotation state of the first object by monitoring a state of the driving device.

According to a seventeenth aspect of the present invention, in the first aspect, the insertion unit may be fixed inside the turbine.

According to an eighteenth aspect of the present invention, in the first aspect, the imaging apparatus may be a borescope.

According to a nineteenth aspect of the present invention, a three-dimensional data generation system that generates three-dimensional data indicating a three-dimensional shape inside a turbine is provided. The three-dimensional data generation system includes an imaging apparatus including a tubular insertion unit that acquires an optical image inside the turbine. The imaging apparatus is configured to generate two or more images of a component inside the turbine. The component includes a first object capable of moving inside the turbine and a second object that is stationary inside the turbine. The insertion unit is inserted into the turbine through a hole formed in the turbine. A moving direction of the insertion unit when the insertion unit is inserted into the turbine is different from a moving direction of the first object. A relative position of the first object to the insertion unit is different between timings at which the imaging apparatus generates images while the first object moves. The three-dimensional data generation system includes a three-dimensional data generation device including a processor. The processor is configured to acquire the two or more images. The processor is configured to detect two or more correspondence regions that are the same regions of the component in at least two images included in the two or more images. The processor is configured to determine whether at least part of a region of each of the two or more images is a change region or a non-change region. The change region is a region of the component of which coordinates in an image generated by the imaging apparatus change. The non-change region is a region of the component of which coordinates in an image generated by the imaging apparatus do not change. The processor is configured to generate the three-dimensional data by using a correspondence region determined to be the change region among the two or more correspondence regions without using a correspondence region determined to be the non-change region among the two or more correspondence regions.

According to a twentieth aspect of the present invention, in the nineteenth aspect, the imaging apparatus and the three-dimensional data generation device may be included in an endoscope device.

According to a twenty-first aspect of the present invention, in the nineteenth aspect, the imaging apparatus may be included in an endoscope device. The three-dimensional data generation device may be included in an external device other than the endoscope device.

According to a twenty-second aspect of the present invention, a non-transitory computer-readable recording medium stores a program causing a computer to execute processing of generating three-dimensional data indicating a three-dimensional shape inside a turbine. The processing includes acquiring two or more images of a component inside the turbine. The component includes a first object capable of moving inside the turbine and a second object that is stationary inside the turbine. The two or more images are generated by an imaging apparatus including a tubular insertion unit that acquires an optical image inside the turbine. The insertion unit is inserted into the turbine through a hole formed in the turbine. A moving direction of the insertion unit when the insertion unit is inserted into the turbine is different from a moving direction of the first object. A relative position of the first object to the insertion unit is different between timings at which the imaging apparatus generates images while the first object moves. The processing includes detecting two or more correspondence regions that are the same regions of the component in at least two images included in the two or more images. The processing includes determining whether at least part of a region of each of the two or more images is a change region or a non-change region. The change region is a region of the component of which coordinates in an image generated by the imaging apparatus change. The non-change region is a region of the component of which coordinates in an image generated by the imaging apparatus do not change. The processing includes generating the three-dimensional data by using a correspondence region determined to be the change region among the two or more correspondence regions without using a correspondence region determined to be the non-change region among the two or more correspondence regions.

BRIEF DESCRIPTION OF THE DRAWINGS

FIG. 21 is a diagram showing an example of object information in the second modified example of the first embodiment of the present invention.

FIG. 38 is a diagram showing a stereo image generated in the fourth embodiment of the present invention.

DETAILED DESCRIPTION OF THE INVENTION

Hereinafter, embodiments of the present invention will be described with reference to the drawings.

First Embodiment

A first embodiment of the present invention will be described. Hereinafter, an example in which a three-dimensional (3D) data generation device is included in an endoscope device will be described.

Figure 1:
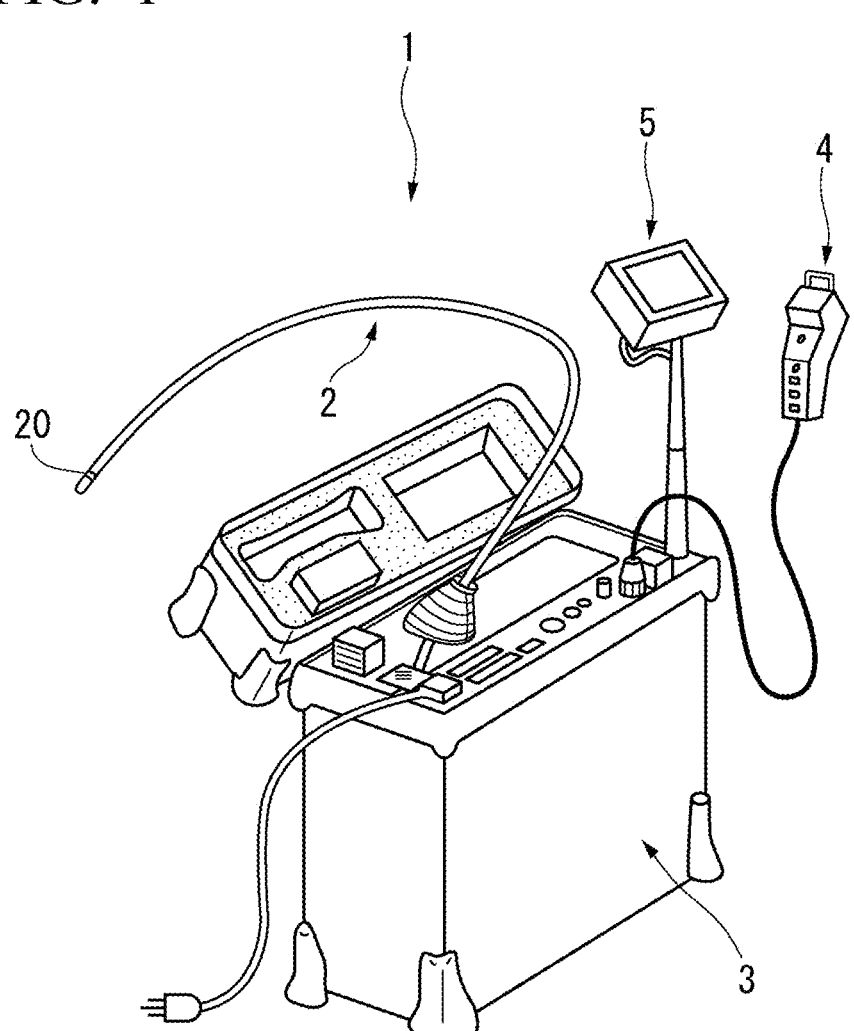
FIG. 1 is a perspective view showing an entire configuration of an endoscope device according to a first embodiment of the present invention.
Figure 2:
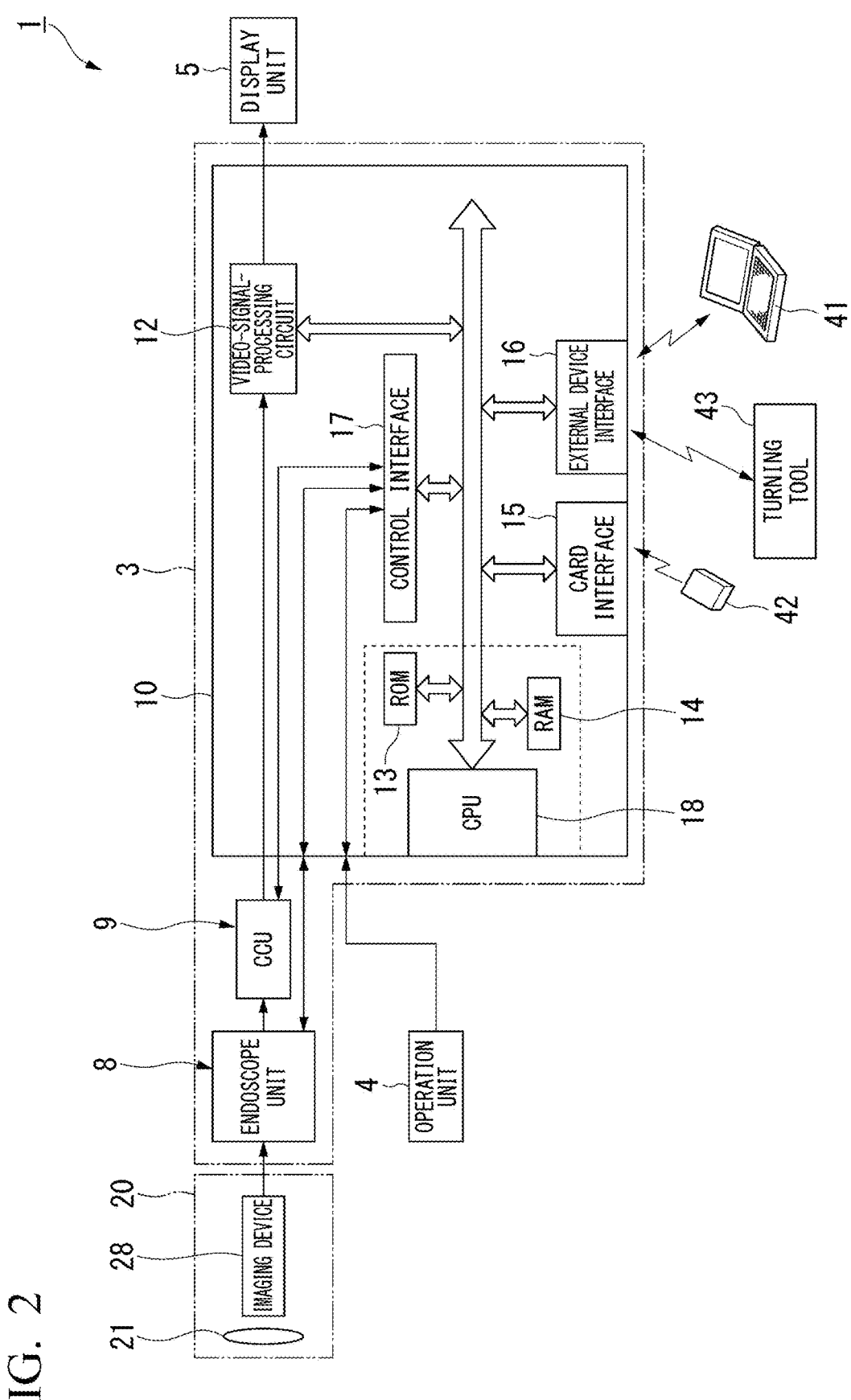
FIG. 2 is a block diagram showing an internal configuration of the endoscope device according to the first embodiment of the present invention.

A configuration of an endoscope device 1 in the first embodiment will be described by using FIG. 1 and FIG. 2. FIG. 1 shows an external appearance of the endoscope device 1. FIG. 2 shows an internal configuration of the endoscope device 1.

The endoscope device 1 shown in FIG. 1 includes an insertion unit 2, a main body unit 3, an operation unit 4, and a display unit 5. The endoscope device 1 images a subject and generates an image. The subject is an industrial product. In order to observe various subjects, a user can replace an optical adaptor mounted at a distal end 20 of the insertion unit 2, select a built-in video-processing program, and add a video-processing program.

The insertion unit 2 is inserted inside a subject. The insertion unit 2 has a long and thin bendable tube shape from the distal end 20 to a base end portion. The insertion unit 2 images a subject and outputs an imaging signal to the main body unit 3. An optical adapter is mounted on the distal end 20 of the insertion unit 2. For example, a single-eye optical adapter is mounted on the distal end 20. The main body unit 3 is a control device including a housing unit that houses the insertion unit 2. The operation unit 4 accepts an operation for the endoscope device 1 from a user. The display unit 5 includes a display screen and displays an image of a subject acquired by the insertion unit 2, an operation menu, and the like on the display screen.

The operation unit 4 is a user interface. The display unit 5 is a monitor (display) such as a liquid crystal display (LCD). The display unit 5 may be a touch panel. In such a case, the operation unit 4 and the display unit 5 are integrated.

The main body unit 3 shown in FIG. 2 includes an endoscope unit 8, a camera control unit (CCU) 9, and a control device 10.

The endoscope unit 8 includes a light source device and a bending device not shown in the drawing. The light source device provides the distal end 20 with illumination light that is necessary for observation. The bending device bends a bending mechanism that is built in the insertion unit 2.

A lens 21 and an imaging device 28 are built in the distal end 20 of the insertion unit 2. The lens 21 is an observation optical system. The lens 21 captures an optical image of a subject formed by an optical adaptor. The imaging device 28 is an image sensor. The imaging device 28 photo-electrically converts the optical image of the subject and generates an imaging signal. The lens 21 and the imaging device 28 constitute a single-eye camera having a single viewpoint.

The CCU 9 drives the imaging device 28. An imaging signal output from the imaging device 28 is input into the CCU 9. The CCU 9 performs pre-processing including amplification, noise elimination, and the like on the imaging signal acquired by the imaging device 28. The CCU 9 converts the imaging signal on which the pre-processing has been executed into a video signal such as an NTSC signal.

The control device 10 includes a video-signal-processing circuit 12, a read-only memory (ROM) 13, a random-access memory (RAM) 14, a card interface 15, an external device interface 16, a control interface 17, and a central processing unit (CPU) 18.

The video-signal-processing circuit 12 performs predetermined video processing on the video signal output from the CCU 9. For example, the video-signal-processing circuit 12 performs video processing related to improvement of visibility. For example, the video processing is color reproduction, gray scale correction, noise suppression, contour enhancement, and the like. For example, the video-signal-processing circuit 12 combines the video signal output from the CCU 9 and a graphic image signal generated by the CPU 18. The graphic image signal includes an image of the operation screen and the like. The video-signal-processing circuit 12 outputs a combined video signal to the display unit 5.

The ROM 13 is a nonvolatile recording medium on which a program for the CPU 18 to control the operation of the endoscope device 1 is recorded. The RAM 14 is a volatile recording medium that temporarily stores information used by the CPU 18 for controlling the endoscope device 1. The CPU 18 controls the operation of the endoscope device 1 based on the program recorded on the ROM 13.

A memory card 42 is connected to the card interface 15. The memory card 42 is a recording medium that is attachable to and detachable from the endoscope device 1. The card interface 15 inputs control-processing information, image information, and the like stored on the memory card 42 into the control device 10. In addition, the card interface 15 records the control-processing information, the image information, and the like generated by the endoscope device 1 on the memory card 42.

An external device such as a USB device is connected to the external device interface 16. For example, a personal computer (PC) 41 is connected to the external device interface 16. The external device interface 16 transmits information to the PC 41 and receives information from the PC 41. By doing this, the PC 41 can display information. In addition, by inputting an instruction into the PC 41, a user can perform an operation related to control of the endoscope device 1.

A turning tool 43 may be used in order to rotate rotor blades inside a turbine. The turning tool 43 is a driving device that generates a driving force to rotate the rotor blades. The rotor blades rotate in response to the driving force generated by the turning tool 43. The turning tool 43 is connected to the external device interface 16. The external device interface 16 outputs control information used for controlling the turning tool 43 to the turning tool 43. In addition, the external device interface 16 inputs state information indicating the state of the turning tool 43 into the control device 10.

The control interface 17 performs communication with the operation unit 4, the endoscope unit 8, and the CCU 9 for operation control. The control interface 17 notifies the CPU 18 of information input into the operation unit 4 by the user. The control interface 17 outputs control signals used for controlling the light source device and the bending device to the endoscope unit 8. The control interface 17 outputs a control signal used for controlling the imaging device 28 to the CCU 9.

A program executed by the CPU 18 may be recorded on a computer-readable recording medium. The program recorded on this recording medium may be read and executed by a computer other than the endoscope device 1. For example, the program may be read and executed by the PC 41. The PC 41 may control the endoscope device 1 by transmitting control information used for controlling the endoscope device 1 to the endoscope device 1 in accordance with the program. Alternatively, the PC 41 may acquire a video signal from the endoscope device 1 and may process the acquired video signal.

As described above, the endoscope device 1 includes the imaging device 28 and the CPU 18. The imaging device 28 images a subject and generates an imaging signal. The imaging signal includes an image of the subject. Accordingly, the imaging device 28 acquires the image of the subject generated by imaging the subject. The image is a two-dimensional image (2D image). The image acquired by the imaging device 28 is input into the CPU 18 via the video-signal-processing circuit 12.

The insertion unit 2 constitutes an imaging apparatus (camera). The imaging device 28 may be disposed in the main body unit 3, and an optical fiber may be disposed in the insertion unit 2. Light incident on the lens 21 may reach the imaging device 28 via the optical fiber. A borescope may be used as a camera.

Turbines are used for aircraft engines or power generators. There are gas turbines, steam turbines, or the like. Hereinafter, a structure of a gas turbine will be described. Hereinafter, the gas turbine will be called a turbine.

A turbine includes a compressor section, a combustion chamber, and a turbine section. Air is compressed in the compressor section. The compressed air is sent to the combustion chamber. Fuel continuously burns in the combustion chamber, and gas of high pressure and high temperature is generated. The gas expands in the turbine section and generates energy. A compressor rotates by using the energy, and the rest of the energy is extracted. In the compressor section and the turbine section, a rotor blade fixed to a rotation axis of an engine and a stator blade fixed to a casing are alternately disposed.

The turbine includes a component disposed in a space inside the turbine. The component is a moving object capable of moving inside the turbine or is a stationary object that stands still inside the turbine. The moving object is a rotor blade. The stationary object is a stator blade or a shroud.

Figure 3:
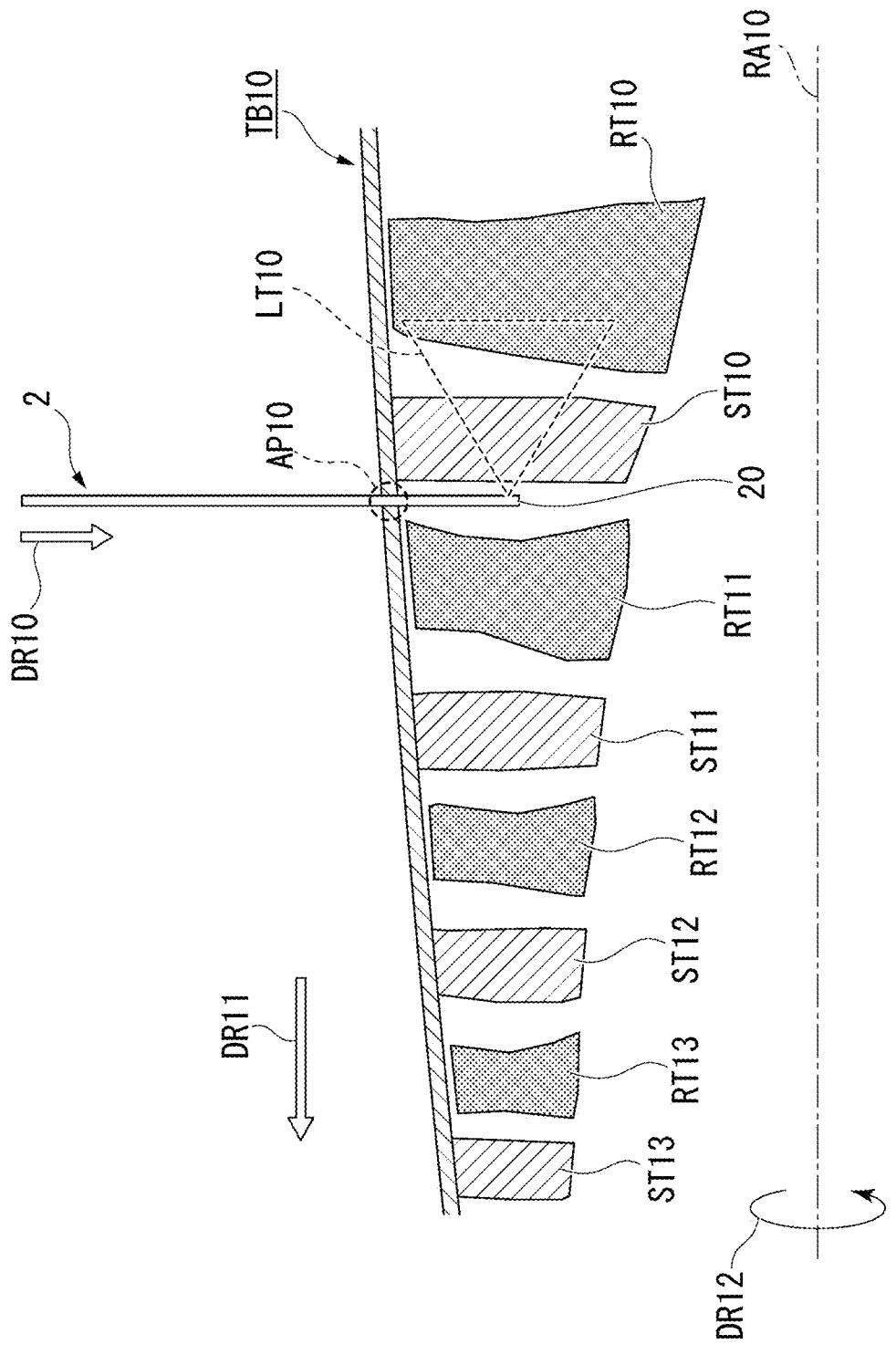
FIG. 3 is a diagram schematically showing the disposition of rotor blades and stator blades inside a turbine in the first embodiment of the present invention.

FIG. 3 schematically shows the disposition of rotor blades and stator blades in a compressor section of a turbine TB10. FIG. 3 shows part of a cross-section of the turbine TB10 passing through a rotation axis RA10 of an engine. The turbine TB10 includes a rotor blade RT10, a stator blade ST10, a rotor blade RT11, a stator blade ST11, a rotor blade RT12, a stator blade ST12, a rotor blade RT13, and a stator blade ST13 in the compressor section. These rotor blades rotate in a direction DR12 around the rotation axis RA10.

Air introduced into the turbine TB10 flows in a direction DR11. The rotor blade RT10 is disposed in a low-pressure section that introduces air. The rotor blade RT13 is disposed in a high-pressure section that expels air.

An access port AP10 is formed that enables an internal inspection of the turbine TB10 without disassembling the turbine TB10. The turbine TB10 includes two or more access ports, and one of the two or more access ports is shown as the access port AP10 in FIG. 3. The access port AP10 is a hole formed in the turbine TB10.

The insertion unit 2 constitutes an endoscope. The insertion unit 2 is inserted into the turbine TB10 through the access port AP10. When the insertion unit 2 is inserted into the turbine TB10, the insertion unit 2 moves in a direction DR10. When the insertion unit 2 is pulled out of the turbine TB10, the insertion unit 2 moves in an opposite direction to the direction DR10. The direction DR10 is different from the direction DR12. Illumination light LT10 is emitted from the distal end 20 of the insertion unit 2.

Figure 4:
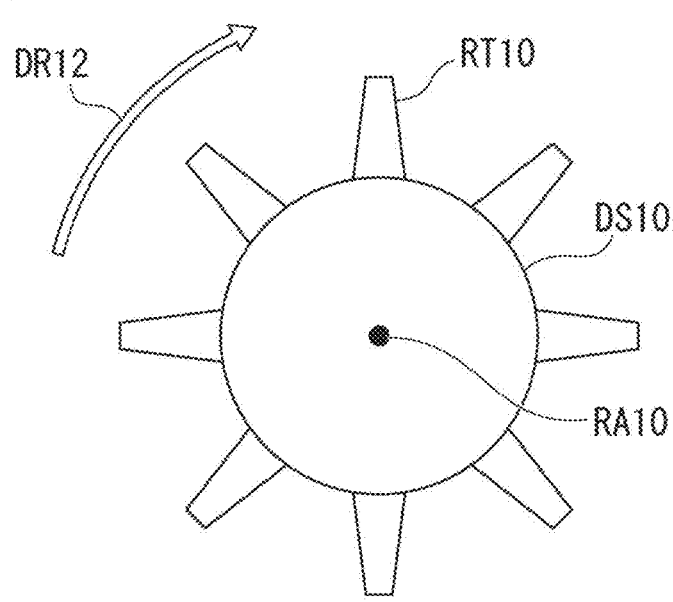
FIG. 4 is a diagram schematically showing the disposition of the rotor blades inside the turbine in the first embodiment of the present invention.

FIG. 4 schematically shows the disposition of two or more rotor blades RT10 seen from a parallel direction to a rotation axis RA10. In FIG. 4, eight rotor blades RT10 are disposed in a disk DS10. The rotation axis RA10 passes through the center of the disk DS10. The disk DS10 rotates in a direction DR12. Therefore, the eight rotor blades RT10 rotate in the direction DR12.

Several tens of rotor blades or more than 100 rotor blades are actually disposed in one disk. The number of rotor blades in one disk depends on the type of engine and also depends on the position of the disk in a region ranging from a low-pressure section to a high-pressure section.

A user manually rotates a disk, or the turning tool 43 rotates the disk. The insertion unit 2 is inserted into the turbine TB10 through the access port AP10, and the distal end 20 is fixed. When the disk is rotating, the user performs an inspection of two or more rotor blades and determines whether there is an abnormality in each rotor blade. This inspection is one of major inspection items in an inspection of a turbine.

Figure 5:
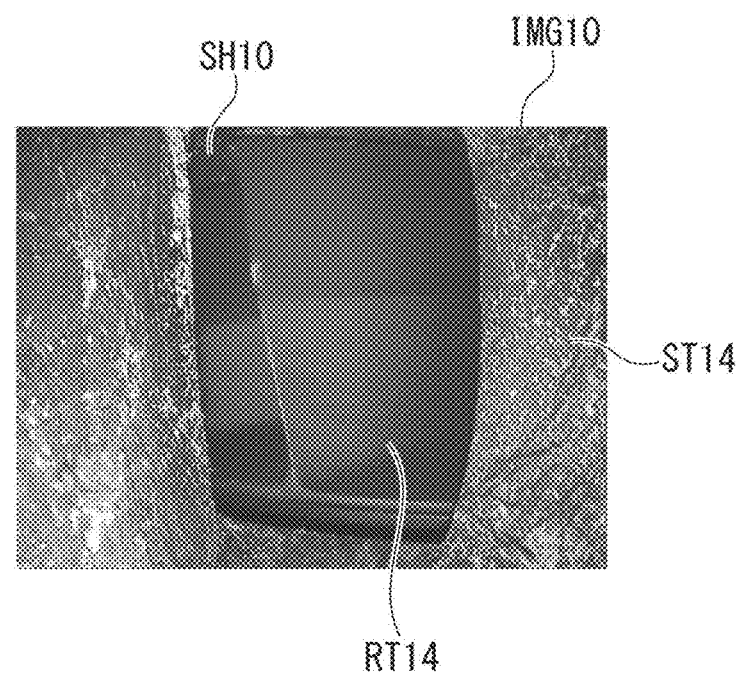
FIG. 5 is a diagram showing an example of an image acquired by the endoscope device according to the first embodiment of the present invention.

FIG. 5 shows an example of an image acquired by the endoscope device 1. An image IMG10 shown in FIG. 5 is an image of a compressor section on a high-pressure side. A rotor blade RT14, a stator blade ST14, and a shroud SH10 are seen in the image IMG10.

When a subject is seen from the distal end 20 of the insertion unit 2, the stator blade ST14 is disposed in front of the rotor blade RT14 and the shroud SH10 is disposed at the rear of the rotor blade RT14. The distance between the distal end 20 and the stator blade ST14 is less than that between the distal end 20 and the rotor blade RT14. The distance between the distal end 20 and the shroud SH10 in a region in which the rotor blade RT14 conceals the shroud SH10 is greater than that between the distal end 20 and the rotor blade RT14. The stator blade ST14 conceals part of the rotor blade RT14.

The imaging device 28 generates two or more images. Each of the two or more images is temporally associated with the other images included in the two or more images. For example, each of the two or more images is a still image. A video may be used instead of the still image. Two or more frames included in the video are associated with each other by timestamps (timecodes).

The RAM 14 stores the two or more images generated by the imaging device 28. When the disk is rotating, a relative position of a rotor blade to the distal end 20 (viewpoint) of the insertion unit 2 is different between the two or more images. Alternatively, a relative position and posture of a rotor blade to the distal end 20 are different between the two or more images. In other words, the position of the rotor blade is different between timings at which the imaging device 28 generates images. Therefore, the position (two-dimensional coordinates) of the rotor blade in an image generated by the imaging device 28 changes. When the disk stands still, the position (two-dimensional coordinates) of the rotor blade in an image generated by the imaging device 28 does not change.

In addition, the RAM 14 stores necessary parameters for 3D restoration processing. The parameters include an internal parameter of a camera, a distortion correction parameter of the camera, a setting value, scale information, and the like. The setting value is used for various kinds of processing of generating three-dimensional data (3D data) indicating a three-dimensional shape (3D shape) of a subject. The scale information is used for converting the scale of the 3D data into an actual scale of the subject.

The memory card 42 may store the two or more images and the above-described parameters. The endoscope device 1 may read the two or more images and the parameters from the memory card 42 and may store the two or more images and the parameters on the RAM 14.

The endoscope device 1 may perform wireless or wired communication with an external device via the external device interface 16. The external device is the PC 41, a cloud server, or the like. The endoscope device 1 may transmit the two or more images generated by the imaging device 28 to the external device. The external device may store the two or more images and the above-described parameters. The endoscope device 1 may receive the two or more images and the parameters and store the two or more images and the parameters on the RAM 14.

Figure 6:
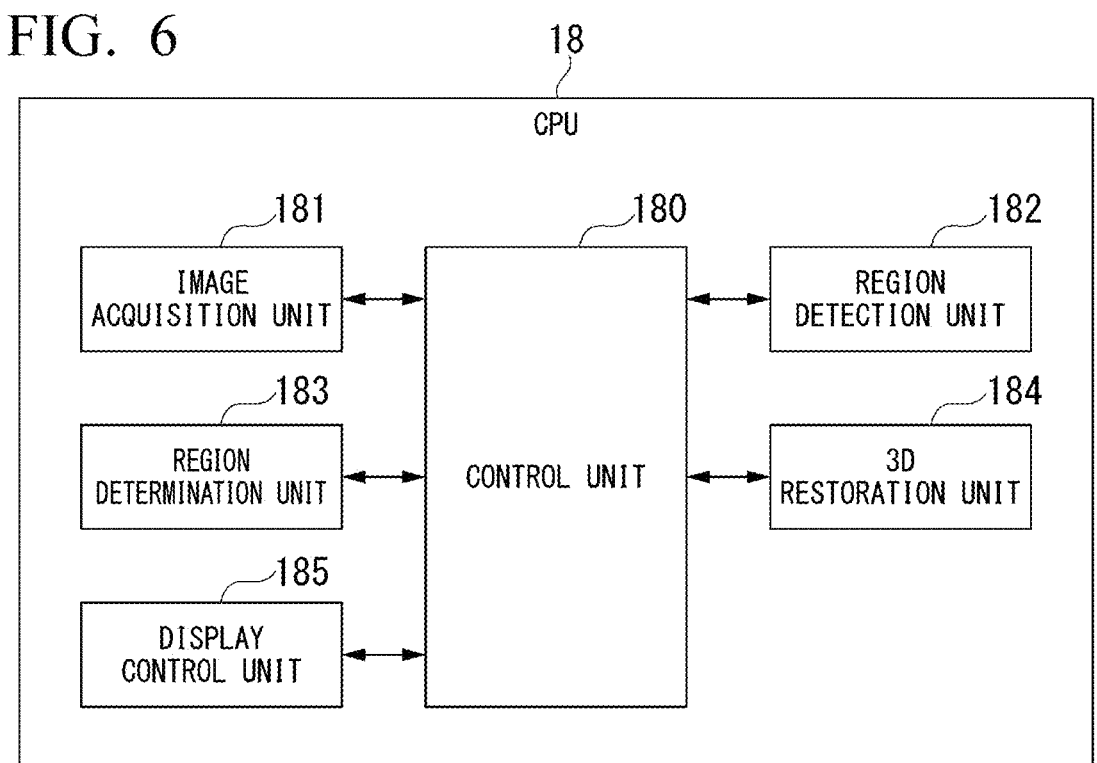
FIG. 6 is a block diagram showing a functional configuration of a CPU included in the endoscope device according to the first embodiment of the present invention.

FIG. 6 shows a functional configuration of the CPU 18. The CPU 18 functions as a control unit 180, an image acquisition unit 181, a region detection unit 182, a region determination unit 183, a 3D restoration unit 184, and a display control unit 185. At least one of the blocks shown in FIG. 6 may be constituted by a different circuit from the CPU 18.

The control unit 180 controls processing executed by each unit shown in FIG. 6.

The image acquisition unit 181 acquires the two or more images and the above-described parameters from the RAM 14. The image acquisition unit 181 may acquire the two or more images and the above-described parameters from the memory card 42 or the external device through the external device interface 16.

The region detection unit 182 detects two or more feature regions in each of the two or more images. In addition, the region detection unit 182 detects the same feature regions (correspondence regions) in the two or more images. A correspondence region is a region of a component included in a turbine.

For example, in a case in which a first feature region in a first image and a second feature region in a second image are the same, the region detection unit 182 associates the first feature region and the second feature region with each other as a correspondence region. In a case in which the second feature region is the same as a third feature region in a third image, the region detection unit 182 associates the second feature region and the third feature region with each other as a correspondence region. In this case, the region detection unit 182 detects the same correspondence region between three images.

The region determination unit 183 determines whether a feature region in each of the two or more images is a moving region or a stationary region. By doing this, the region determination unit 183 classifies the feature region into the moving region or the stationary region. The region determination unit 183 may determine whether each of feature regions included in only part of each image is the moving region or the stationary region. The region determination unit 183 may determine whether each of feature regions included in the entire image is the moving region or the stationary region. Each image may include the moving region and the stationary region. Alternatively, each image may include only the moving region or only the stationary region.

The 3D restoration unit 184 executes the 3D restoration processing by using correspondence regions determined to be moving regions among feature regions of the two or more images and generates 3D data. At this time, the 3D restoration unit 184 does not use correspondence regions determined to be stationary regions among the feature regions of the two or more images.

The 3D data include three-dimensional coordinates (3D coordinates) of two or more regions of a subject and also include camera coordinate and posture information. The camera coordinate indicates 3D coordinates of a camera that has acquired each of two or more images and is associated with each of the two or more images. The camera coordinate indicates 3D coordinates of a viewpoint when each image is acquired. For example, the camera coordinate indicates 3D coordinates of an observation optical system included in the camera. The posture information indicates a posture of the camera that has acquired each of the two or more images and is associated with each of the two or more images. For example, the posture information indicates a posture of the observation optical system included in the camera.

The display control unit 185 controls processing executed by the video-signal-processing circuit 12. The CCU 9 outputs a video signal. The video signal includes color data of each pixel of an image acquired by the imaging device 28. The display control unit 185 causes the video-signal-processing circuit 12 to output the video signal output from the CCU 9 to the display unit 5. The video-signal-processing circuit 12 outputs the video signal to the display unit 5. The display unit 5 displays an image based on the video signal output from the video-signal-processing circuit 12. By doing this, the display control unit 185 displays the image acquired by the imaging device 28 on the display unit 5.

The display control unit 185 displays various kinds of information on the display unit 5. In other words, the display control unit 185 displays various kinds of information on an image.

For example, the display control unit 185 generates a graphic image signal of the various kinds of information. The display control unit 185 outputs the generated graphic image signal to the video-signal-processing circuit 12. The video-signal-processing circuit 12 combines the video signal output from the CCU 9 and the graphic image signal output from the CPU 18. Due to this, the various kinds of information are superimposed on an image. The video-signal-processing circuit 12 outputs the combined video signal to the display unit 5. The display unit 5 displays an image on which the various kinds of information are superimposed.

In addition, the display control unit 185 generates a graphic image signal of 3D data. The display control unit 185 outputs the graphic image signal to the video-signal-processing circuit 12. Similar processing to that described above is executed, and the display unit 5 displays an image of the 3D data. By doing this, the display control unit 185 displays the image of the 3D data on the display unit 5.

Each unit shown in FIG. 6 may be constituted by at least one of a processor and a logic circuit. For example, the processor is at least one of a central processing unit (CPU), a digital signal processor (DSP), and a graphics-processing unit (GPU). For example, the logic circuit is at least one of an application-specific integrated circuit (ASIC) and a field-programmable gate array (FPGA). Each unit shown in FIG. 6 may include one or a plurality of processors. Each unit shown in FIG. 6 may include one or a plurality of logic circuits.

A computer of the endoscope device 1 may read a program and may execute the read program. The program includes commands defining the operations of each unit shown in FIG. 6. In other words, the functions of each unit shown in FIG. 6 may be realized by software.

The program described above, for example, may be provided by using a "computer-readable storage medium" such as a flash memory. The program may be transmitted from the computer storing the program to the endoscope device 1 through a transmission medium or transmission waves in a transmission medium. The "transmission medium" transmitting the program is a medium having a function of transmitting information. The medium having the function of transmitting information includes a network (communication network) such as the Internet and a communication circuit line (communication line) such as a telephone line. The program described above may realize some of the functions described above. In addition, the program described above may be a differential file (differential program). The functions described above may be realized by a combination of a program that has already been recorded in a computer and a differential program.

Hereinafter, distinctive processing of the first embodiment will be described. In the following descriptions, it is assumed that 3D data are generated by using two or more images acquired by endoscope equipment. Inspection equipment that acquires two or more images is not limited to the endoscope equipment. As long as an image of a component inside a turbine is acquired by using equipment including a camera, any equipment may be used.

The control device 10 functions as a 3D data generation device. A 3D data generation device according to each aspect of the present invention may be a computer system such as a PC other than endoscope equipment. The 3D data generation device may be any one of a desktop PC, a laptop PC, and a tablet terminal. The 3D data generation device may be a computer system that operates on a cloud.

Figure 7:
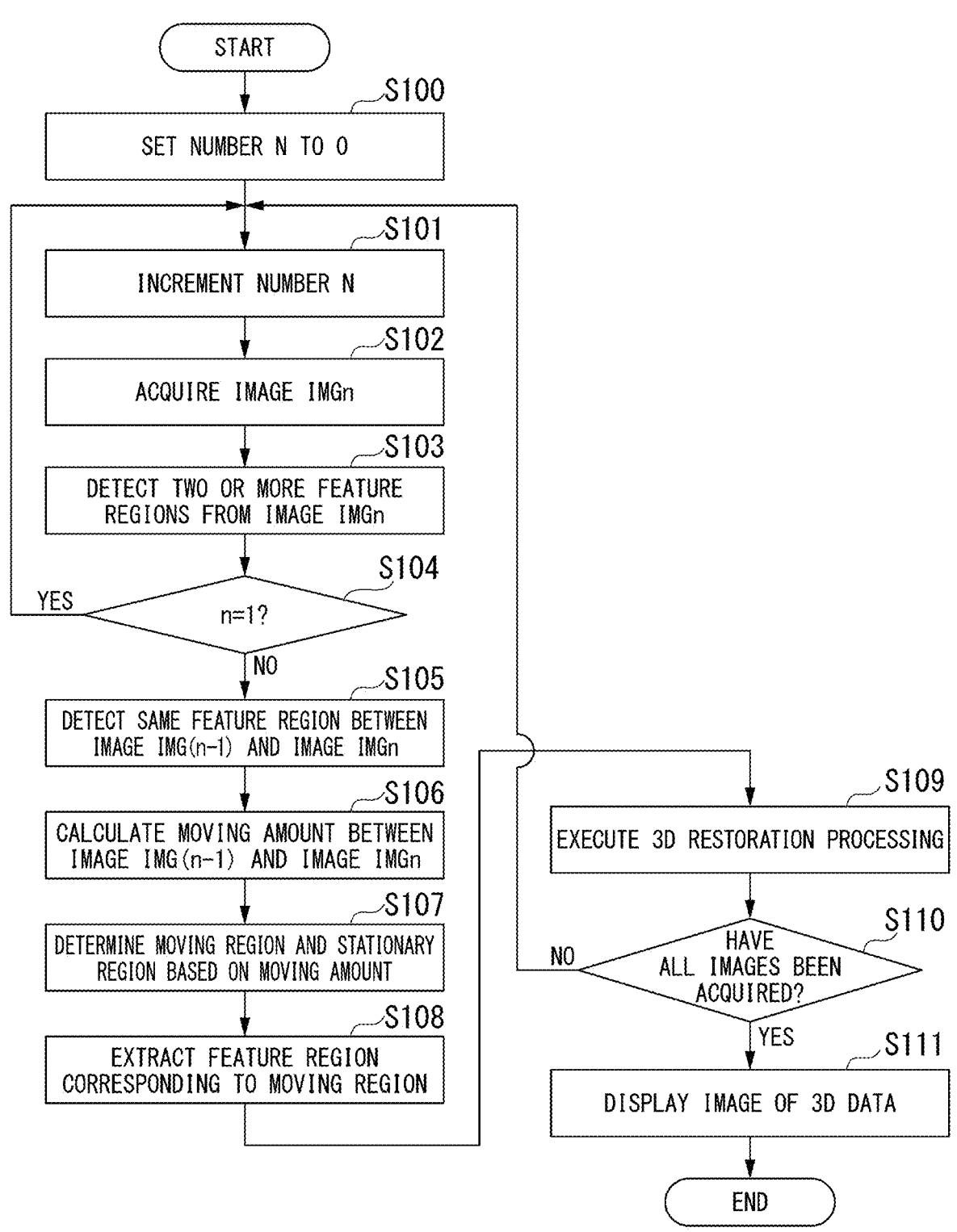
FIG. 7 is a flow chart showing a procedure of three-dimensional (3D) data generation processing in the first embodiment of the present invention.

Processing executed by the endoscope device 1 will be described by using FIG. 7. FIG. 7 shows a procedure of 3D data generation processing executed by the endoscope device 1.

When the processing shown in FIG. 7 is started, the control unit 180 sets a number n used for managing an image acquired from the RAM 14 to 0 (Step S100).

After Step S100, the control unit 180 increases the number n by 1 in order to acquire an image (Step S101). When Step S101 is executed for the first time, the number n is set to 1.

After Step S101, the image acquisition unit 181 acquires an image IMGn indicated by the number n from the RAM 14 (Step S102). When Step S102 is executed for the first time, the image acquisition unit 181 acquires an image IMG1.

After Step S102, the region detection unit 182 analyzes the image IMGn and detects two or more feature regions seen in the image IMGn (Step S103).

The feature region indicates a corner, an edge, or the like in which an image luminance gradient is large among regions seen in an image. The feature region may be constituted by one pixel, which is a minimum unit of an image. Alternatively, the feature region may be constituted by two or more pixels. The region detection unit 182 detects a feature region by using scale-invariant feature transform (SIFT), features from accelerated segment test (FAST), or the like.

Figure 8:
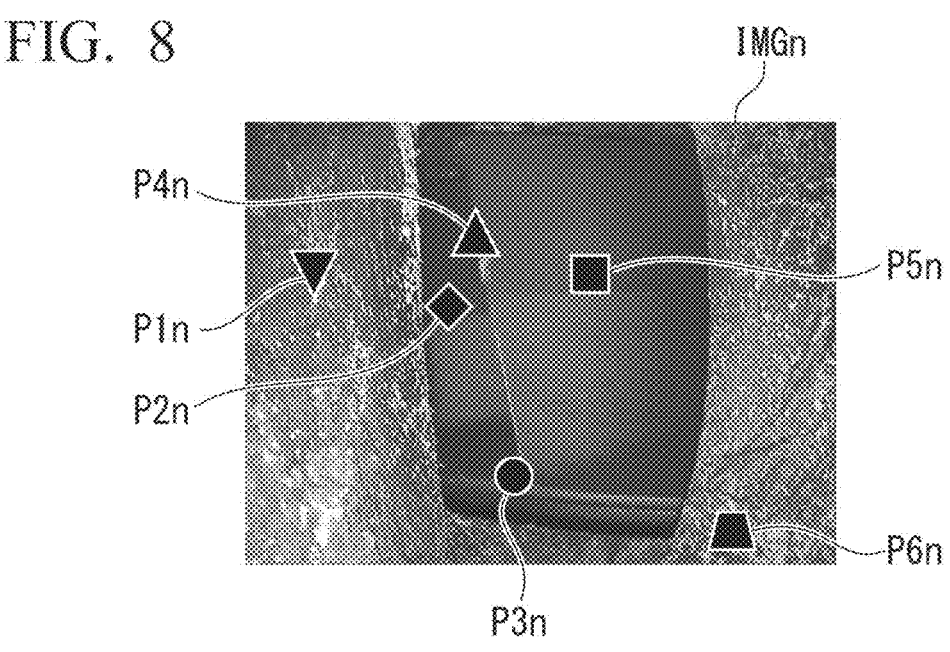
FIG. 8 is a diagram showing an example of a feature region in the first embodiment of the present invention.

FIG. 8 shows an example of a feature region. An image IMGn is shown in FIG. 8. The region detection unit 182 detects feature regions P1n, P2n, P3n, P4n, P5n, and P6n in the image IMGn.

After Step S103, the control unit 180 determines whether the number n is 1 (Step S104).

In the first embodiment, the region determination unit 183 calculates a moving amount of a region of a subject between two images in Step S106 described later. Therefore, two images having at least different photography time points need to be acquired from the RAM 14. When the control unit 180 determines that the number n is 1 in Step S104, Step S101 is executed. When the control unit 180 determines that the number n is not 1 in Step S104, Step S105 described later is executed.

When the number n is two or more, two or more feature regions have already been detected in each of an image IMG(n−1) and the image IMGn. A timing at which the imaging device 28 generates the image IMGn is different from that at which the imaging device 28 generates the image IMG(n−1). The region detection unit 182 detects the same feature regions (correspondence regions) in the image IMG(n−1) and the image IMGn (Step S105).

The region detection unit 182 executes the following processing in Step S105. The region detection unit 182 calculates a correlation degree of a feature region between the image IMG(n−1) and the image IMGn. When the region detection unit 182 has found a feature region having a high correlation degree between the two images, the region detection unit 182 holds information (correspondence information) of the feature region (correspondence region) on the RAM 14. By doing this, the region detection unit 182 associates feature regions of the two images with each other. On the other hand, in a case in which the region detection unit 182 has found no feature region having a high correlation degree between the two images, the region detection unit 182 discards information of the correspondence region between the image IMG(n–1) and the image IMGn.

Figure 9:
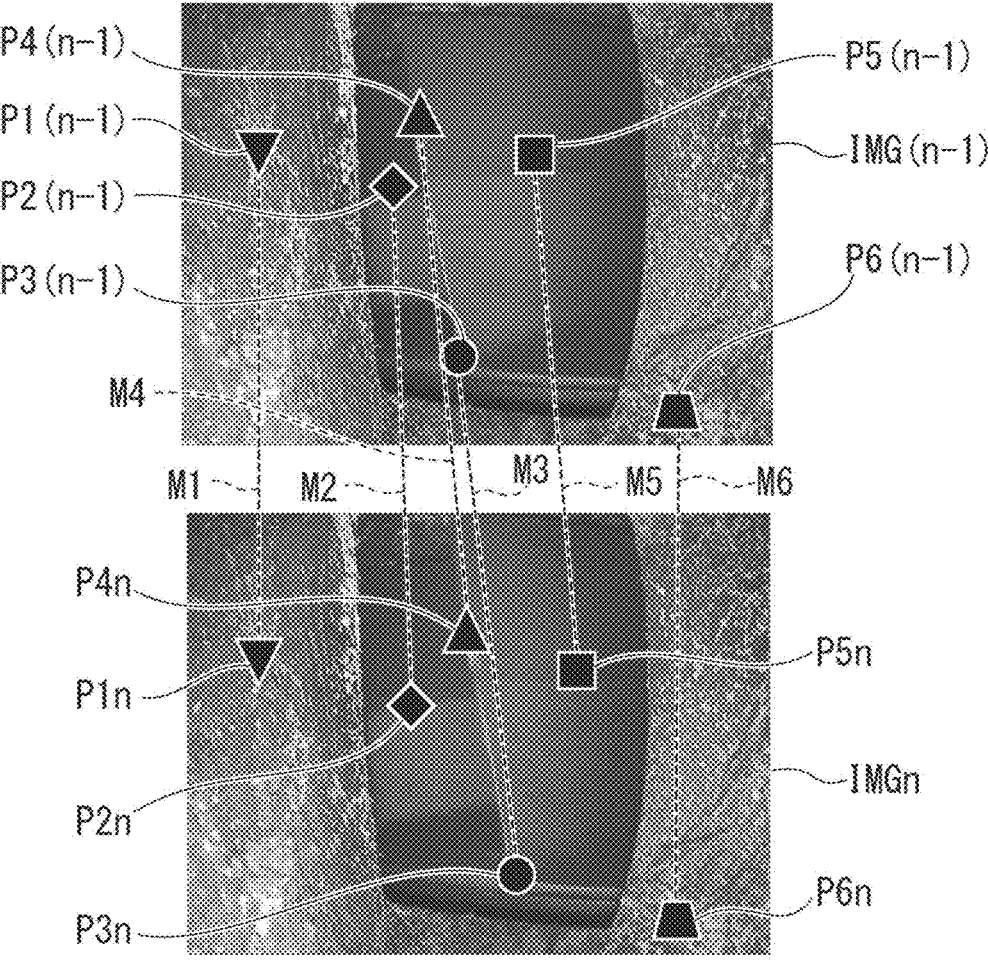
FIG. 9 is a diagram showing an example of the same feature region between two images in the first embodiment of the present invention.

FIG. 9 shows an example of the same feature regions between two images. Two or more feature regions in an image IMG(n–1) and two or more feature regions in an image IMGn are shown in FIG. 9. After the image IMGn shown in FIG. 8 is acquired in Step S102, the number n increases by 1 in Step S101. Thereafter, the image IMGn shown in FIG. 9 is acquired in Step S102. The image IMG(n–1) shown in FIG. 9 is the same as the image IMGn shown in FIG. 8.

Correspondence information M1, M2, M3, M4, M5, and M6 indicate the same feature regions between the image IMG(n–1) and the image IMGn. The correspondence information M1 indicates that a feature region P1(n–1) in the image IMG(n–1) is the same as a feature region P1n in the image IMGn. The correspondence information M2 indicates that a feature region P2(n–1) in the image IMG(n–1) is the same as a feature region P2n in the image IMGn. The correspondence information M3 indicates that a feature region P3(n–1) in the image IMG(n–1) is the same as a feature region P3n in the image IMGn. The correspondence information M4 indicates that a feature region P4 (n–1) in the image IMG(n–1) is the same as a feature region P4n in the image IMGn. The correspondence information M5 indicates that a feature region P5(n–1) in the image IMG(n–1) is the same as a feature region P5n in the image IMGn. The correspondence information M6 indicates that a feature region P6(n–1) in the image IMG(n–1) is the same as a feature region P6n in the image IMGn.

A feature region in one image is not always the same as that in another image. For example, there is a possibility that a feature region detected in the edge part of the image IMG(n–1) is outside the visual field of the camera when the image IMGn is acquired. In addition, it may be difficult to associate feature regions with each other between two images due to an influence of blurring or the like. Therefore, the number of feature regions in each image is greater than or equal to the number of the same feature regions as those in other images.

After Step S105, the region determination unit 183 calculates a moving amount of a region of a subject between the image IMG(n–1) and the image IMGn (Step S106).

Figures 10, 11:
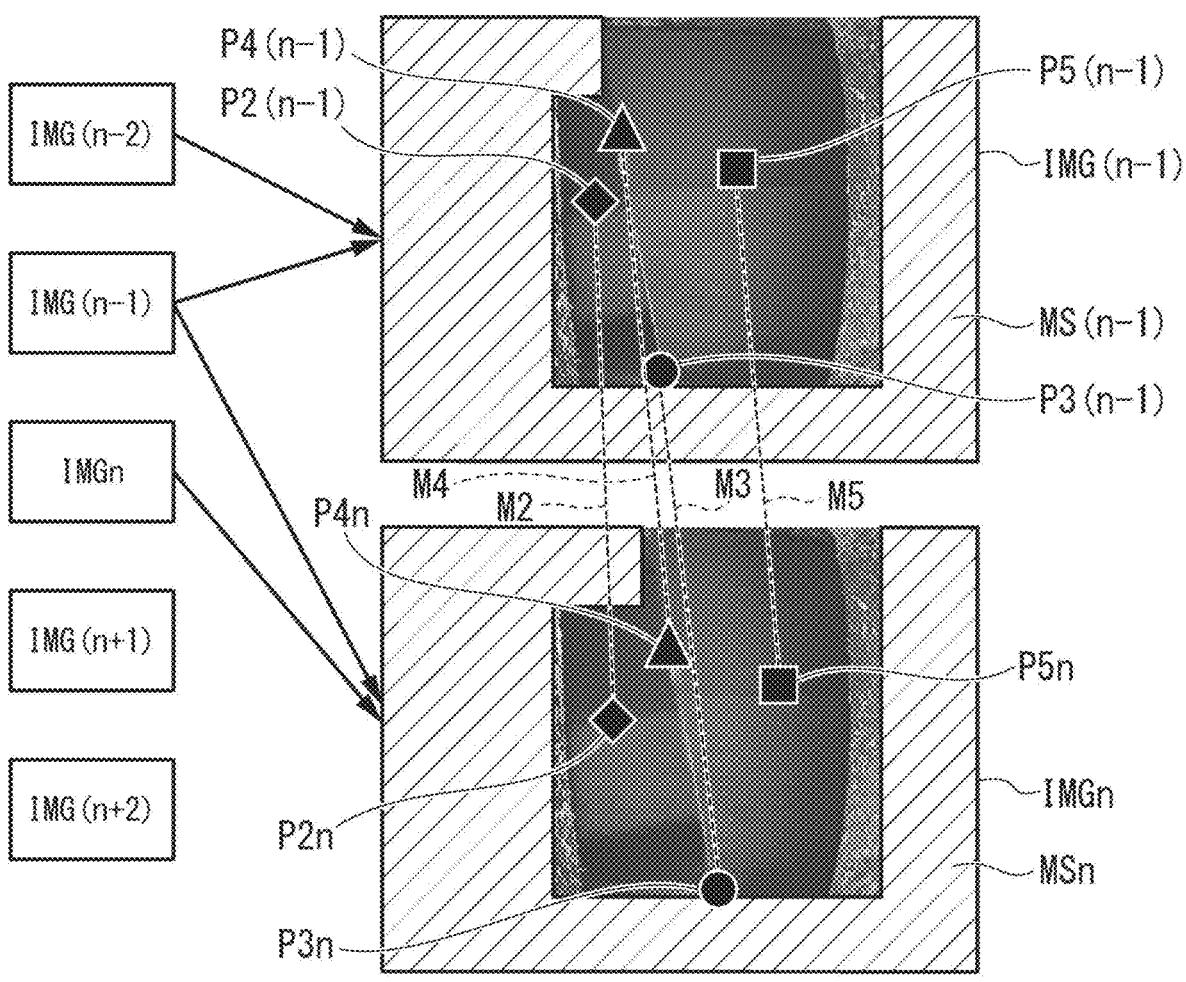
FIG. 10 is a diagram showing a method of calculating a moving amount in the first embodiment of the present invention.
FIG. 11 is a diagram showing a method of determining whether a region of an image in the first embodiment of the present invention is a moving region or a stationary region.

The region determination unit 183 executes the following processing in Step S106. The region determination unit 183 divides the region of the image IMGn into two or more grid-like small regions as shown in FIG. 10. In the example shown in FIG. 10, the region of the image IMGn is divided into seven in the horizontal direction and is divided into six in the vertical direction. The region of the image IMGn is divided into 42 small regions. The shape of the small regions is not a grid. The shape of the small regions may be a circle or the like. The region determination unit 183 divides region of the image IMG(n–1) into two or more grid-like small regions by using a similar method as that described above.

The region determination unit 183 refers to correspondence information of a feature region corresponding to a specific small region. The correspondence information indicates the same feature regions between two images. The region determination unit 183 calculates a typical moving amount between a small region of the image IMG(n–1) and a small region of the image IMGn. The small region of the image IMG(n–1) and the small region of the image IMGn are associated with each other in the correspondence information.

The region determination unit 183 can use a statistic as a typical moving amount. The statistic is an average, a median, or the like.

The region determination unit 183 may determine the reliability of the moving amount based on the deviation of moving amounts of two or more feature regions included in a small region or the deviation of moving directions of the two or more feature regions. For example, when moving directions are not uniform, there is a possibility that the same feature regions are not correctly associated with each other between two images. In such a case, the region determination unit 183 may determine that the reliability of the moving amount is low. When the moving amount or the moving direction regarding a small region is different from that regarding the other small regions, the region determination unit 183 may determine that the moving amount is abnormal and may exclude the moving amount.

The region determination unit 183 executes the above-described processing by using all the small regions of the image IMGn and calculates a typical moving amount of each of the small regions.

After Step S106, the region determination unit 183 determines whether a small region of the image IMGn is a moving region or a stationary region based on the moving amount (Step S107).

The region determination unit 183 executes the following processing in Step S107. The region determination unit 183 compares a typical moving amount of each small region with a threshold value. The threshold value is set in advance. Alternatively, the threshold value is calculated in accordance with the situation of an inspection. When the moving amount is greater than the threshold value, the region determination unit 183 determines that the small region is the moving region. When the moving amount is less than or equal to the threshold value, the region determination unit 183 determines that the small region is the stationary region.

After Step S107, the 3D restoration unit 184 extracts a feature region included in the small region determined to be the moving region in Step S107 from the region of the image IMGn. By doing this, the 3D restoration unit 184 extracts a feature region corresponding to the moving region (Step S108).

The 3D restoration unit 184 does not extract a feature region included in the small region determined to be the stationary region in Step S107 from the region of the image IMGn. In other words, the 3D restoration unit 184 does not extract a feature region corresponding to the stationary region. Therefore, the feature region corresponding to the stationary region is not used in the 3D restoration processing.

Details of Step S107 and Step S108 will be described by using FIG. 11. Two or more feature regions in an image IMG(n–1) and two or more feature regions in an image IMGn are shown in FIG. 11. Each of the feature regions is the same as that shown in FIG. 9.

The region determination unit 183 calculates a moving amount of each small region of the image IMG(n–1) by using an image IMG(n–2) and the image IMG(n–1). The region determination unit 183 classifies two or more feature regions of the image IMG(n–1) into a moving region and a stationary region MS(n–1) based on the moving amount. The moving region includes feature regions P2(n–1), P3(n–1), P4(n–1), and P5(n–1).

The region determination unit 183 calculates a moving amount of each small region of the image IMGn by using the image IMG(n–1) and the image IMGn. The region determination unit 183 classifies two or more feature regions of the image IMGn into a moving region and a stationary region MSn based on the moving amount. The moving region includes feature regions P2n, P3n, P4n, and P5n.

The 3D restoration unit 184 extracts a feature region corresponding to the moving region in Step S108. The 3D restoration unit 184 does not extract a feature region corresponding to the stationary region MS(n−1) or the stationary region MSn in Step S108.

Similar processing to that described above is executed each time a new image is acquired in Step S102.

After Step S108, the 3D restoration unit 184 executes the 3D restoration processing by using the feature region corresponding to the moving region (Step S109). The 3D restoration unit 184 reads a necessary parameter for the 3D restoration processing from the RAM 14 and uses the parameter in the 3D restoration processing.

Figure 12:
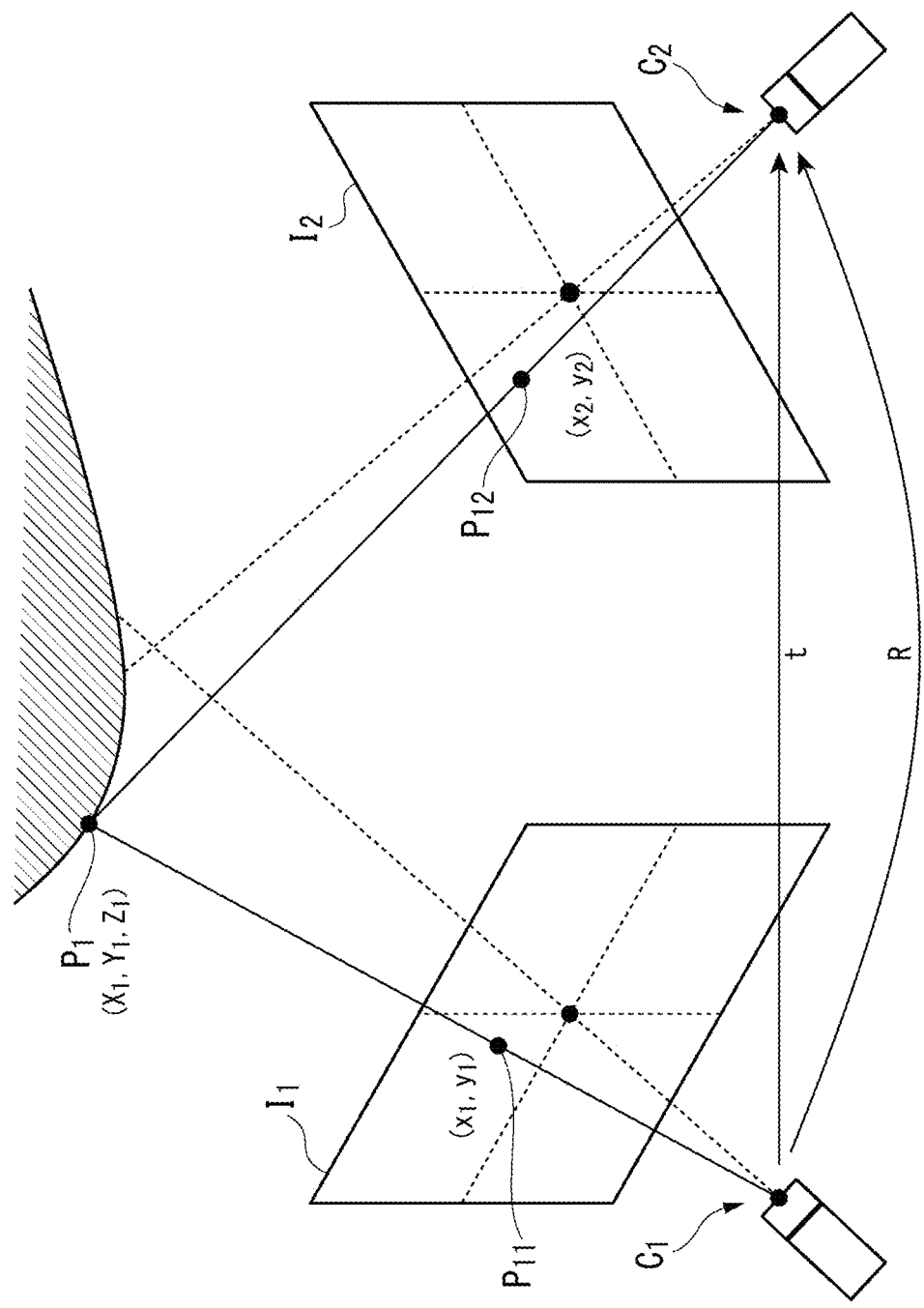
FIG. 12 is a schematic diagram showing a situation in which an image is acquired in the first embodiment of the present invention.

The 3D restoration unit 184 executes the following processing in Step S109. FIG. 12 schematically shows a situation of image acquisition in a case in which two images are acquired.

As shown in FIG. 12, first, an image $I_1$ is acquired in an imaging state $c_1$ of the camera. Next, an image $I_2$ is acquired in an imaging state $c_2$ of the camera. At least one of an imaging position and an imaging posture is different between the imaging state $c_1$ and the imaging state $c_2$. In FIG. 12, both the imaging position and the imaging posture are different between the imaging state $c_1$ and the imaging state $c_2$.

In each embodiment of the present invention, it is assumed that the image $I_1$ and the image $I_2$ are acquired by the same endoscope. In addition, in each embodiment of the present invention, it is assumed that parameters of an objective optical system of the endoscope do not change. The parameters of the objective optical system are a focal distance, a distortion aberration, a pixel size of an image sensor, and the like. Hereinafter, for the convenience of description, the parameters of the objective optical system will be abbreviated as internal parameters. When such conditions are assumed, the internal parameters specifying characteristics of the optical system of the endoscope can be used in common regardless of the position and the posture of the camera (observation optical system). In each embodiment of the present invention, it is assumed that the internal parameters are acquired at the time of factory shipment. In addition, in each embodiment of the present invention, it is assumed that the internal parameters are known at the time of acquiring an image.

For example, the image $I_1$ and the image $I_2$ are still images. The image $I_1$ and the image $I_2$ may be specific frames extracted from a video. In each embodiment of the present invention, it is assumed that the image $I_1$ and the image $I_2$ are acquired by one endoscope. However, the present invention is not limited to this. For example, the present invention may be also applied to a case in which 3D data are generated by using a plurality of videos acquired by a plurality of endoscopes. In this case, the image $I_1$ and the image $I_2$ have only to be acquired by using different endoscope devices, and each internal parameter has only to be stored for each endoscope. Even if the internal parameters are unknown, it is possible to perform calculation by using the internal parameters as variables. Therefore, the subsequent procedure does not greatly change in accordance with whether the internal parameters are known.

FIG. 12 shows an example in which a feature region at coordinates $P_{11}$ is extracted and a feature region at coordinates $P_{12}$ are extracted. The feature region at the coordinates $P_{11}$ and the feature region at the coordinates $P_{12}$ correspond to a region at coordinates $P_1$ on a subject. These feature regions are detected in Step S103 and are associated with each other in Step S105.

Although only one feature region of each image is shown in FIG. 12, two or more feature regions are actually detected in each image. The number of feature regions to be detected may be different between images. Each feature region detected from each image is converted into data called a feature. The feature indicates data representing characteristics of a feature region.

Figure 13:
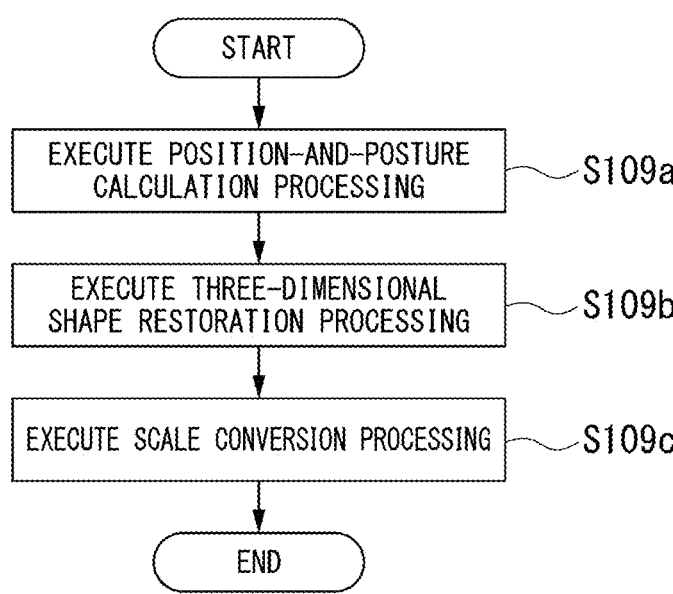
FIG. 13 is a flow chart showing a procedure of 3D restoration processing in the first embodiment of the present invention.

The 3D restoration processing in Step S109 will be described by using FIG. 13. FIG. 13 shows a procedure of the 3D restoration processing.

The 3D restoration unit 184 reads coordinates of feature regions associated with each other between two images from the RAM 14. The coordinates are a pair of coordinates of feature regions in each image. The 3D restoration unit 184 executes position-and-posture calculation processing based on the read coordinates (Step S109$a$). In the position-and-posture calculation processing, the 3D restoration unit 184 calculates a relative position and a relative posture between the imaging state $c_1$ of the camera that acquires the image $I_1$ and the imaging state $c_2$ of the camera that acquires the image $I_2$. More specifically, the 3D restoration unit 184 calculates a matrix E by solving the following Equation (1) using an epipolar restriction.

$$p_1{}^T E p_2 = 0 \quad E = [t]_X R \quad \because [t]_X = \begin{pmatrix} 0 & -t_z & t_y \\ t_z & 0 & -t_x \\ -t_y & t_x & 0 \end{pmatrix} \quad (1)$$

The matrix E is called a basic matrix. The basic matrix E is a matrix storing a relative position and a relative posture between the imaging state $c_1$ of the camera that acquires the image $I_1$ and the imaging state $c_2$ of the camera that acquires the image $I_2$. In Equation (1), a matrix $p_1$ is a matrix including coordinates of a feature region detected from the image $I_1$. A matrix $p_2$ is a matrix including coordinates of a feature region detected from the image $I_2$. The basic matrix E includes information related to a relative position and a relative posture of the camera and thus corresponds to external parameters of the camera. The 3D restoration unit 184 can solve the basic matrix E by using a known algorithm.

As shown in FIG. 12, Expression (2) and Expression (3) are satisfied in a case in which the amount of position (relative position) change of the camera is t and the amount of posture (relative posture) change of the camera is R.

$$t = (t_x, t_y, t_z) \quad (2)$$

$$R = R_x(\alpha) R_y(\beta) R_z(\gamma) = \quad (3)$$

$$\begin{pmatrix} 1 & 0 & 0 \\ 0 & \cos\alpha & -\sin\alpha \\ 0 & \sin\alpha & \cos\alpha \end{pmatrix} \begin{pmatrix} \cos\beta & 0 & \sin\beta \\ 0 & 1 & 0 \\ -\sin\beta & 0 & \cos\beta \end{pmatrix} \begin{pmatrix} \cos\gamma & -\sin\gamma & 0 \\ \sin\gamma & \cos\gamma & 0 \\ 0 & 0 & 1 \end{pmatrix}$$

In Expression (2), a moving amount in an x-axis direction is expressed as $t_x$, a moving amount in a y-axis direction is expressed as $t_y$, and a moving amount in a z-axis direction is expressed as $t_z$. In Expression (3), a rotation amount $\alpha$ around the x-axis is expressed as $R_x(\alpha)$, a rotation amount $\beta$ around the y axis is expressed as $R_y(\beta)$, and a rotation amount $\gamma$ around the z axis is expressed as $R_z(\gamma)$. After the basic matrix E is calculated, optimization processing called bundle adjustment may be executed in order to improve restoration accuracy of 3D coordinates.

The 3D restoration unit 184 calculates 3D coordinates (camera coordinate) in a coordinate system of 3D data by using the calculated amount of positional change of the camera. For example, the 3D restoration unit 184 defines 3D coordinates of the camera that acquires the image $I_1$. The 3D restoration unit 184 calculates 3D coordinates of the camera that acquires the image $I_2$ based on both the 3D coordinates of the camera that acquires the image $I_1$ and the amount of positional change of the camera that acquires the image $I_2$.

The 3D restoration unit 184 calculates posture information in a coordinate system of 3D data by using the calculated amount of postural change of the camera. For example, the 3D restoration unit 184 defines posture information of the camera that acquires the image $I_1$. The 3D restoration unit 184 generates posture information of the camera that acquires the image $I_2$ based on both the posture information of the camera that acquires the image $I_1$ and the amount of postural change of the camera that acquires the image $I_2$.

The 3D restoration unit 184 generates data (3D shape data) of a three-dimensional shape (3D shape) by executing the position-and-posture calculation processing (Step S109$a$). The 3D shape data include 3D coordinates (camera coordinate) at the position of the camera and include posture information indicating the posture of the camera. In addition, in a case in which a method such as structure from motion, visual-SLAM, or the like is applied to the position-and-posture calculation processing (Step S109$a$), the 3D restoration unit 184 further calculates 3D coordinates of each feature region in Step S109$a$. The 3D shape data generated in Step S109$a$ do not include 3D coordinates of a region on the subject other than the feature region. Therefore, the 3D shape data indicate a sparse 3D shape of the subject.

The 3D shape data include the 3D coordinates of each feature region, the above-described camera coordinate, and the above-described posture information. The 3D coordinates of each feature region are defined in the coordinate system of the 3D data. The 3D coordinates of each feature region are associated with two-dimensional coordinates (2D coordinates) of each feature region. The 2D coordinates of each feature region are defined in a coordinate system of an image including each feature region. The 2D coordinates and the 3D coordinates of each feature region are associated with an image including each feature region.

After Step S109$a$, the 3D restoration unit 184 executes three-dimensional shape restoration processing based on the relative position and the relative posture of the camera (the amount t of positional change and the amount R of postural change) calculated in Step S109$a$ (Step S109$b$). The 3D restoration unit 184 generates 3D data of the subject in the three-dimensional shape restoration processing. As a technique for restoring a three-dimensional shape of the subject, there are patch-based multi-view stereo (PMVS), matching-processing that uses parallelization stereo, and the like. However, a means therefor is not particularly limited.

The 3D restoration unit 184 calculates 3D coordinates of regions on the subject other than feature regions in Step S109$b$. The 3D coordinates of each region other than the feature regions are defined in the coordinate system of the 3D data. The 3D coordinates of each region are associated with the 2D coordinates of each region. The 2D coordinates of each region are defined in a coordinate system of a 2D image including each region. The 2D coordinates and the 3D coordinates of each region are associated with a 2D image including each region. The 3D restoration unit 184 updates the 3D shape data. The updated 3D shape data include the 3D coordinates of each feature region, the 3D coordinates of each region other than the feature regions, the camera coordinate, and the posture information. The 3D shape data updated in Step S109$b$ include 3D coordinates of a region on the subject other than the feature regions in addition to the 3D coordinates of the feature regions. Therefore, the 3D shape data indicate a dense 3D shape of the subject.

After Step S109$b$, the 3D restoration unit 184 executes scale conversion processing based on both the 3D shape data processed in the three-dimensional shape restoration processing (Step S109$b$) and the scale information read from the RAM 14 (Step S109$c$). The 3D restoration unit 184 transforms the 3D shape data of the subject into three-dimensional coordinate data (3D data) having a dimension of length in the scale conversion processing. When Step S109$c$ is executed, the 3D restoration processing is completed.

In order to shorten a processing time, Step S109$b$ may be omitted. In this case, after Step S109$a$ is executed, Step S109$c$ is executed without executing Step S109$b$.

Step S109$c$ may be omitted. In this case, after Step S109$b$ is executed, the 3D restoration processing is completed without executing Step S109$c$. In this case, the 3D data indicate a relative shape of the subject not having a dimension of length.

It is necessary that at least part of a region of one of the images and at least part of a region of at least one of the other images overlap each other in order to generate 3D data in accordance with the principle shown in FIG. 12. In other words, a region of a first image and a region of a second image different from the first image include a common region. The other region in the first image excluding the common region and the other region in the second image excluding the common region are different from each other.

For example, the 3D restoration unit 184 generates 3D data by using a feature region of the image IMG(n−1) and a feature region of the image IMGn in Step S109. The feature region of each image corresponds to the moving region extracted in Step S108. When Step S109 has been executed twice or more, the 3D restoration unit 184 combines the 3D data generated in Step S109 executed last time and the 3D data generated in Step S109 executed this time.

The image $I_1$ and the image $I_2$ do not need to be two temporally consecutive frames in a video. There may be one or more frames between the image $I_1$ and the image $I_2$ in the video.

The processing executed by the endoscope device 1 will be described by using FIG. 7 again.

After Step S109, the control unit 180 determines whether the number n has reached a predetermined number. By doing this, the control unit 180 determines whether all images are acquired (Step S110).

For example, the predetermined number is a number of the last frame of a video or a number set on software in advance. The predetermined number may be a number of a frame that is processed when a user performs a completion operation. In this case, the predetermined number varies in accordance with a timing at which the user performs the completion operation.

When the control unit 180 determines that the number n has not reached the predetermined number in Step S110, Step S101 is executed. In this case, a new image is acquired in Step S102 and the processing described above is repeated. When the control unit 180 determines that the number n has reached the predetermined number in Step S110, the display control unit 185 displays an image of the 3D data generated in Step S109 on the display unit 5 (Step S111). When Step S111 is executed, the 3D data generation processing is completed.

The endoscope device 1 may store the generated 3D data on the RAM 14 or the memory card 42 instead of executing Step S111. Alternatively, the endoscope device 1 may transmit the generated 3D data to an external device. The external device is the PC 41, a cloud server, or the like.

After Step S111 is executed, a user may designate a measurement position in the 3D data displayed on the display unit 5. The endoscope device 1 may execute measurement by using the 3D data.

In the above-described example, the determination regarding a moving region and a stationary region is executed in Step S107 after two or more feature regions are detected in Step S103. After two or more temporary feature regions are detected in Step S103 and the determination regarding a moving region and a stationary region is executed in Step S107, a formal feature region may be calculated based on information of the moving region.

Figure 14:
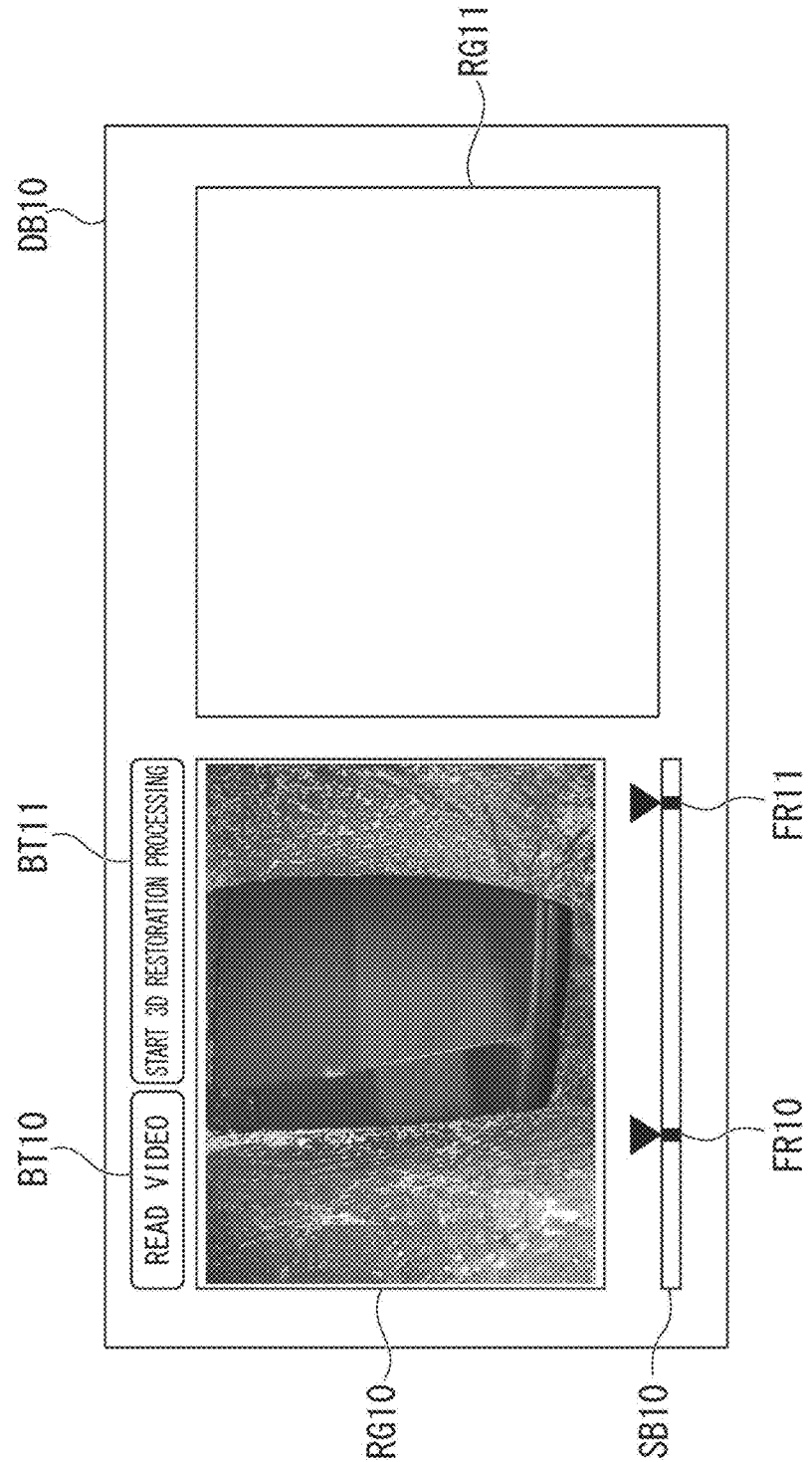
FIG. 14 is a diagram showing an example of information displayed on a display unit included in the endoscope device according to the first embodiment of the present invention.
Figure 15:
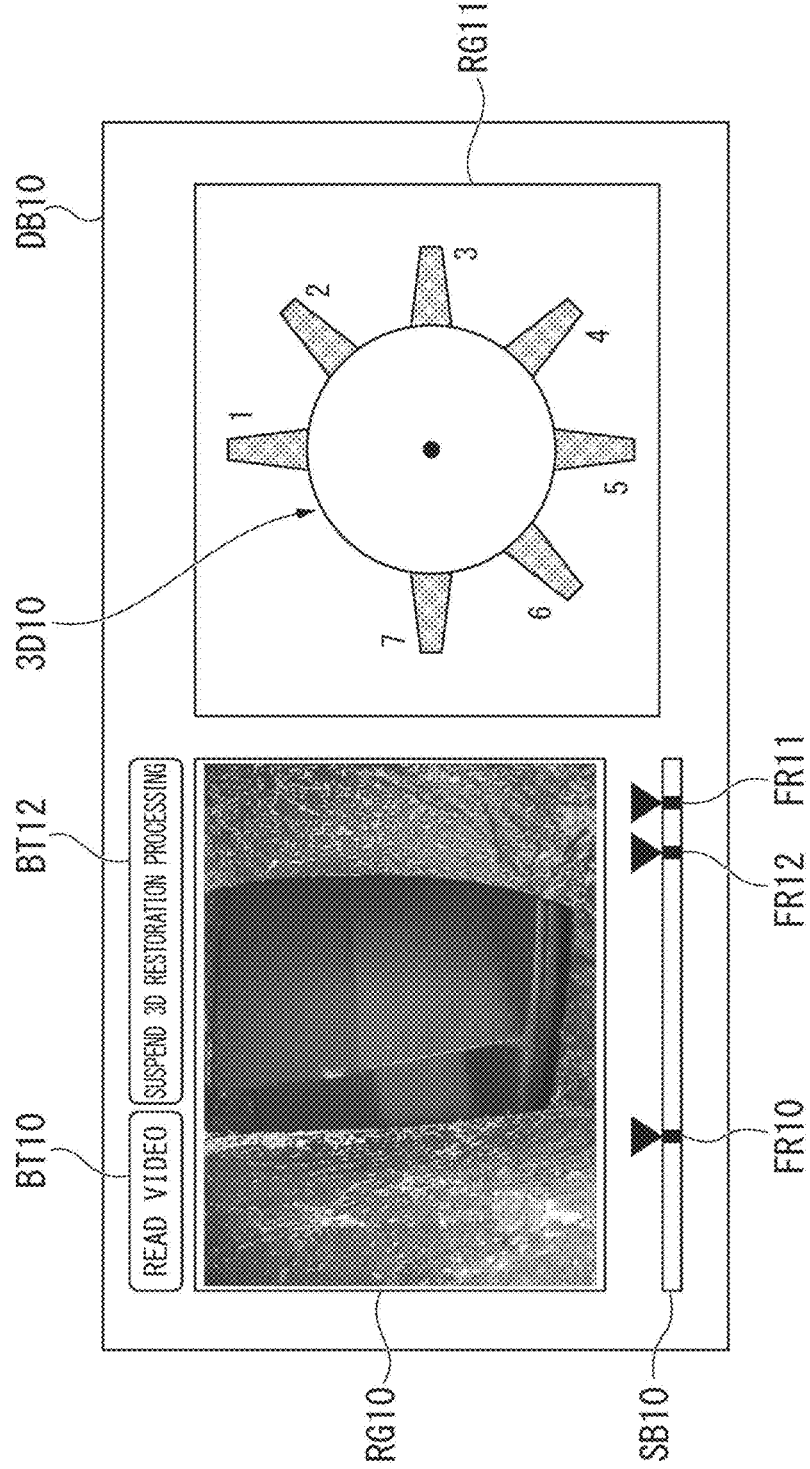
FIG. 15 is a diagram showing an example of information displayed on the display unit included in the endoscope device according to the first embodiment of the present invention.

An example of a user interface regarding the 3D data generation processing will be described by using FIG. 14 and FIG. 15. FIG. 14 and FIG. 15 show an example of information displayed on the display unit 5.

The display control unit 185 displays a dialog box DB10 shown in FIG. 14 on the screen of the display unit 5. The dialog box DB10 includes a region RG10, a region RG11, a button BT10, a button BT11, and a seek-bar SB10.

An image of a subject is displayed in the region RG10. In the examples shown in FIG. 14 and FIG. 15, a video of the subject is displayed in the region RG10. An image of 3D data is displayed in the region RG11.

A user operates the button BT10 and the button BT11 by operating the operation unit 4. In a case in which the display unit 5 is constituted as a touch panel, the user operates the button BT10 and the button BT11 by touching the screen of the display unit 5.

The user presses the button BT10 in order to read a video from the RAM 14. After the button BT10 is pressed, a frame of the video is displayed in the region RG10. FIG. 14 shows the dialog box DB10 after the button BT10 is pressed.

The user may perform a predetermined operation on the region RG10 by operating the operation unit 4 or touching the screen of the display unit 5. When the predetermined operation is performed, an instruction to reproduce or pause the video may be input into the endoscope device 1. The dialog box DB10 may include a button used for inputting the instruction to reproduce or pause the video.

The seek-bar SB10 indicates the position of the frame displayed in the region RG10. The user can change the position of the frame in the seek-bar SB10 by operating the operation unit 4 or touching the screen of the display unit 5. In addition, the user can designate a frame FR10 for which the 3D restoration processing is started and a frame FR11 for which the 3D restoration processing is completed by operating the operation unit 4 or touching the screen of the display unit 5.

In the above-described example, the user designates a start frame for which the 3D restoration processing is started and a completion frame for which the 3D restoration processing is completed. The control unit 180 may automatically designate the start frame and the completion frame. For example, the control unit 180 may detect a section of the video in which a subject is moving. Alternatively, the control unit 180 may detect a section of the video in which an abnormality such as damage is seen. The section includes two or more frames of the video. The control unit 180 may designate the initial frame of the section as the start frame and may designate the last frame of the section as the completion frame.

Only one of the start frame and the completion frame may be designated by the user. Alternatively, only one of the start frame and the completion frame may be automatically designated. A method of setting a section including a frame to be used in the 3D restoration processing is not limited to the above-described examples.

The user presses the button BT11 in order to start the 3D restoration processing. After the button BT11 is pressed, the 3D data generation processing shown in FIG. 7 is started. FIG. 15 shows the dialog box DB10 after the button BT11 is pressed.

After the button BT11 is pressed, the button BT11 is changed to a button BT12 used to suspend the 3D restoration processing. When the 3D data generation processing is being executed, the user can input an instruction to suspend the 3D data generation processing into the endoscope device 1 by pressing the button BT12 at any timing. When the user presses the button BT12, the control unit 180 sets the present number n as the predetermined number used in Step S110. After processing related to the present number n is completed, Step S111 is executed.

The seek-bar SB10 shows a frame FR12 corresponding to the present number n. The user can check the progress of processing from the frame FR10 for which the 3D restoration processing is started to the frame FR12 for which the 3D restoration processing is suspended.

The display control unit 185 displays an image 3D10 of 3D data in the region RG11. The image 3D10 indicates 3D data generated by using the frames FR10 to FR12. In the example shown in FIG. 15, the 3D data indicate 3D shapes of seven restored rotor blades. In the example shown in FIG. 15, a number is allocated to each rotor blade, and the number is displayed. In the example shown in FIG. 15, eight rotor blades are disposed, and 3D data of the one remaining rotor blade have not been generated yet.

As a method of allocating numbers to rotor blades, any method may be used. Hereinafter, an example of a method of allocating numbers to rotor blades will be described.

For example, the 3D restoration unit 184 may recognize rotor blades in an image displayed in the region RG10 by using an image recognition technique such as machine learning and may allocate a number to each rotor blade in accordance with the number of recognized rotor blades. In a case in which the turning tool 43 rotates the rotor blades, the 3D restoration unit 184 may acquire information indicating rotation angles of the rotor blades from the turning tool 43. The 3D restoration unit 184 may identify rotor blades seen in the image displayed in the region RG10 based on the rotation angles of the rotor blades and the number of rotor blades fixed on the circumference of the disk. The 3D restoration unit 184 may allocate numbers to the identified rotor blades. The number of rotor blades fixed on the circumference of the disk is known.

The 3D restoration unit 184 may apply a shape recognition technique to the generated 3D data and may recognize an object having a similar shape to that of a rotor blade. The 3D restoration unit 184 may allocate a number to the object.

In a case in which the 3D data generation device is a device other than the endoscope device 1, the control unit 180 may transmit two or more images generated by the imaging device 28 to the 3D data generation device via the external device interface 16. The 3D data generation device may receive the two or more images and may execute similar processing to that shown in FIG. 7.

A 3D data generation method according to each aspect of the present invention generates 3D data indicating a 3D shape inside a turbine. The 3D data generation method includes an image acquisition step, a region detection step, a region determination step, and a data generation step.

The CPU 18 acquires two or more images of a component inside the turbine in the image acquisition step (Step S102). The component includes a first object capable of moving inside the turbine and a second object that is stationary inside the turbine. The two or more images are generated by an imaging apparatus including the tubular insertion unit 2 that acquires an optical image inside the turbine. The insertion unit 2 is inserted into the turbine through a hole (access port AP10) formed in the turbine. A moving direction (direction DR10) of the insertion unit 2 when the insertion unit 2 is inserted into the turbine is different from a moving direction (direction DR12) of the first object. A relative position of the first object to the insertion unit 2 is different between timings at which the imaging apparatus generates images while the first object moves.

The CPU 18 detects two or more correspondence regions that are the same regions of the component in at least two images included in the two or more images in the region detection step (Step S105). The CPU 18 determines whether at least part of a region of each of the two or more images is a change region (moving region) or a non-change region (stationary region) in the region determination step (Step S107). The change region is a region of the component of which coordinates in an image generated by the imaging apparatus change. The non-change region is a region of the component of which coordinates in an image generated by the imaging apparatus do not change. The CPU 18 generates the 3D data by using a correspondence region determined to be the change region among the two or more correspondence regions without using a correspondence region determined to be the non-change region among the two or more correspondence regions in the data generation step (Step S109).

A 3D data generation system according to each aspect of the present invention includes an imaging apparatus and a 3D data generation device (control device 10). The imaging apparatus includes the tubular insertion unit 2, which acquires an optical image inside the turbine, and generates two or more images of a component inside the turbine. The 3D data generation device includes the CPU 18. The CPU 18 executes the image acquisition step, the region detection step, the region determination step, and the data generation step described above.

Each aspect of the present invention may include the following modified example. After the CPU 18 detects the two or more correspondence regions in the region detection step (Step S105), the CPU 18 determines whether at least part of a region in each of the two or more images is the change region or the non-change region in the region determination step (Step S107).

Each aspect of the present invention may include the following modified example. The first object includes a rotor blade. The second object includes a stator blade or a shroud.

Each aspect of the present invention may include the following modified example. Part of the first object is concealed by the second object in the two or more images. In the example shown in FIG. 5, part of the rotor blade RT14 is concealed by the stator blade ST14.

Each aspect of the present invention may include the following modified example. The second object includes an object that conceals part of the first object in the two or more images. The second object includes an object, part of which is concealed by the first object in the two or more images.

In the example shown in FIG. 5, the stator blade ST14 conceals part of the rotor blade RT14, and part of the shroud SH10 is concealed by the rotor blade RT14.

Each aspect of the present invention may include the following modified example. The imaging apparatus generates the two or more images at two or more different timings. The CPU 18 determines whether at least part of a region in each of the two or more images is the change region or the non-change region based on a moving amount of the correspondence region between at least two images included in the two or more images in the region determination step (Step S107).

Each aspect of the present invention may include the following modified example. The insertion unit 2 is fixed inside the turbine.

Each aspect of the present invention may include the following modified example. The imaging device is a borescope.

In the first embodiment, the endoscope device 1 generates 3D data indicating a 3D shape inside a turbine by using a feature region corresponding to a moving region without using a feature region corresponding to a stationary region. Therefore, the endoscope device 1 can improve the reliability of processing of generating the 3D data.

A user can check the state of a rotor blade by checking an image of the 3D data displayed on the display unit 5 or executing measurement using the 3D data. Therefore, the quality and the efficiency of an inspection are improved.

First Modified Example of First Embodiment

A first modified example of the first embodiment of the present invention will be described. In the first embodiment described above, the endoscope device 1 classifies a region of a subject into a moving region or a stationary region by using a moving amount of the region between two or more images. In the first modified example of the first embodiment, the endoscope device 1 classifies a region of a subject into a moving region or a stationary region by using a luminance difference of an image.

Figure 16:
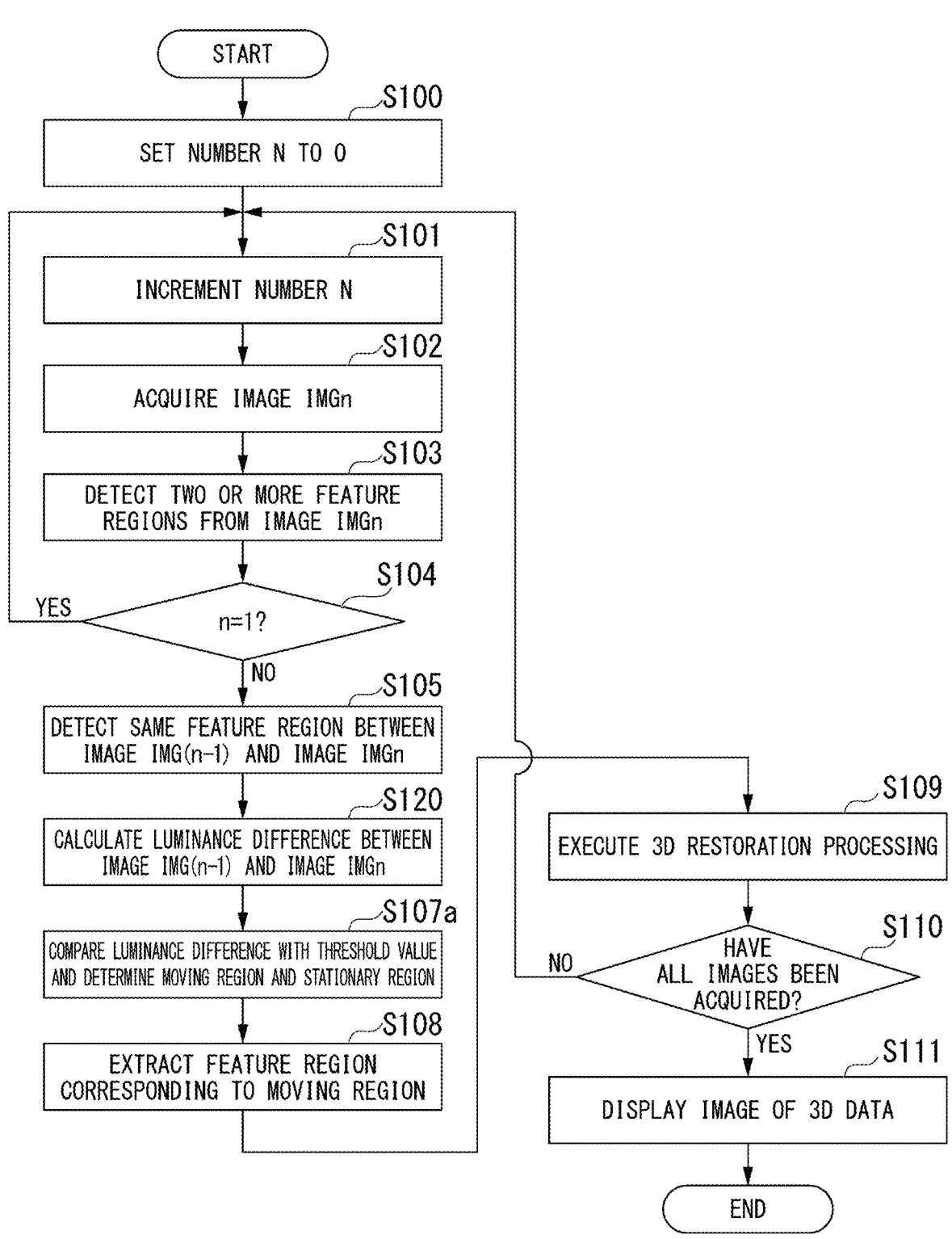
FIG. 16 is a flow chart showing a procedure of 3D data generation processing in a first modified example of the first embodiment of the present invention.

Processing executed by the endoscope device 1 will be described by using FIG. 16. FIG. 16 shows a procedure of 3D data generation processing executed by the endoscope device 1. The same processing as that shown in FIG. 7 will not be described.

After Step S105, the region determination unit 183 calculates a luminance difference between an image IMG(n−1) and an image IMGn (Step S120).

The region determination unit 183 executes the following processing in Step S120. The region determination unit 183 calculates a difference value between the luminance of each pixel in the image IMG(n−1) and the luminance of each pixel in the image IMGn. The region determination unit 183 uses the luminance of the same pixel in the image IMG(n−1) and the image IMGn.

In a case in which the imaging device 28 generates a color image having three channels, the region determination unit 183 may convert the image IMG(n−1) and the image IMGn into gray scale images. Alternatively, the region determination unit 183 may calculate three difference values by using values of three channels and may calculate a statistic of the three difference values as a luminance difference.

After Step S120, the region determination unit 183 determines whether a feature region of the image IMGn is a moving region or a stationary region based on the luminance difference (Step S107*a*). After Step S107*a*, Step S108 is executed.

The region determination unit 183 executes the following processing in Step S107a. The region determination unit 183 compares the luminance difference of each pixel with a threshold value. When the luminance difference is greater than the threshold value, the region determination unit 183 determines that the pixel is included in a moving region. When the luminance difference is less than or equal to the threshold value, the region determination unit 183 determines that the pixel is included in a stationary region. The region determination unit 183 executes the above-described processing for all the pixels of the image IMGn.

When the distal end 20 of the insertion unit 2 is moving, the entire region seen in an image moves in the same direction. Therefore, the region determination unit 183 may cause the position of the image IMG(n−1) and the position of the image IMGn to match each other before calculating the luminance difference.

Figure 17:
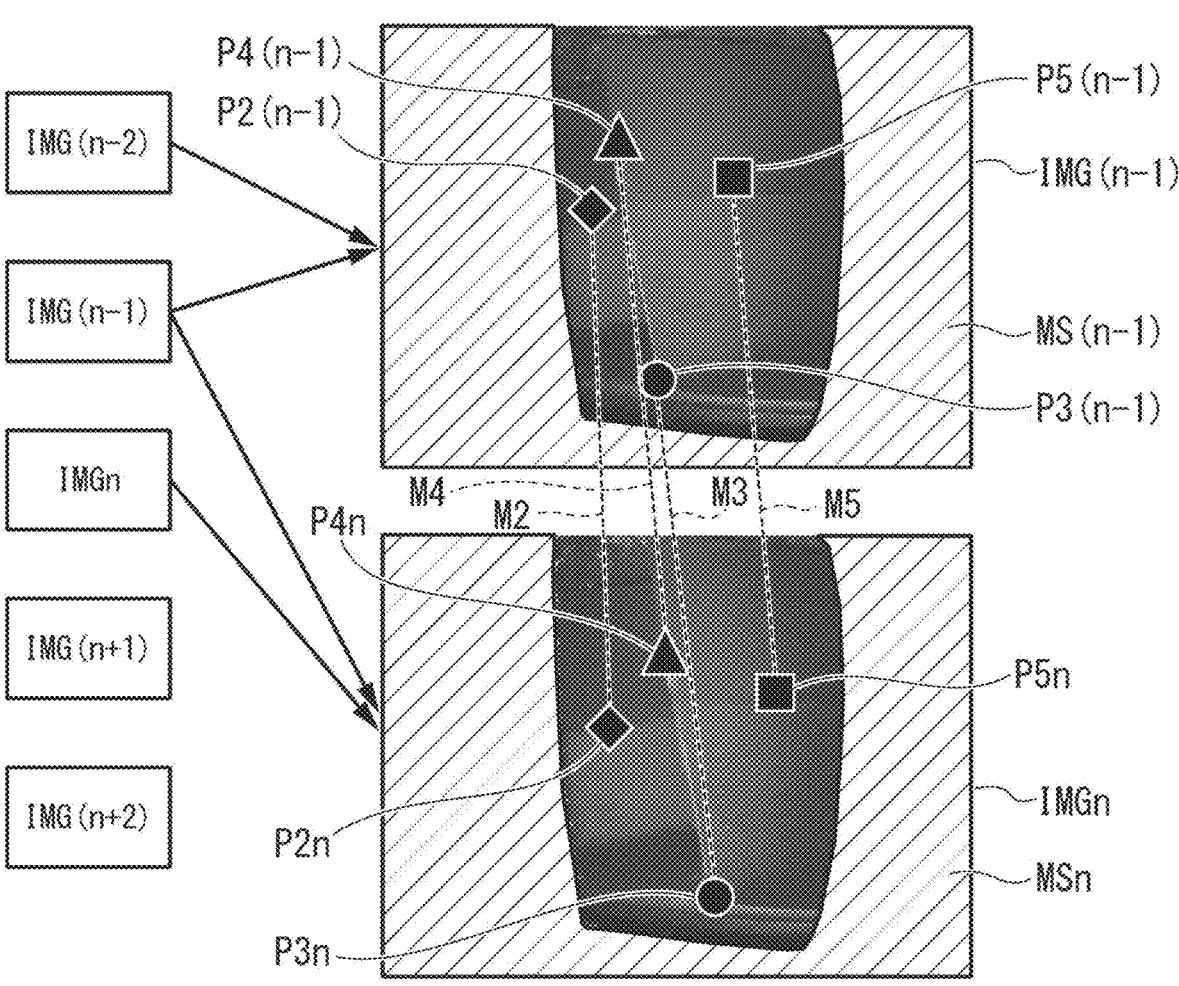
FIG. 17 is a diagram showing a method of determining whether a region of an image in the first modified example of the first embodiment of the present invention is a moving region or a stationary region.

Details of Step S107a and Step S108 will be described by using FIG. 17. Two or more feature regions in an image IMG(n−1) and two or more feature regions in an image IMGn are shown in FIG. 17. Each of the feature regions is the same as that shown in FIG. 9.

The region determination unit 183 calculates a luminance difference of each pixel of the image IMG(n−1) by using an image IMG(n−2) and the image IMG(n−1). The region determination unit 183 classifies two or more feature regions of the image IMG(n−1) into a moving region and a stationary region MS(n−1) based on the luminance difference. The moving region includes feature regions $P2(n-1)$, $P3(n-1)$, $P4(n-1)$, and $P5(n-1)$.

The region determination unit 183 calculates a luminance difference of each pixel of the image IMGn by using the image IMG(n−1) and the image IMGn. The region determination unit 183 classifies two or more feature regions of the image IMGn into a moving region and a stationary region MSn based on the luminance difference. The moving region includes feature regions $P2n$, $P3n$, $P4n$, and $P5n$.

The 3D restoration unit 184 does not extract a feature region corresponding to the stationary region MS(n−1) in Step S108. In addition, the 3D restoration unit 184 does not extract a feature region corresponding to the stationary region MSn in Step S108.

Similar processing to that described above is executed each time a new image is acquired in Step S102.

Figure 18:
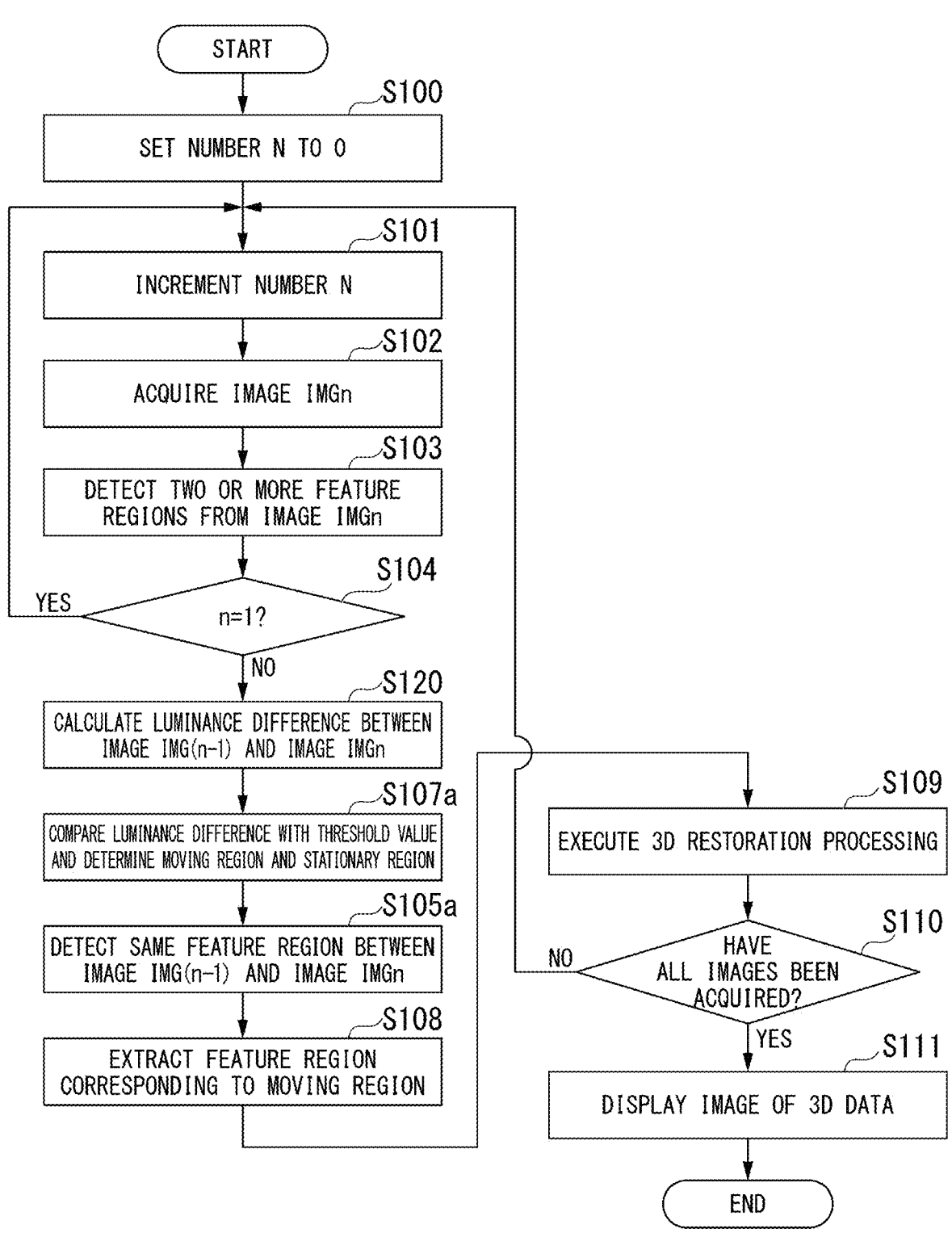
FIG. 18 is a flow chart showing a procedure of 3D data generation processing in the first modified example of the first embodiment of the present invention.

The order of Step S105, Step S120, and Step S107a is not limited to that shown in FIG. 16. A modified example of processing executed by the endoscope device 1 will be described by using FIG. 18. FIG. 18 shows a procedure of 3D data generation processing executed by the endoscope device 1. The same processing as that shown in FIG. 16 will not be described.

When the control unit 180 determines that the number n is not 1 in Step S104, the region determination unit 183 calculates a luminance difference between an image IMG(n−1) and an image IMGn in Step S120. After Step S120, the region determination unit 183 determines whether a feature region of the image IMGn is a moving region or a stationary region based on the luminance difference in Step S107a. At this time, a feature region of the image IMGn and a feature region of the image IMG(n−1) have not been associated with each other.

After Step S107a, the region detection unit 182 detects the same feature regions (correspondence regions) in the image IMG(n−1) and the image IMGn. At this time, the region detection unit 182 uses information of feature regions determined to be moving regions in Step S107a but does not use information of feature regions determined to be stationary regions in Step S107a (Step S105a). After Step S105a, Step S108 is executed.

Each aspect of the present invention may include the following modified example. The CPU 18 determines whether at least part of a region in each of two or more images of a component inside a turbine is a change region (moving region) or a non-change region (stationary region) based on the difference of a pixel value between at least two images included in the two or more images in the region determination step (Step S107a).

Each aspect of the present invention may include the following modified example. After the CPU 18 determines whether the at least part of the region in the two or more images is the change region or the non-change region in the region determination step (Step S107a), the CPU 18 detects two or more correspondence regions by using the change region without using the non-change region in the region detection step (Step S105a).

In the first modified example of the first embodiment, the endoscope device 1 can determine a moving region and a stationary region by using a luminance difference of an image.

Second Modified Example of First Embodiment

A second modified example of the first embodiment of the present invention will be described. In the first embodiment and the first modified example of the first embodiment described above, the endoscope device 1 classifies a region of a subject into a moving region or a stationary region by using two or more images. In the second modified example of the first embodiment, the endoscope device 1 classifies a region of a subject into a moving region or a stationary region by using one image.

Figure 19:
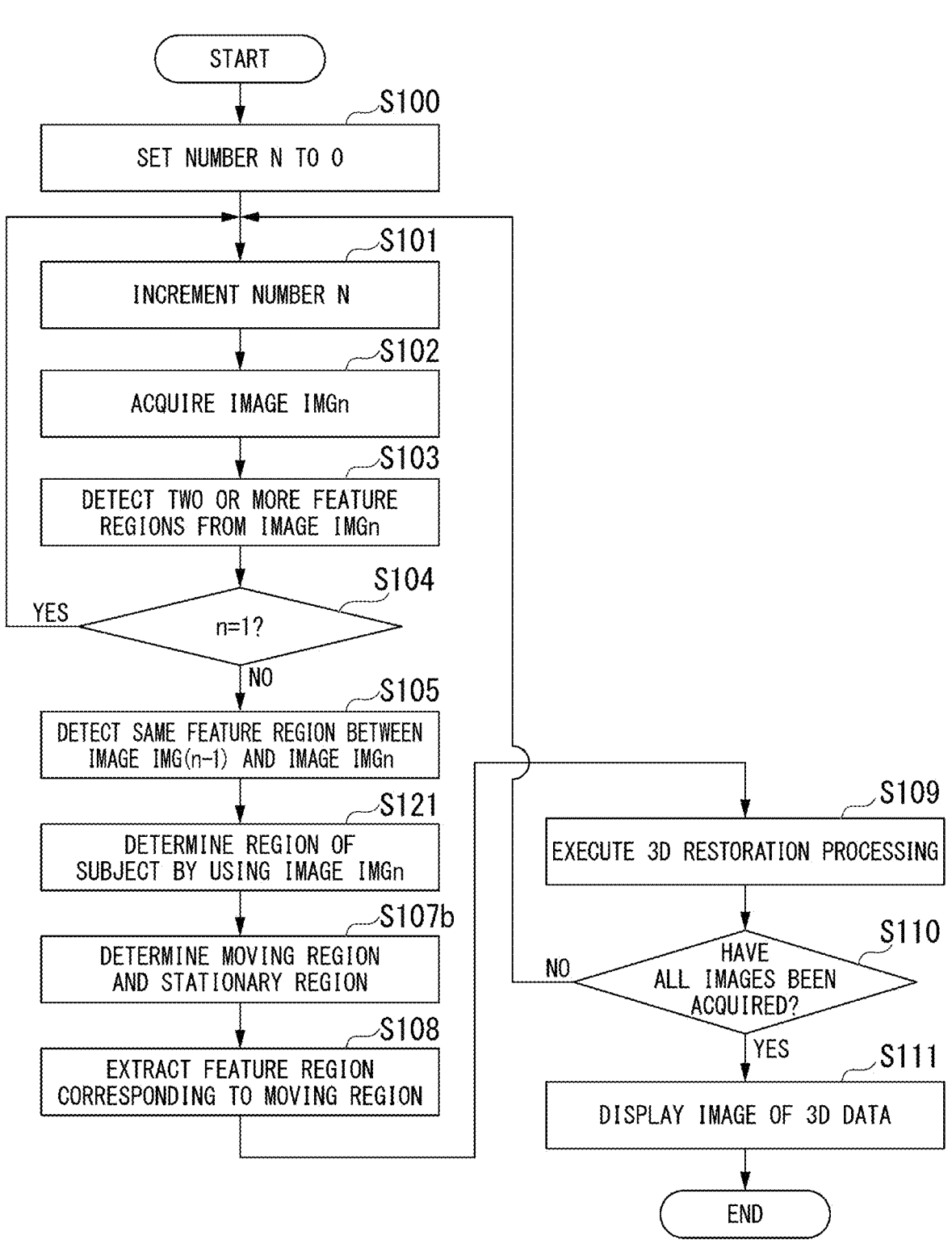
FIG. 19 is a flow chart showing a procedure of 3D data generation processing in a second modified example of the first embodiment of the present invention.

Processing executed by the endoscope device 1 will be described by using FIG. 19. FIG. 19 shows a procedure of 3D data generation processing executed by the endoscope device 1. The same processing as that shown in FIG. 7 will not be described.

After Step S105, the region determination unit 183 applies an image recognition technique to an image IMGn and determines a region of a subject in the image IMGn (Step S121).

The region determination unit 183 executes the following processing in Step S121. The region determination unit 183 processes the image IMGn and detects a rotor blade, a stator blade, a shroud, or the like seen in the image IMGn. The region determination unit 183 may use known machine learning as the image recognition technique. The region determination unit 183 may use a method that does not use the machine learning. A method of determining a region in an image may be any method.

An example in which the region determination unit 183 uses the machine learning will be described. A user gives a name of an object to a specific region in an image acquired in a previously performed inspection. The image is a still image or a frame of a video. Before the processing shown in FIG. 19 is executed, the region determination unit 183 learns the name given by the user as answer data. The answer data are also called teacher data. The region determination unit 183 analyzes features of an image used for learning by using the answer data and generates a learned model. When an inspection of a rotor blade of a turbine is performed, the rotor blade rotates and a stator blade or a shroud is fixed. The region determination unit 183 analyzes features related to movement of each object.

An external device may execute the above-described processing and may generate a learned model. The external device is the PC 41, a cloud server, or the like. The endoscope device 1 may acquire the learned model from the external device.

After the learned model is generated, the region determination unit 183 determines an object seen in an image used for evaluation by using the learned model in Step S121.

An example in which the region determination unit 183 does not use the machine learning will be described. The region determination unit 183 calculates a uniquely designed image feature. The region determination unit 183 executes clustering using the image feature and determines an object seen in an image. The region determination unit 183 can apply a technique such as support vector machine to the clustering.

After Step S121, the region determination unit 183 refers to information of the region detected in Step S121. The region determination unit 183 determines a feature region of a rotor blade in the image IMGn as a moving region and determines a feature region of a stator blade or a shroud in the image IMGn as a stationary region (Step S107b). After Step S107b, Step S108 is executed.

Figure 20A:
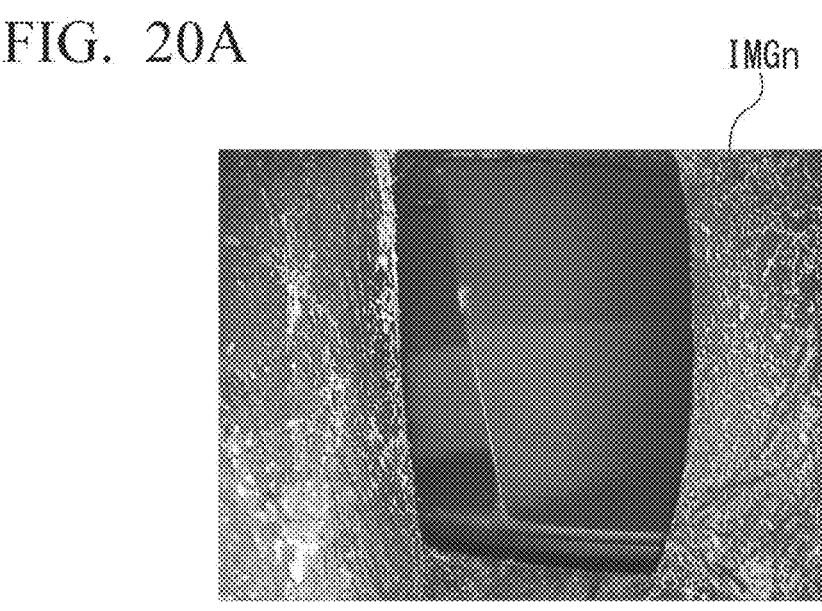
FIG. 20A is a diagram showing an example of an image in the second modified example of the first embodiment of the present invention.
Figure 20B:
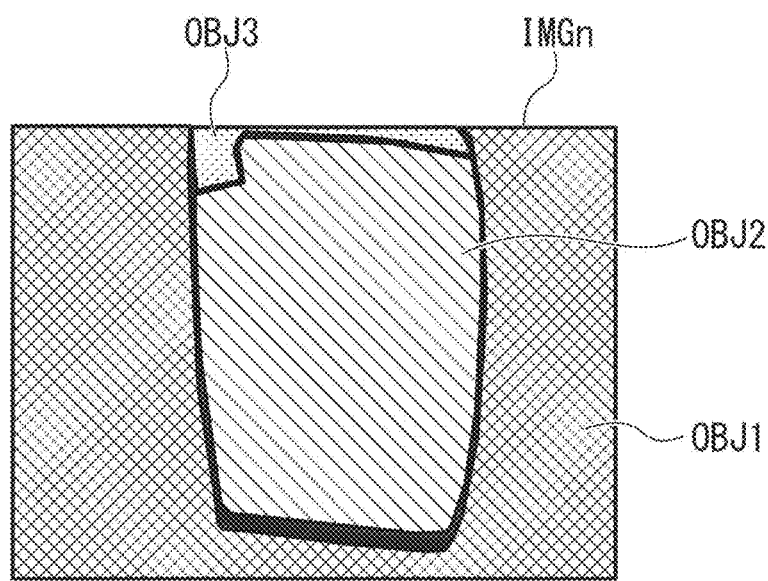
FIG. 20B is a diagram showing an example of a moving region and a stationary region in the second modified example of the first embodiment of the present invention.

Details of Step S121 and S107b will be described by using FIG. 20A and FIG. 20B. FIG. 20A shows an image IMGn generated by the imaging device 28. FIG. 20B shows a moving region and a stationary region in the image IMGn.

The region determination unit 183 analyzes the image IMGn in Step S121 and detects an object OBJ1, an object OBJ2, and an object OBJ3. A number is given to each object in accordance with the features of each object. For example, a number 1 is given to the object OBJ1, a number 2 is given to the object OBJ2, and a number 3 is given to the object OBJ3. When the types of two or more objects are the same or similar to each other, similar numbers may be given to the two or more objects. In the example shown in FIG. 21, a similar number 2-1, 2-2, or the like is given to the object OBJ2. The region determination unit 183 refers to object information and acquires a name of each object.

The object information includes the number of an object and the name of the object. FIG. 21 shows an example of the object information. The number and the name are associated with each other in the object information. The name indicates a name of an object having features corresponding to the number.

A stator blade is associated with the number 1 of the object OBJ1 in the object information. Therefore, the region determination unit 183 determines that the name of the object OBJ1 is the stator blade. A rotor blade is associated with the number 2 of the object OBJ2 in the object information. Therefore, the region determination unit 183 determines that the name of the object OBJ2 is the rotor blade. A shroud is associated with the number 3 of the object OBJ3 in the object information. Therefore, the region determination unit 183 determines that the name of the object OBJ3 is the shroud.

The region determination unit 183 determines that the feature region of the object OBJ2 is a moving region in Step S107b. In addition, the region determination unit 183 determines that the feature region of the object OBJ1 and the feature region of the object OBJ3 are stationary regions in Step S107b.

Step S121 may be executed at any timing between a timing at which Step S102 is executed and a timing at which Step S107b is executed.

Figure 22:
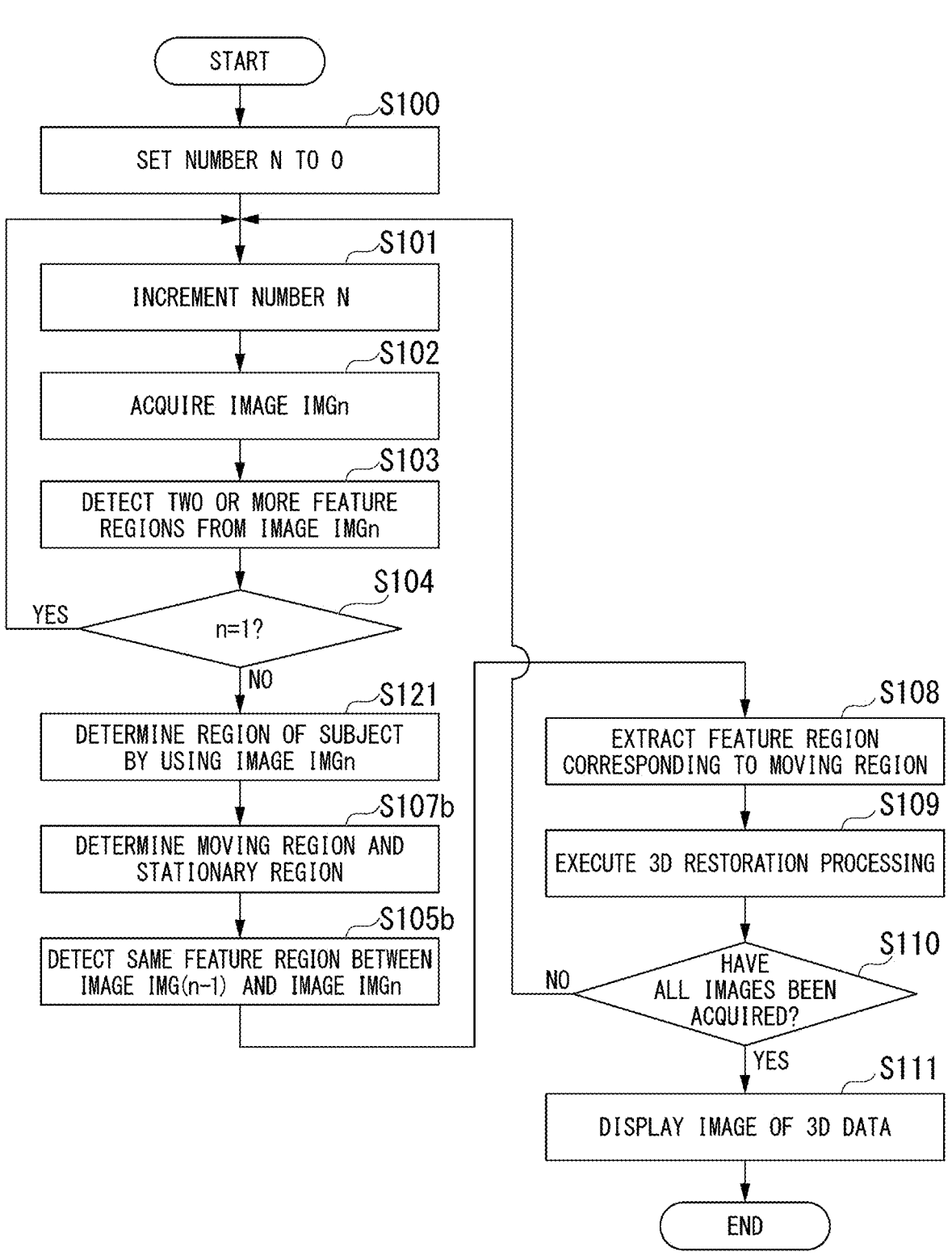
FIG. 22 is a flow chart showing a procedure of processing executed by an endoscope device according to the second modified example of the first embodiment of the present invention.

The order of Step S105, Step S121, and Step S107b is not limited to that shown in FIG. 19. A modified example of processing executed by the endoscope device 1 will be described by using FIG. 22. FIG. 22 shows a procedure of 3D data generation processing executed by the endoscope device 1. The same processing as that shown in FIG. 19 will not be described.

When the control unit 180 determines that the number n is not 1 in Step S104, the region determination unit 183 determines a region of a subject in an image IMGn in Step S121. After Step S121, the region determination unit 183 determines a feature region of a rotor state in the image IMGn as a moving region in Step S107b. In addition, the region determination unit 183 determines a feature region of a stator blade or a shroud in the image IMGn as a stationary region in Step S107b. At this time, a feature region of the image IMGn and a feature region of an image IMG(n–1) have not been associated with each other.

After Step S107b, the region detection unit 182 detects the same feature regions (correspondence regions) in the image IMG(n–1) and the image IMGn. At this time, the region detection unit 182 uses information of feature regions determined to be moving regions in Step S107b but does not use information of feature regions determined to be stationary regions in Step S107b (Step S105b). After Step S105b, Step S108 is executed.

Each aspect of the present invention may include the following modified example. The CPU 18 determines a subject seen in one image included in two or more images, thus determining whether at least part of a region in each of the two or more images is a change region (moving region) or a non-change region (stationary region) in the region determination step (Step S107b).

Each aspect of the present invention may include the following modified example. After the CPU 18 determines whether the at least part of the region in the two or more images is the change region or the non-change region in the region determination step (Step S107b), the CPU 18 detects two or more correspondence regions by using the change region without using the non-change region in the region detection step (Step S105b).

In the second modified example of the first embodiment, the endoscope device 1 can determine a moving region and a stationary region by determining a type of subject in an image.

Second Embodiment

A second embodiment of the present invention will be described. When an inspection is being performed, the endoscope device 1 generates an image and generates 3D data of a subject. In other words, the endoscope device 1 simultaneously executes generation of an image and generation of 3D data. In order to avoid a failure in the 3D restoration processing and facilitate an efficient inspection, the endoscope device 1 offers various assistance functions.

Figure 23:
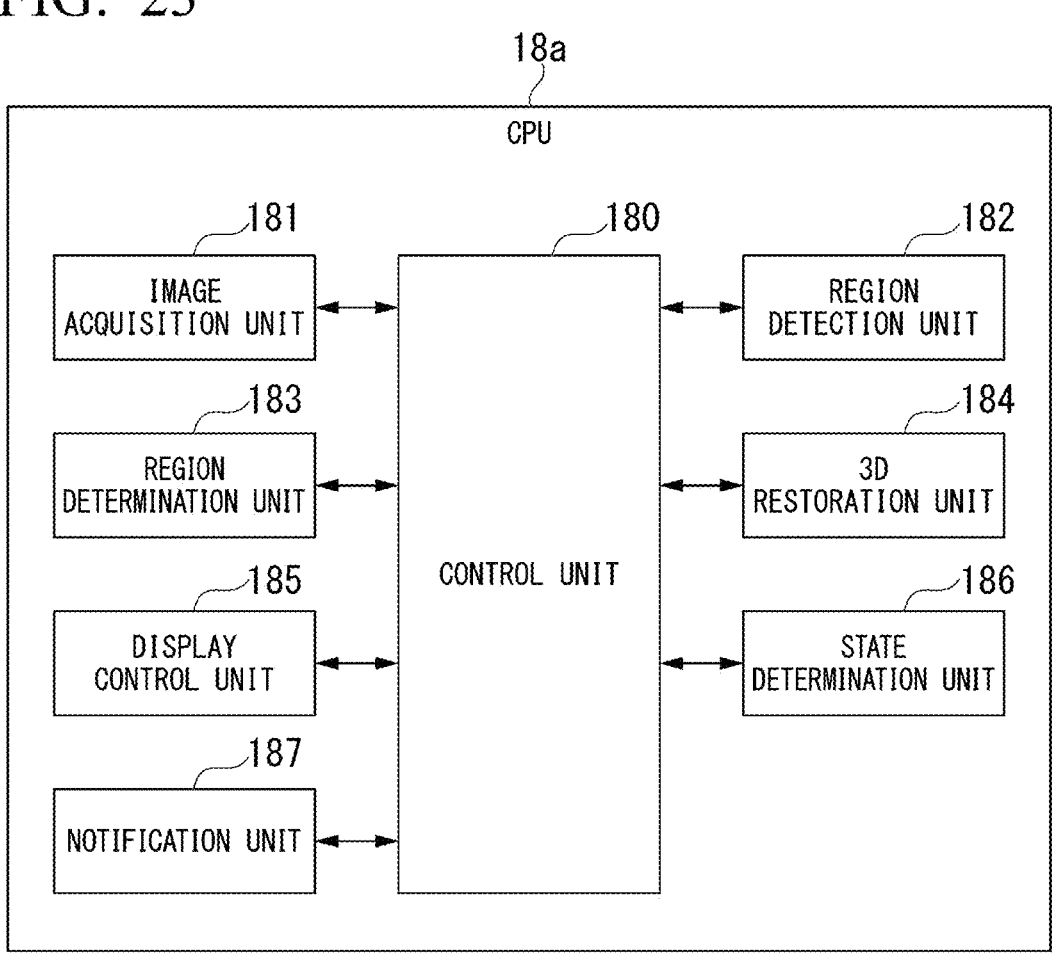
FIG. 23 is a block diagram showing a functional configuration of a CPU included in an endoscope device according to a second embodiment of the present invention.

The CPU 18 shown in FIG. 6 is changed to a CPU 18a shown in FIG. 23. FIG. 23 shows a configuration of the CPU 18a. The same configuration as that shown in FIG. 6 will not be described.

The CPU 18a functions as a control unit 180, an image acquisition unit 181, a region detection unit 182, a region determination unit 183, a 3D restoration unit 184, a display control unit 185, a state determination unit 186, and a notification unit 187. At least one of the blocks shown in FIG. 23 may be constituted by a different circuit from the CPU 18a.

Each unit of the CPU 18a may be constituted by at least one of a processor and a logic circuit. Each unit of the CPU 18a may include one or a plurality of processors. Each unit of the CPU 18a may include one or a plurality of logic circuits.

The state determination unit 186 determines a state of an inspection. For example, the state of the inspection is indicated by the quality of an image generated by the imaging device 28, the area of a stationary region seen in the image, movement of the camera, or the progress of observation of a subject. The state determination unit 186 generates inspection state information regarding the state of the inspection.

The notification unit 187 executes notification processing of notifying a user of the inspection state information. For example, the notification unit 187 generates a graphic image signal corresponding to the inspection state information. The notification unit 187 outputs the graphic image signal to the video-signal-processing circuit 12. Similar processing to that described above is executed, and the display unit 5 displays a message including the inspection state information. By doing this, the notification unit 187 displays the inspection state information on the display unit 5.

The notification unit 187 may output sound data to a speaker and may cause the speaker to generate a sound corresponding to the inspection state information. The notification unit 187 may output a control signal indicating a pattern of vibration to a vibration generator and may cause the vibration generator to generate vibration having the pattern corresponding to the inspection state information. The notification unit 187 may output a control signal indicating a pattern of light emission to a light source and may cause the light source to generate light having the pattern corresponding to the inspection state information.

Hereinafter, an example in which the display unit 5 displays a message including the inspection state information will be described. In this case, the display control unit 185 may function as the notification unit 187.

Figure 24:
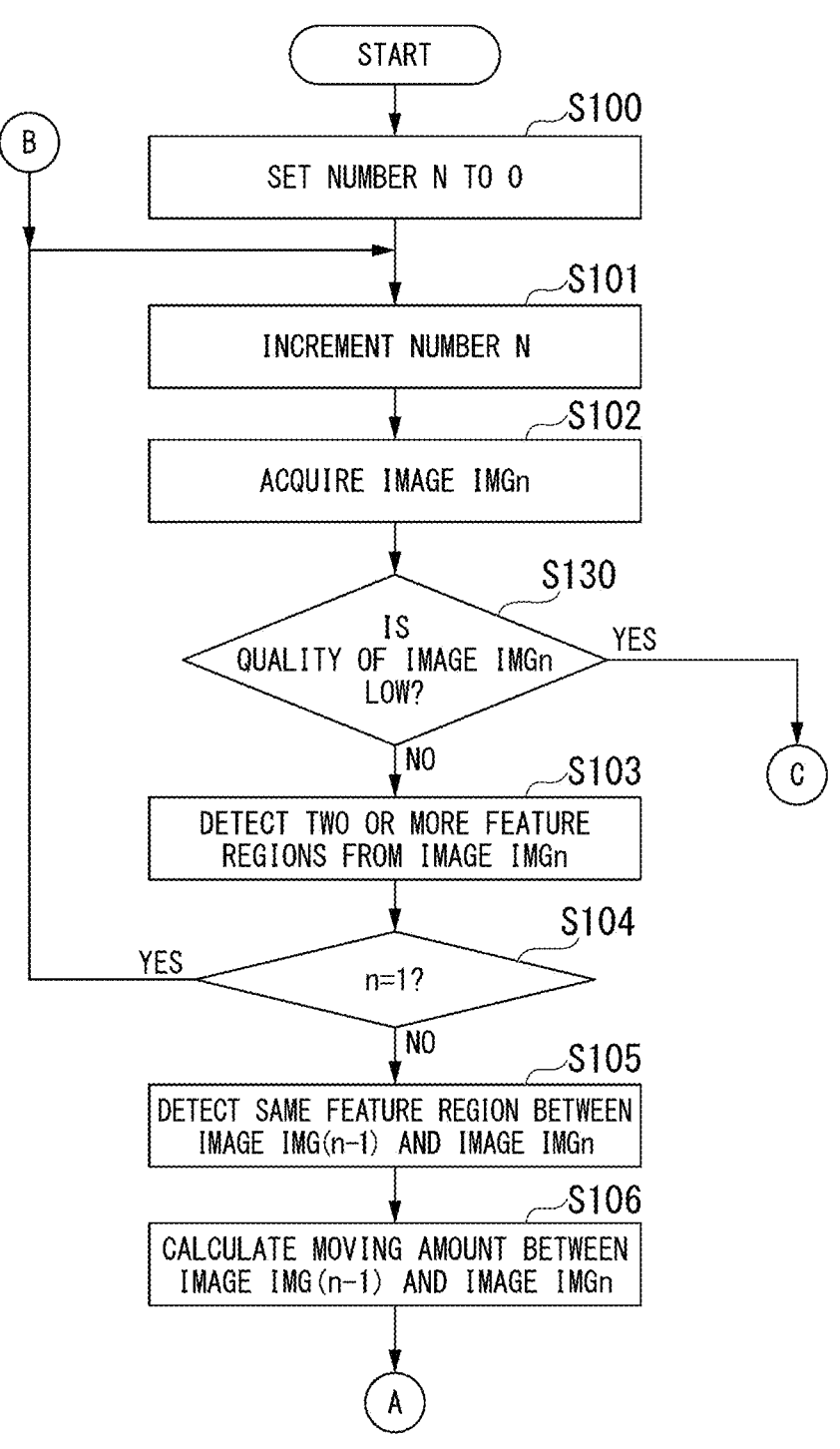
FIG. 24 is a flow chart showing a procedure of 3D data generation processing in the second embodiment of the present invention.
Figure 25:
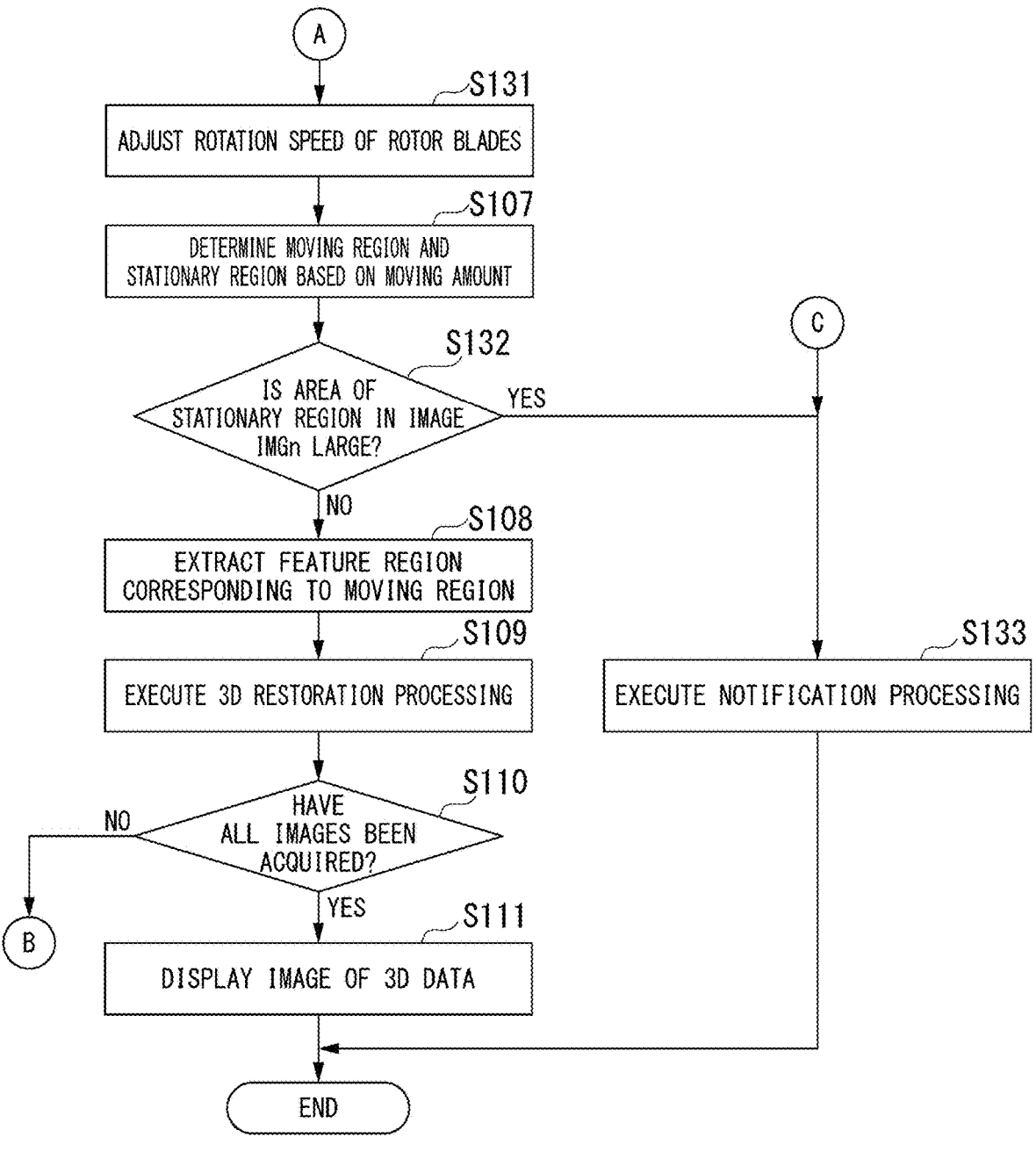
FIG. 25 is a flow chart showing a procedure of 3D data generation processing in the second embodiment of the present invention.

A first example of processing executed by the endoscope device 1 will be described by using FIG. 24 and FIG. 25. FIG. 24 and FIG. 25 show a procedure of 3D data generation processing executed by the endoscope device 1. The same processing as that shown in FIG. 7 will not be described.

For example, a user inputs an instruction to start the 3D data generation processing into the endoscope device 1 by operating the operation unit 4. In a case in which the display unit 5 is constituted as a touch panel, the user inputs the instruction into the endoscope device 1 by touching the display of the display unit 5. The control unit 180 accepts the instruction and starts the 3D data generation processing.

The control unit 180 may start the 3D data generation processing when a subject seen in an image generated by the imaging device 28 is determined to be stationary for a predetermined period of time. Alternatively, the control unit 180 may start the 3D data generation processing when the composition of photography for acquiring the image matches a predetermined composition. For example, the control unit 180 may check whether the present composition matches the previous composition by using an inspection image acquired in photography performed in a previous inspection. A user may perform work to match the composition of photography with the predetermined composition or to check the composition of photography by manually performing an operation. When the 3D data generation processing is started, the control unit 180 may transmit control information to the turning tool 43 and may cause the turning tool 43 to start rotation.

After Step S102, the state determination unit 186 determines the quality of an image IMGn (Step S130).

For example, when halation has occurred in the image IMGn or the image IMGn is dark, it is difficult to execute the 3D restoration processing. Also, when there are few patterns on a subject seen in the image IMGn, it is difficult to execute the 3D restoration processing. Also, when blades rotate fast, it is difficult to execute the 3D restoration processing due to the motion blur. When these factors occur, the state determination unit 186 determines that the quality of the image IMGn is low. When these factors do not occur, the state determination unit 186 determines that the quality of the image IMGn is high.

When the state determination unit 186 determines that the quality of the image IMGn is high in Step S130, Step S103 is executed. When the state determination unit 186 determines that the quality of the image IMGn is low in Step S130, the state determination unit 186 generates inspection state information indicating that the quality of the image is low or it is difficult to execute the 3D restoration processing. The notification unit 187 executes the notification processing and displays the inspection state information on the display unit 5 (Step S133). The inspection state information functions as an alert. The inspection state information may include information that encourages a user to change the composition of photography, a setting condition of an image, or the like.

When Step S133 is executed, the control unit 180 may transmit control information to stop the turning tool 43 to the turning tool 43. The turning tool 43 may stop rotation of rotor blades based on the control information. When Step S133 is executed, the 3D data generation processing is completed.

After Step S106, the control unit 180 adjusts the rotation speed of rotor blades based on the moving amount calculated in Step S106 (Step S131). After Step S131, Step S107 is executed.

The control unit 180 executes the following processing in Step S131. The control unit 180 calculates the difference between the moving amount calculated in Step S106 and a target amount of movement. The target amount of movement is set in advance. When the difference is greater than a predetermined value, the control unit 180 transmits control information to reduce the rotation speed of the rotor blades to the turning tool 43. The turning tool 43 reduces the rotation speed of the rotor blades based on the control information.

When the distal end 20 of the insertion unit 2 is near a subject, the subject moves fast in an image generated by the imaging device 28. Therefore, the endoscope device 1 needs to reduce the rotation speed of the rotor blades. Since the rotation speed of the rotor blades is controlled based on the calculated moving amount, the endoscope device 1 can suppress an influence on an inspection caused by the composition in observation.

After Step S106, Step S107 may be executed without executing Step S131.

After Step S107, the state determination unit 186 determines whether the area of a stationary region in the image IMGn is large (Step S132).

The state determination unit 186 executes the following processing in Step S132. For example, the state determination unit 186 calculates the number of pixels of a stationary region in the image IMGn. The state determination unit 186 compares the calculated number of pixels with a predetermined value. When the number of pixels is larger than the predetermined value, the state determination unit 186 determines that the area of a stationary region is large. When the number of pixels is less than or equal to the predetermined value, the state determination unit 186 determines that the area of a stationary region is small. The predetermined value is set in advance. The predetermined value may be variable.

Figure 26A:
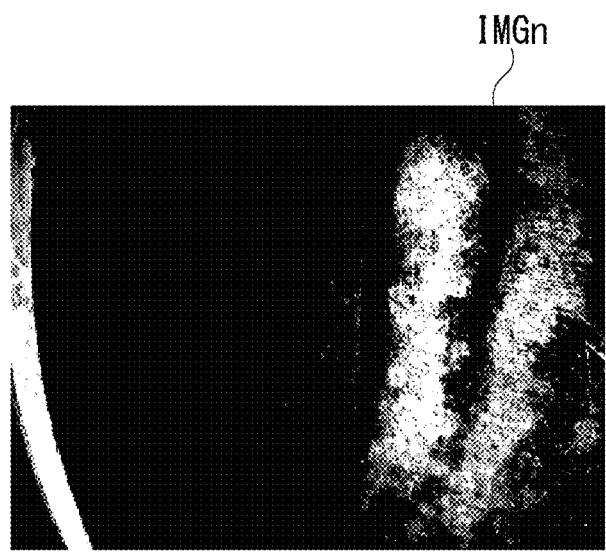
FIG. 26A is a diagram showing an example of an image in the second embodiment of the present invention.
Figure 26B:
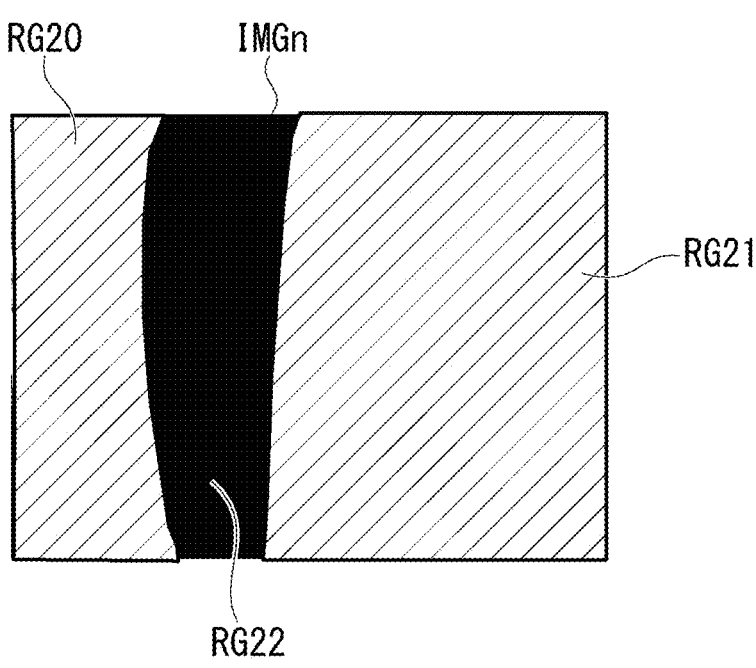
FIG. 26B is a diagram showing an example of processing of determining the size of a stationary region in the second embodiment of the present invention.

An example of Step S132 will be described by using FIG. 26A and FIG. 26B. FIG. 26A shows an image IMGn generated by the imaging device 28. FIG. 26B shows a moving region and a stationary region in the image IMGn.

The image IMGn includes a stationary region RG20, a stationary region RG21, and a moving region RG22. The ratio of the moving region RG22 to the entire image IMGn is small. In this case, it is highly probable that the endoscope device 1 fails in the 3D restoration processing.

When the state determination unit 186 determines that the area of a stationary region is small in Step S132, Step S108 is executed. When the state determination unit 186 determines that the area of a stationary region is large in Step S132, the state determination unit 186 generates, in Step S133, inspection state information indicating that it is difficult to execute the 3D restoration processing. The notification unit 187 executes the notification processing and displays the inspection state information on the display unit 5 in Step S133. The inspection state information functions as an alert. The inspection state information may include information that encourages a user to change the composition of photography.

When the number n is 2, Step S132 is executed for the first time. At this time, Step S109 has not been executed yet. When the state determination unit 186 determines that the area of the stationary region is large in Step S132, Step S133 is executed as described above and the 3D data generation processing is completed. At this time, the control unit 180 may cause the turning tool 43 to stop rotation of the rotor blades.

On the other hand, after Step S132 is executed once or more, Step S132 may be executed again and the state determination unit 186 may determine that the area of the stationary region is large. This means a situation in which the stationary region expands in the process of the 3D data generation processing. When a user stops the rotation of the rotor blades in order to change the position of the distal end 20 of the insertion unit 2, the stationary region expands. A condition under which the rotation of the rotor blades stops is not limited to the generation of an instruction from a user. For example, the endoscope device 1 may automatically stop the rotation of the rotor blades. A condition under which the rotation of the rotor blades stops is not limited to the above-described examples.

A situation in which the stationary region expands will be described. There is a case in which an inspection of a large rotor blade is performed. Such a large rotor blade is disposed in a compressor section or a turbine section on a low-pressure side in many cases. Only part of the rotor blade comes in the visual field of the camera. In this inspection, the position of the distal end 20 is changed and photography of the rotor blade is performed twice or more.

Details of an inspection of a large rotor blade will be described by using FIG. 27A, FIG. 27B, FIG. 28A, and FIG. 28B. Each drawing shows an observation position of eight rotor blades RT20.

Figure 27A:
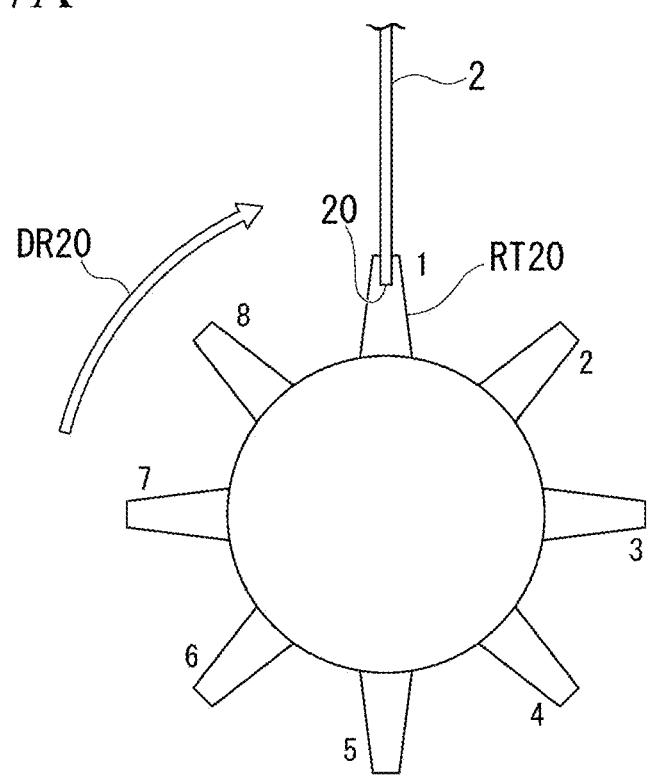
FIG. 27A is a diagram showing an observation position of rotor blades in the second embodiment of the present invention.
Figure 27B:
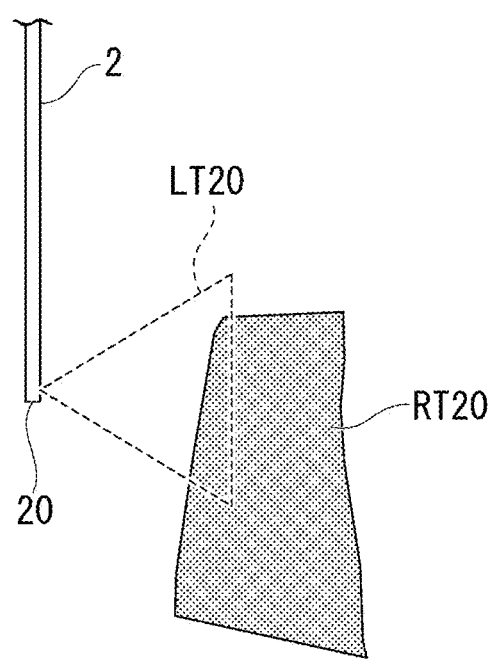
FIG. 27B is a diagram showing an observation position of rotor blades in the second embodiment of the present invention.

First, the distal end 20 is fixed at a position shown in FIG. 27A. At this time, illumination light LT20 is emitted to the upper part of the rotor blade RT20 as shown in FIG. 27B. The rotor blades rotate once in a direction DR20 in this state. At this time, the rotor blades rotate by 360 degrees or more. While the rotor blades rotate, Steps S101 to S110 are repeatedly executed.

After the rotor blades rotate once, the rotation of the rotor blades is stopped. The position of the distal end 20 is changed, and the distal end 20 is fixed at a position shown in FIG. 28A. At this time, illumination light LT20 is emitted to the lower part of the rotor blade RT20 as shown in FIG. 28B. The rotor blades rotate once in a direction DR20 in this state, and Steps S101 to S110 are repeatedly executed.

When the rotation of the rotor blades is stopped in order to change the position of the distal end 20, the entire subject seen in an image generated by the imaging device 28 comes to a standstill. Therefore, the state determination unit 186 determines that the area of a stationary region is large in Step S132. In this case, the endoscope device 1 may continue the 3D data generation processing. In other words, after Step S133 is executed, Step S110 may be executed. In this case, the endoscope device 1 stops Step S108 and Step S109 and continues Steps S101 to S107.

Figure 28A:
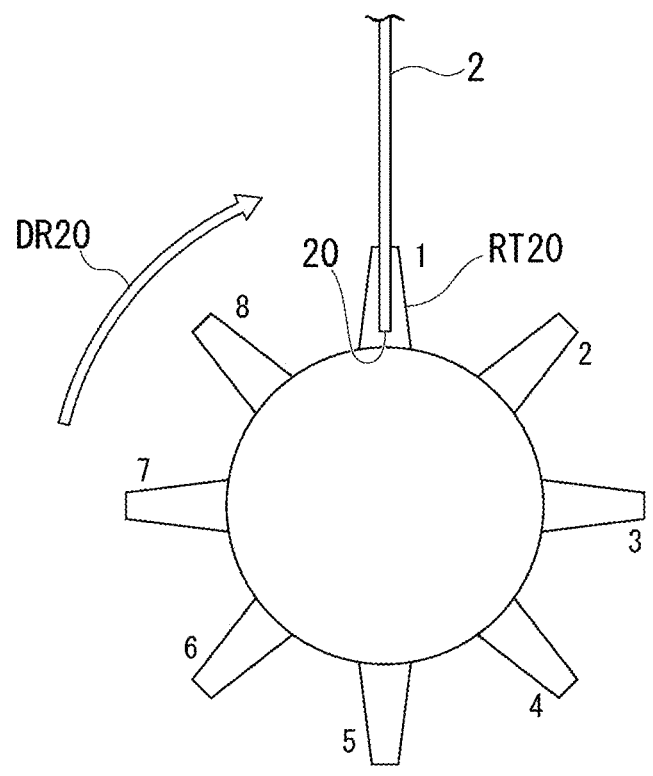
FIG. 28A is a diagram showing an observation position of the rotor blades in the second embodiment of the present invention.
Figure 28B:
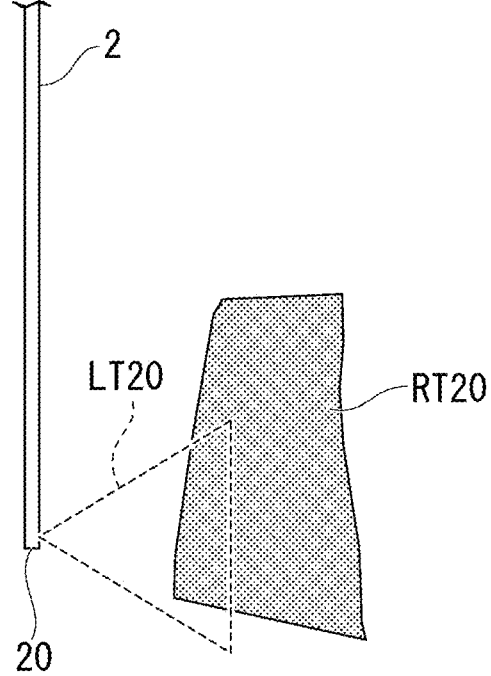
FIG. 28B is a diagram showing an observation position of the rotor blades in the second embodiment of the present invention.

While the distal end 20 moves from the position shown in FIG. 27A to the position shown in FIG. 28A, the entire subject seen in an image generated by the imaging device 28 moves. Therefore, the state determination unit 186 determines that the area of a stationary region is small in Step S132. In this case, the endoscope device 1 restarts Step S108 and Step S109 and continues Steps S101 to S110.

The distal end 20 reaches the position shown in FIG. 28A and is fixed. At this time, the entire subject seen in an image generated by the imaging device 28 comes to a standstill. Therefore, the state determination unit 186 determines that the area of a stationary region is large in Step S132. In this case, the endoscope device 1 may stop Step S108 and Step S109 and may continue Steps S101 to S107.

Thereafter, the rotation of the rotor blades is restarted. Therefore, the state determination unit 186 determines that the area of a stationary region is small in Step S132. In this case, the endoscope device 1 restarts Step S108 and Step S109 and continues Steps S101 to S110.

In an inspection of a large rotor blade, Steps S101 to S107 are repeatedly executed even when the rotation of the rotor blades is stopped. Due to this, the endoscope device 1 accumulates two or more images generated by the imaging device 28 and information of the same feature regions in the two or more images. When the rotation of the rotor blades is restarted and the 3D restoration processing in Step S109 is executed again, the 3D restoration unit 184 can restore a 3D shape of a subject by using the accumulated images and information. Therefore, the endoscope device 1 can generate a piece of 3D data indicating the entire 3D shapes of two or more rotor blades.

When the number n is two or more and the state determination unit 186 determines that the area of a stationary region is large in Step S132, the state determination unit 186 may generate inspection state information indicating that the rotation of the rotor blades is stopped in Step S133.

The state determination unit 186 may receive state information indicating a driving state of the turning tool 43 from the turning tool 43. The state determination unit 186 may monitor the state of the rotor blades based on the state information. The state information indicates whether the turning tool 43 is rotating the rotor blades. The state determination unit 186 may detect that the rotation of the rotor blade is stopped based on the state information and may generate inspection state information indicating that the rotation of the rotor blades is stopped in Step S133.

When an inspection of the entire regions of the rotor blades is completed and the state determination unit 186 determines that the area of a stationary region is large in Step S132, the endoscope device 1 may execute Step S133 and may complete the 3D data generation processing. The endoscope device 1 may use a method of detecting that a subject observed in an inspection in progress has been observed again as a method of detecting that the inspection of the entire regions of the rotor blades is completed. Such a method will be described later in a third example.

A user may input information indicating that the inspection of the entire regions of the rotor blades is completed into the endoscope device 1 by operating the operation unit 4. In a case in which the display unit 5 is constituted as a touch panel, the user may input the information into the endoscope device 1 by touching the display of the display unit 5. The state determination unit 186 may detect that the inspection is completed based on the information.

Figure 29:
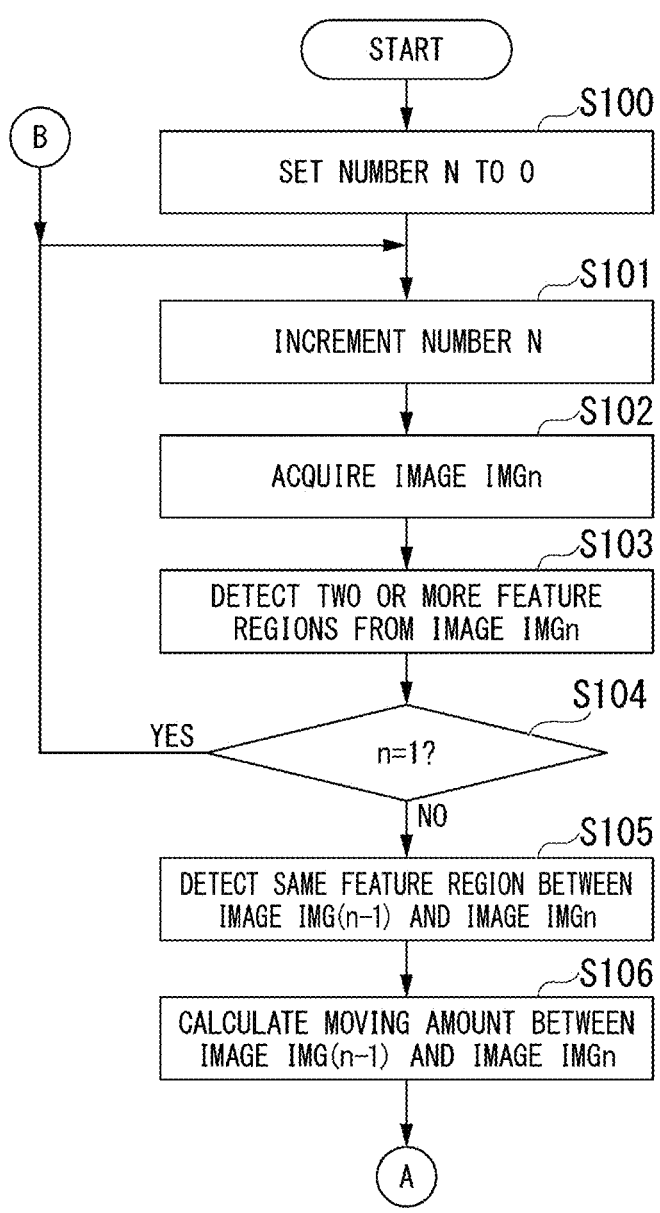
FIG. 29 is a flow chart showing a procedure of 3D data generation processing in the second embodiment of the present invention.
Figure 30:
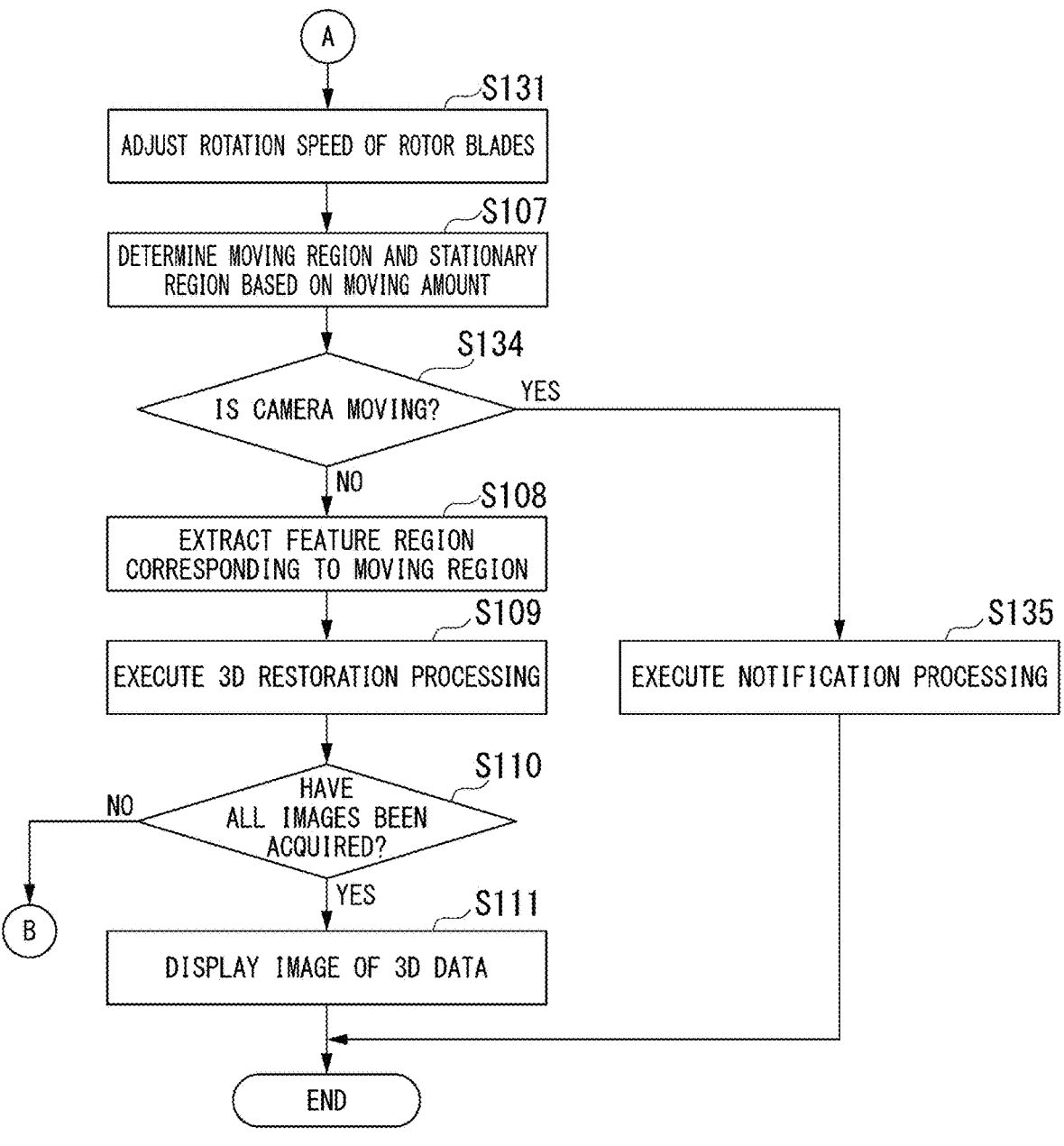
FIG. 30 is a flow chart showing a procedure of 3D data generation processing in the second embodiment of the present invention.

A second example of processing executed by the endoscope device 1 will be described by using FIG. 29 and FIG. 30. FIG. 29 and FIG. 30 show a procedure of 3D data generation processing executed by the endoscope device 1. The same processing as that shown in FIG. 7 will not be described.

After Step S106, Step S131 is executed. Step S131 shown in FIG. 30 is the same as that shown in FIG. 25. After Step S131, Step S107 is executed. After Step S106, Step S107 may be executed without executing Step S131.

After Step S107, the state determination unit 186 determines movement of the camera (Step S134).

The state determination unit 186 executes the following processing in Step S134. For example, the state determination unit 186 determines the movement of the camera by analyzing an image IMGn. In a case in which an inertial measurement unit (IMU) that determines an acceleration and an angular velocity of the distal end 20 of the insertion unit 2 is disposed in the distal end 20, the state determination unit 186 may determine the movement of the camera based on a value measured by the IMU. When the amount of the movement of the camera is very small, the state determination unit 186 may determine that the camera is not moving.

When the state determination unit 186 determines that the camera is not moving in Step S134, Step S108 is executed. When the state determination unit 186 determines that the camera is moving in Step S134, the state determination unit 186 generates inspection state information indicating that the camera is moving. The notification unit 187 executes the notification processing and displays the inspection state information on the display unit 5 (Step S135). The inspection state information functions as an alert.

When Step S135 is executed, the control unit 180 may transmit control information to stop the turning tool 43 to the turning tool 43. The turning tool 43 may stop rotation of rotor blades based on the control information. When Step S135 is executed, the 3D data generation processing is completed.

As described above, there is a case in which the position of the distal end 20 is changed and photography of a rotor blade is performed twice or more in order to perform an inspection of a large rotor blade. When the distal end 20 is moving, the state determination unit 186 determines that the camera is moving in Step S134. In this case, the endoscope device 1 may continue the 3D data generation processing. In other words, after Step S135 is executed, Step S110 may be executed. In this case, the endoscope device 1 stops Step S108 and Step S109 and continues Steps S101 to S107.

When an inspection of the entire regions of the rotor blades is completed and the state determination unit 186 determines that the camera is moving in Step S134, the endoscope device 1 may execute Step S135 and may complete the 3D data generation processing. The endoscope device 1 may use a method of detecting that a subject has been observed again in an inspection in progress as a method of detecting that the inspection of the entire regions of the rotor blades is completed. Such a method will be described later in a third example.

As described above, a user may input information indicating that the inspection of the entire regions of the rotor blades is completed into the endoscope device 1 by operating the operation unit 4 or the touch panel. The state determination unit 186 may detect that the inspection is completed based on the information.

Figure 31:
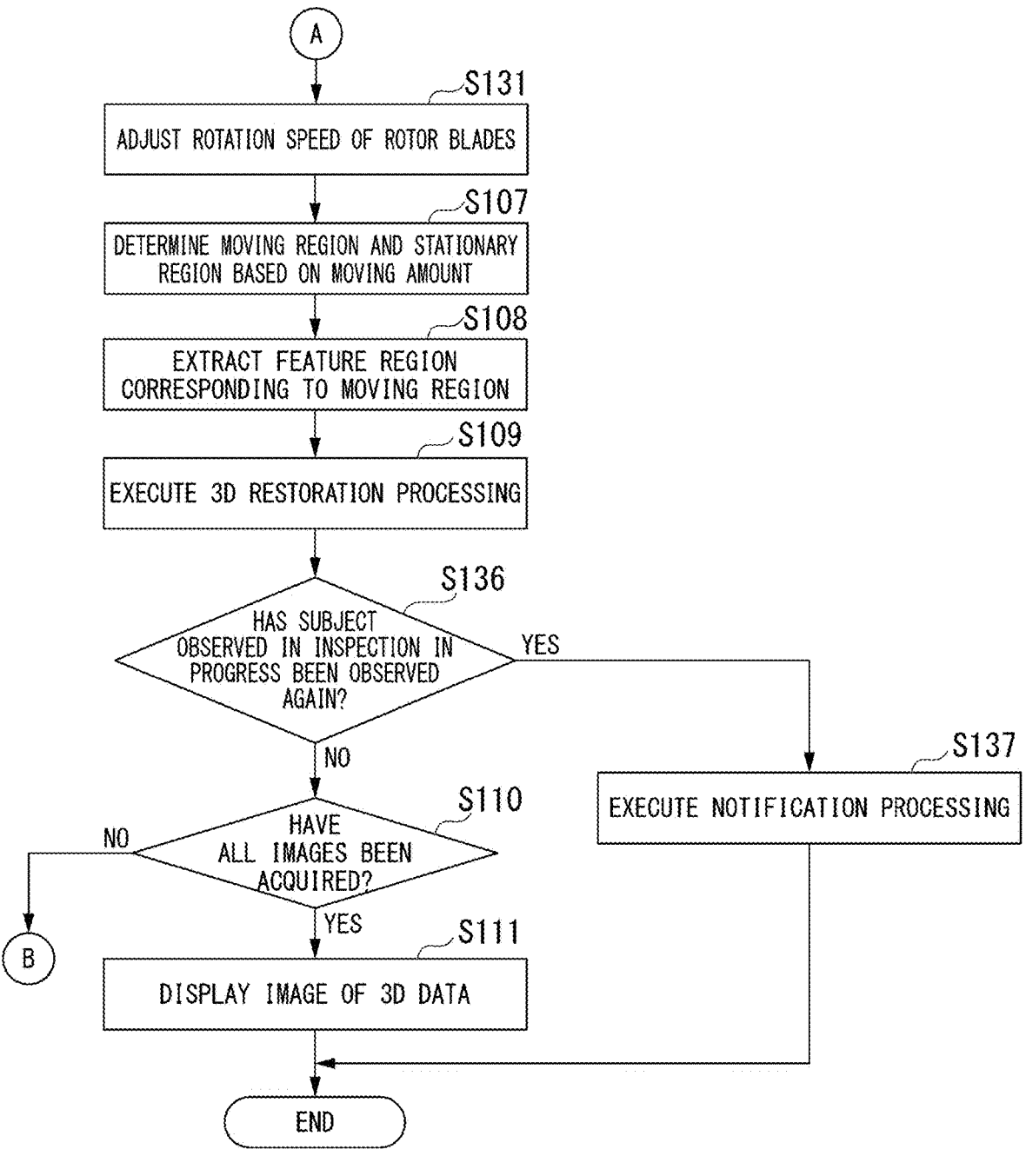
FIG. 31 is a flow chart showing a procedure of 3D data generation processing in the second embodiment of the present invention.

A third example of processing executed by the endoscope device 1 will be described by using FIG. 29 and FIG. 31. FIG. 29 and FIG. 31 show a procedure of 3D data generation processing executed by the endoscope device 1. The same processing as that shown in FIG. 7 will not be described.

After Step S106, Step S131 is executed. Step S131 shown in FIG. 31 is the same as that shown in FIG. 25. After Step S131, Step S107 is executed. After Step S106, Step S107 may be executed without executing Step S131.

After Step S109, the state determination unit 186 determines whether a subject has been observed again in an inspection in progress (Step S136). When rotor blades have rotated once, a subject having already been observed is observed again.

The state determination unit 186 executes the following processing in Step S136. For example, the state determination unit 186 receives state information indicating a driving state of the turning tool 43 from the turning tool 43. The state determination unit 186 monitors the state of rotor blades based on the state information. The state information indicates the rotation angle of the rotor blades. When the rotation angle of the rotor blades is less than 360 degrees, the state determination unit 186 determines that the subject has not been observed again. When the rotation angle of the rotor blades is greater than or equal to 360 degrees, the state determination unit 186 determines that the subject has been observed again.

Alternatively, the state determination unit 186 analyzes an image generated by the imaging device 28 and determines whether a subject having a similar feature to that of a subject having already been observed is seen in the image. When the subject having the feature is not seen in the image, the state determination unit 186 determines that the subject has not been observed again. When the subject having the feature is seen in the image, the state determination unit 186 determines that the subject has been observed again.

Alternatively, the state determination unit 186 analyzes an image generated by the imaging device 28 and recognizes a rotor blade seen in the image. The state determination unit 186 counts the number of recognized rotor blades. The number (number in design) of rotor blades fixed on the circumference of the disk is known. The state determination unit 186 determines whether the number of recognized rotor blades has reached the number in design. When the number of recognized rotor blades has not reached the number in design, the state determination unit 186 determines that the subject has not been observed again. When the number of recognized rotor blades has reached the number in design, the state determination unit 186 determines that the subject has been observed again.

When the state determination unit 186 determines that the subject has not been observed again in Step S136, Step S110 is executed. When the state determination unit 186 determines that the subject has been observed again in Step S136, the state determination unit 186 generates inspection state information indicating that the subject has been observed again. The notification unit 187 executes the notification processing and displays the inspection state information on the display unit 5 (Step S137). The inspection state information functions as an alert. The inspection state information may include information that encourages a user to complete the inspection. As described above, in a case in which the position of the distal end 20 is changed and photography of a rotor blade is performed twice or more in order to perform an inspection of a large rotor blade, the inspection state information may include information that encourages a user to change the position of the distal end 20.

When Step S137 is executed, the control unit 180 may transmit control information to stop the turning tool 43 to the turning tool 43. The turning tool 43 may stop rotation of rotor blades based on the control information. When Step S137 is executed, the 3D data generation processing is completed.

In the first to third examples, Step S106 and Step S107 may be changed to Step S120 and Step S107a shown in FIG. 16, respectively. In the first to third examples, Step S106 and Step S107 may be changed to Step S121 and Step S107b shown in FIG. 19, respectively.

Each aspect of the present invention may include the following modified example. The CPU 18 determines the position of the insertion unit 2 inside a turbine in a position determination step (Step S134). When the position of the insertion unit 2 has changed, the CPU 18 executes processing of notifying a user of information indicating a change of the position of the insertion unit 2 in a notification step (Step S135).

Each aspect of the present invention may include the following modified example. Before the CPU 18 executes the data generation step (Step S109) for the first time, the CPU 18 calculates the area of a non-change region (stationary region) in an image included in two or more images of a component inside a turbine in a calculation step (Step S132). When the area is larger than a predetermined value, the CPU 18 executes processing of notifying a user of an alert in a notification step (Step S133).

Each aspect of the present invention may include the following modified example. A first object (rotor blade) rotates inside the turbine due to a driving force generated by the turning tool 43 (driving device). The CPU 18 determines whether the first object has rotated once inside the turbine in a rotation determination step (Step S136). When the CPU 18 determines that the first object has rotated once inside the turbine, the CPU 18 executes processing of notifying a user of information indicating that the first object has rotated once inside the turbine in a notification step (Step S137).

Each aspect of the present invention may include the following modified example. A first object (rotor blade) rotates inside the turbine due to a driving force generated by the turning tool 43 (driving device). While the first object rotates, the CPU 18 repeatedly executes the region detection step (Step S105), the region determination step (Step S107), and the data generation step (Step S109). When the rotation of the first object is stopped, the CPU 18 stops execution of the data generation step and continues execution of the region detection step and the region determination step.

Each aspect of the present invention may include the following modified example. When the first object (rotor blade) starts to rotate again, the CPU 18 restarts the data generation step (Step S109).

Each aspect of the present invention may include the following modified example. The CPU 18 determines a rotation state of the first object (rotor blade) by using an image included in two or more images of a component inside a turbine.

Each aspect of the present invention may include the following modified example. The CPU 18 determines a rotation state of the first object (rotor blade) by monitoring the state of the turning tool 43 (driving device).

In the second embodiment, the endoscope device 1 notifies a user of inspection state information regarding the state of an inspection. Therefore, the endoscope device 1 can avoid the failure in the 3D restoration processing and can facilitate an efficient inspection.

Third Embodiment

A third embodiment of the present invention will be described. In the third embodiment, the endoscope device 1 shown in FIG. 1 and FIG. 2 is used. In the first embodiment and the second embodiment, the endoscope device 1 uses a single-eye optical adaptor. On the other hand, in the third embodiment, the endoscope device 1 uses a stereo optical adaptor, which is an example of an optical adaptor used for measurement.

Figure 32:
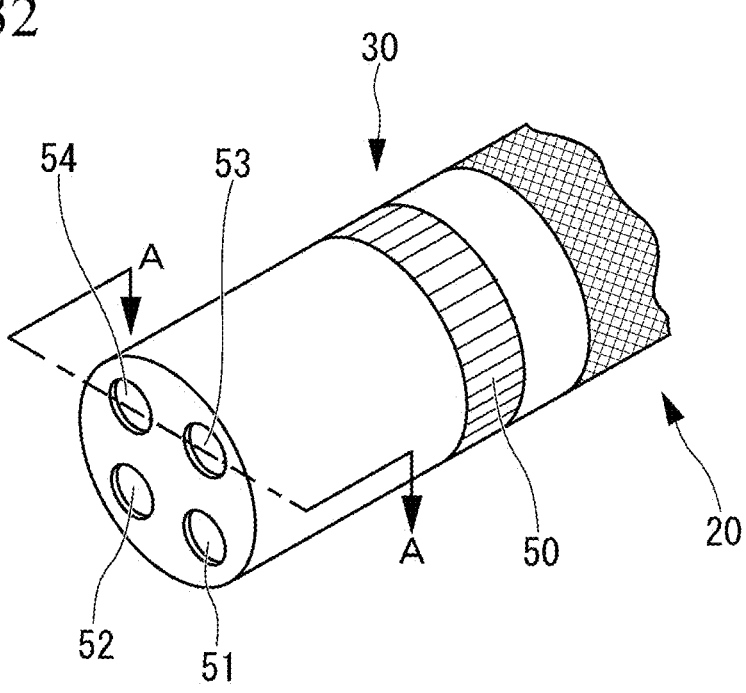
FIG. 32 is a perspective view of a distal end of an insertion unit and a stereo optical adaptor in an endoscope device according to a third embodiment of the present invention.
Figure 33:
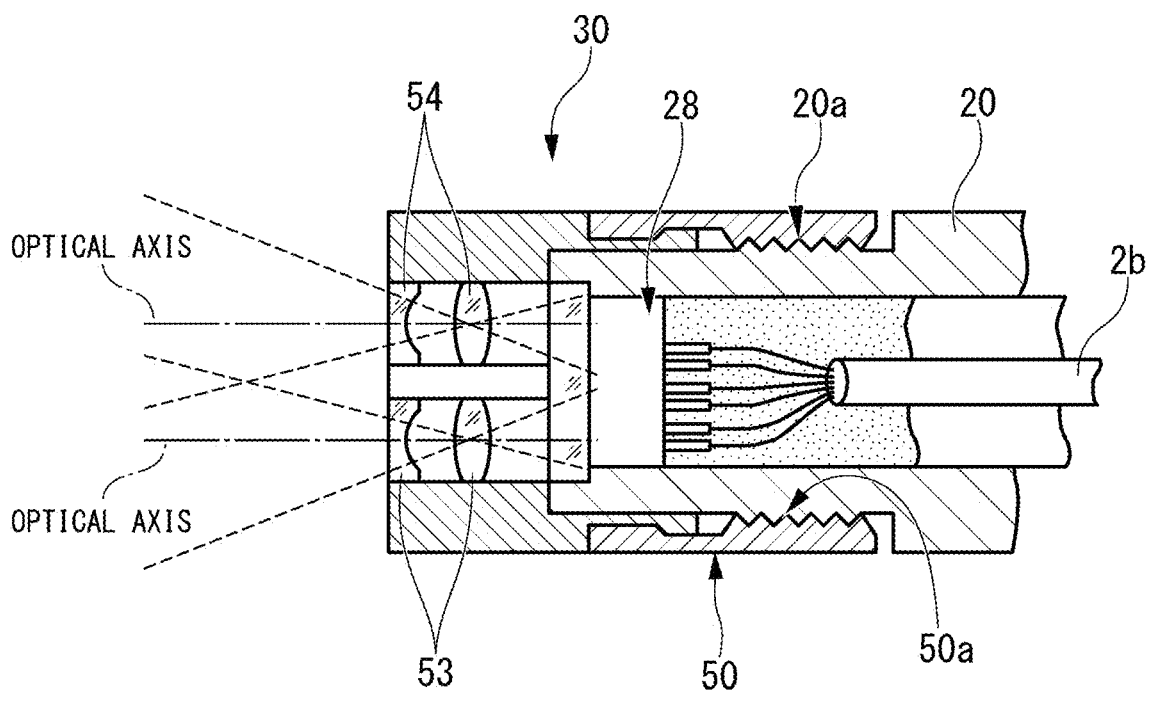
FIG. 33 is a cross-sectional view of the distal end of the insertion unit and the stereo optical adaptor in the endoscope device according to the third embodiment of the present invention.

The endoscope device 1 uses a stereo optical adaptor 30 shown in FIG. 32 and FIG. 33. FIG. 32 and FIG. 33 show a configuration of the distal end 20 of the insertion unit 2 and the stereo optical adaptor 30. FIG. 32 shows an external appearance of the distal end 20 and the stereo optical adaptor 30. FIG. 33 shows a cross-section of the distal end 20 and the stereo optical adaptor 30. A first illumination optical system 51, a second illumination optical system 52, a first objective optical system 53, and a second objective optical system 54 are disposed in the distal end of the stereo optical adaptor 30. A cross-section passing through the first objective optical system 53 and the second objective optical system 54 is shown in FIG. 33.

The stereo optical adaptor 30 is mounted on the distal end 20 of the insertion unit 2. The stereo optical adaptor 30 includes a fixed ring 50 on which a female screw 50a is formed. A male screw 20a is formed on the distal end 20 of the insertion unit 2. The stereo optical adaptor 30 is screwed together with the male screw 20a by using the female screw 50a and is fixed on the distal end 20.

The imaging device 28 is disposed in the distal end 20. The first objective optical system 53 and the second objective optical system 54 form two optical images on the imaging device 28. The imaging device 28 converts the two optical images into an imaging signal. A signal line 2b is connected to the imaging device 28. The imaging signal is provided to the CCU 9 via the signal line 2b and the endoscope unit 8. The CCU 9 converts the imaging signal into a video signal and provides the video signal to the video-signal-processing circuit 12.

The first objective optical system 53 forms a first optical image of a subject seen from a first viewpoint. The second objective optical system 54 forms a second optical image of the subject seen from a second viewpoint different from the first viewpoint. The imaging device 28 includes an effective region on which the first optical image and the second optical image are formed. For example, the first optical image is formed on the left region in the effective region, and the second optical image is formed on the right region in the effective region.

The imaging device 28 forms a stereo image corresponding to the first optical image and the second optical image. The stereo image includes a pair of two images. In other words, the stereo image includes an image of the subject seen from the first viewpoint and an image of the subject seen from the second viewpoint.

Figure 34:
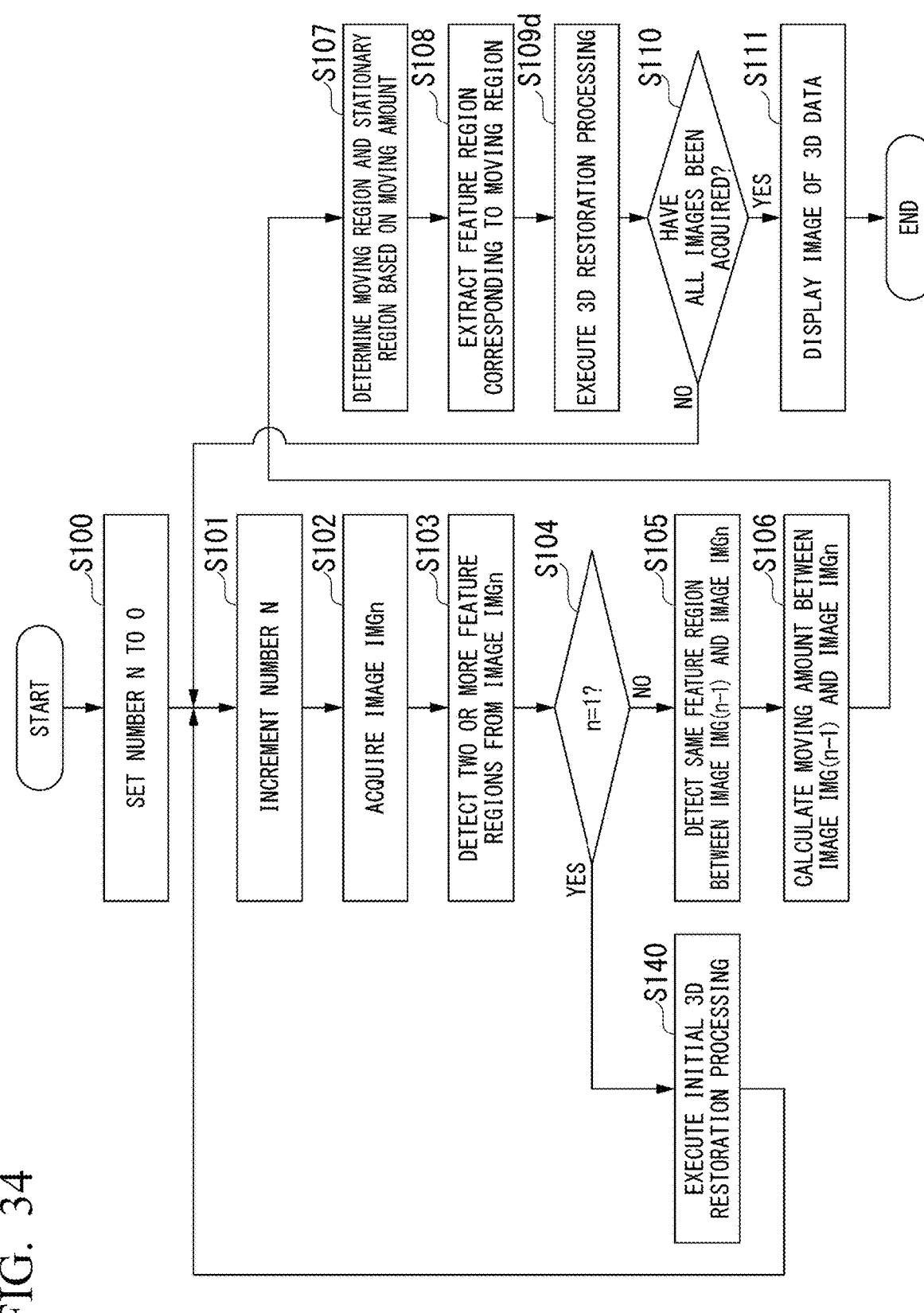
FIG. 34 is a flow chart showing a procedure of 3D data generation processing in the third embodiment of the present invention.

Processing executed by the endoscope device 1 will be described by using FIG. 34. FIG. 34 shows a procedure of 3D data generation processing executed by the endoscope device 1. The same processing as that shown in FIG. 7 will not be described.

When the control unit 180 determines that the number n is 1 in Step S104, the 3D restoration unit 184 executes initial 3D restoration processing (Step S140). After Step S140, Step S101 is executed. Hereinafter, details of Step S140 will be described.

Figure 35:
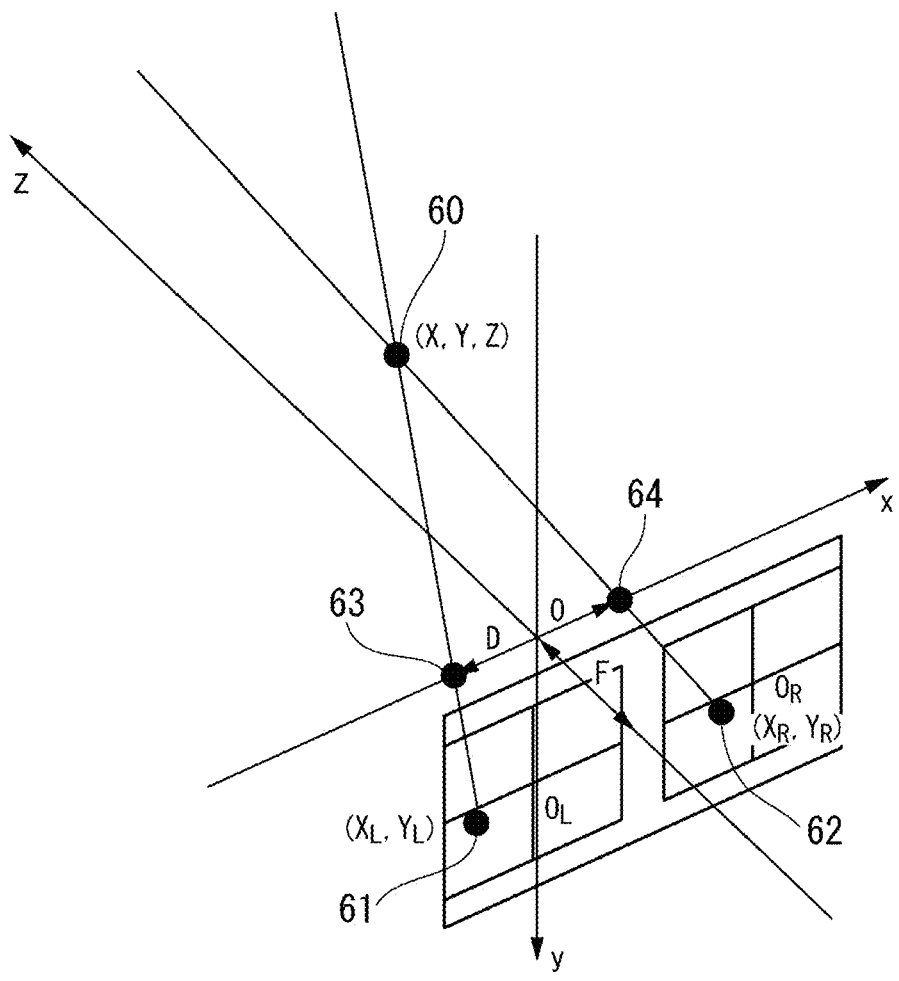
FIG. 35 is a diagram showing a method of calculating three-dimensional coordinates of a point of interest in the third embodiment of the present invention.

A method of calculating three-dimensional coordinates (3D coordinates) of a point of interest in stereo measurement will be described by referring to FIG. 35. The center of a line segment connecting a left optical center (first optical center 63) and a right optical center (second optical center 64) is defined as an origin O. In addition, an x-axis, a y-axis, and a z-axis shown in FIG. 35 are defined.

An image including a subject image is used. The subject image is obtained via a left optical system and a right optical system. As the following Expressions (4) to (6) show, the 3D coordinates (X, Y, Z) of a point of interest 60 are calculated by using a principle of triangulation. The two-dimensional coordinates (2D coordinates) of a point of interest 61 and the 2D coordinates of a point of interest 62 are $(X_L, Y_L)$ and $(X_R, Y_R)$, respectively. The point of interest 61 is on a left image surface on which distortion correction is performed. The point of interest 62 is on a right image surface on which the distortion correction is performed.

The origin of the point of interest 61 is an intersection point $O_L$, and the origin of the point of interest 62 is an intersection point $O_R$. The intersection point $O_L$ is at a position at which the optical axis of the left optical system and the image surface intersect each other. The intersection point $O_R$ is at a position at which the optical axis of the right optical system and the image surface intersect each other. The distance between the first optical center 63 and the second optical center 64 is D. A parameter F indicates a focal length. A parameter t is expressed as $D/(X_R-X_L)$.

$$X = t \times X_R + D/2 \quad (4)$$

$$Y = -t \times Y_R \quad (5)$$

$$Z = t \times F \quad (6)$$

In a case in which the coordinates of each of the points 61 and 62 of interest are determined as described above, the CPU 18 can calculate the 3D coordinates of the point of interest 60 by using the parameter D and the parameter F. The parameter D and the parameter F are calculated at the time of factory shipment of the stereo optical adaptor 30. Alternatively, the parameter D and the parameter F are calculated in a process such as setting-up of the endoscope device 1 before an inspection is performed. The 3D restoration unit 184 can restore a 3D shape of a subject by executing the above-described processing for all pixels of a stereo image.

After Step S108, the 3D restoration unit 184 executes the 3D restoration processing by using the feature region corresponding to the moving region (Step S109d). After Step S109d, Step S110 is executed.

The 3D restoration unit 184 uses a stereo image acquired by the imaging device 28 in Step S109d. The 3D restoration processing in Step S109d is similar to that shown in FIG. 13.

When the stereo optical adaptor 30 is mounted on the distal end 20, the 3D restoration unit 184 can use a pair of a left image and a right image included in one stereo image in addition to two or more stereo images acquired at different time points.

When a single-eye optical adaptor is mounted on the distal end 20 in the first embodiment, the 3D restoration unit 184 uses a first image and a second image acquired at, for example, different time points and executes the 3D restoration processing by following epipolar constraint of the images.

On the other hand, when the stereo optical adaptor 30 is mounted on the distal end 20 in the third embodiment, the 3D restoration unit 184 uses a first stereo image acquired at a first time point and a second stereo image acquired at a second time point and executes the 3D restoration processing by following the epipolar constraint of the stereo images. When the stereo optical adaptor 30 is mounted on the distal end 20, the epipolar constraint with respect to a stereo image is defined in accordance with a known external parameter. The external parameter indicates a positional relationship between two images that constitute a stereo image. The external parameter is calculated at the time of factory shipment. Alternatively, the external parameter is calculated in a process such as setting-up of the endoscope device 1 before an inspection is performed.

Each stereo image includes a left image and a right image. Accordingly, the 3D restoration unit 184 can execute the 3D restoration processing by following the epipolar constraint of, for example, the following four pairs.

A first pair: a pair of a left image of a first stereo image and a left image of a second stereo image.

A second pair: a pair of a right image of the first stereo image and a right image of the second stereo image.

A third pair: a pair of the left image of the first stereo image and the right image of the first stereo image.

A fourth pair: a pair of the left image of the second stereo image and the right image of the second stereo image.

Since the above-described four pairs are used in Step S109a and Step S109b shown in FIG. 13, the accuracy of the 3D restoration processing is improved and the stability of a restored 3D shape is improved.

For example, camera calibration is performed at the time of factory shipment. Therefore, the positions and the postures of the camera when the camera acquires the above-described third and fourth pairs are calculated in advance. Accordingly, the 3D restoration unit 184 can restore a 3D shape of a subject with high accuracy.

In a case in which the stereo optical adaptor 30 is used, the camera calibration has already been performed. Therefore, the 3D restoration unit 184 can restore a 3D shape having an absolute scale. The size of the 3D shape is the same as that of an actual subject. Therefore, Step S109c shown in FIG. 13 can be omitted.

In the third embodiment, the endoscope device 1 acquires a stereo image by using the stereo optical adaptor 30 and uses the stereo image in the 3D restoration processing. Therefore, the endoscope device 1 can stably execute the 3D restoration processing with high accuracy, compared to the first embodiment in which a single-eye optical adaptor is used. The third embodiment can be applied to the second embodiment in which the endoscope device 1 simultaneously generates an image and 3D data.

Fourth Embodiment

A fourth embodiment of the present invention will be described. In the fourth embodiment, the endoscope device 1 shown in FIG. 1 and FIG. 2 is used. In addition, the stereo optical adaptor 30 shown in FIG. 32 and FIG. 33 is used in the fourth embodiment.

The first objective optical system 53 and the second objective optical system 54 form two optical images on the effective region of the imaging device 28 at the same time in the third embodiment. On the other hand, one of the first objective optical system 53 and the second objective optical system 54 forms an optical image on the entire effective region, and then the other of the first objective optical system 53 and the second objective optical system 54 forms an optical image on the entire effective region in the fourth embodiment. The endoscope device 1 acquires a left image and a right image in a time-division manner in the fourth embodiment.

Figure 36:
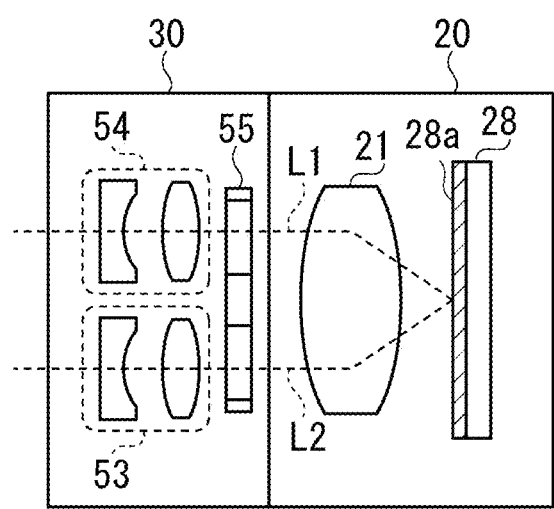
FIG. 36 is a block diagram showing a configuration of a distal end of an insertion unit and a stereo optical adaptor in an endoscope device according to a fourth embodiment of the present invention.

FIG. 36 shows a configuration of the distal end 20 of the insertion unit 2 and the stereo optical adaptor 30. The lens 21 and the imaging device 28 are disposed in the distal end 20. The imaging device 28 includes an effective region 28a. The stereo optical adaptor 30 includes a first objective optical system 53, a second objective optical system 54, and an optical-path-setting unit 55.

For example, the first objective optical system 53 and the second objective optical system 54 are a combination of a concave lens and a convex lens. The second objective optical system 54 is disposed such that the second objective optical system 54 has parallax for the first objective optical system 53. In other words, the first objective optical system 53 and the second objective optical system 54 are separated from each other in a parallax direction. The parallax direction is a direction of a straight line passing through the optical center of the first objective optical system 53 and the optical center of the second objective optical system 54. Light incident on the first objective optical system 53 passes through a first optical path L1. Light incident on the second objective optical system 54 passes through a second optical path L2 different from the first optical path L1. The first objective optical system 53 forms a first optical image of a subject, and the second objective optical system 54 forms a second optical image of the subject.

The optical-path-setting unit 55 switches optical paths between the first optical path L1 and the second optical path L2 such that either the first optical image or the second optical image is formed on the effective region 28a of the imaging device 28. By doing this, the optical-path-setting unit 55 sets either the first optical path L1 or the second optical path L2 as an imaging optical path. The optical-path-setting unit 55 is configured to transmit light passing through either the first optical path L1 or the second optical path L2 and is configured to block light passing through the other.

For example, the optical-path-setting unit 55 includes a shutter to be inserted into only one of the first optical path L1 and the second optical path L2. When the optical-path-setting unit 55 transmits light of the first optical path L1, the shutter is inserted into the second optical path L2 and light of the second optical path L2 is blocked. When the optical-path-setting unit 55 transmits light of the second optical path L2, the shutter is inserted into the first optical path L1 and light of the first optical path L1 is blocked. The control unit 180 controls the operation of the optical-path-setting unit 55. The lens 21 forms a subject image on the effective region 28a of the imaging device 28 based on either the light passing through the first optical path L1 or the light passing through the second optical path L2.

The imaging device 28 includes the effective region 28a on which the first optical image of the light passing through the first optical path L1 and the second optical image of the light passing through the second optical path L2 are formed. The imaging device 28 transforms the first optical image into a left image at a first timing and transforms the second optical image into a right image at a second timing different from the first timing. The left image and the right image constitute a stereo image.

Figure 37:
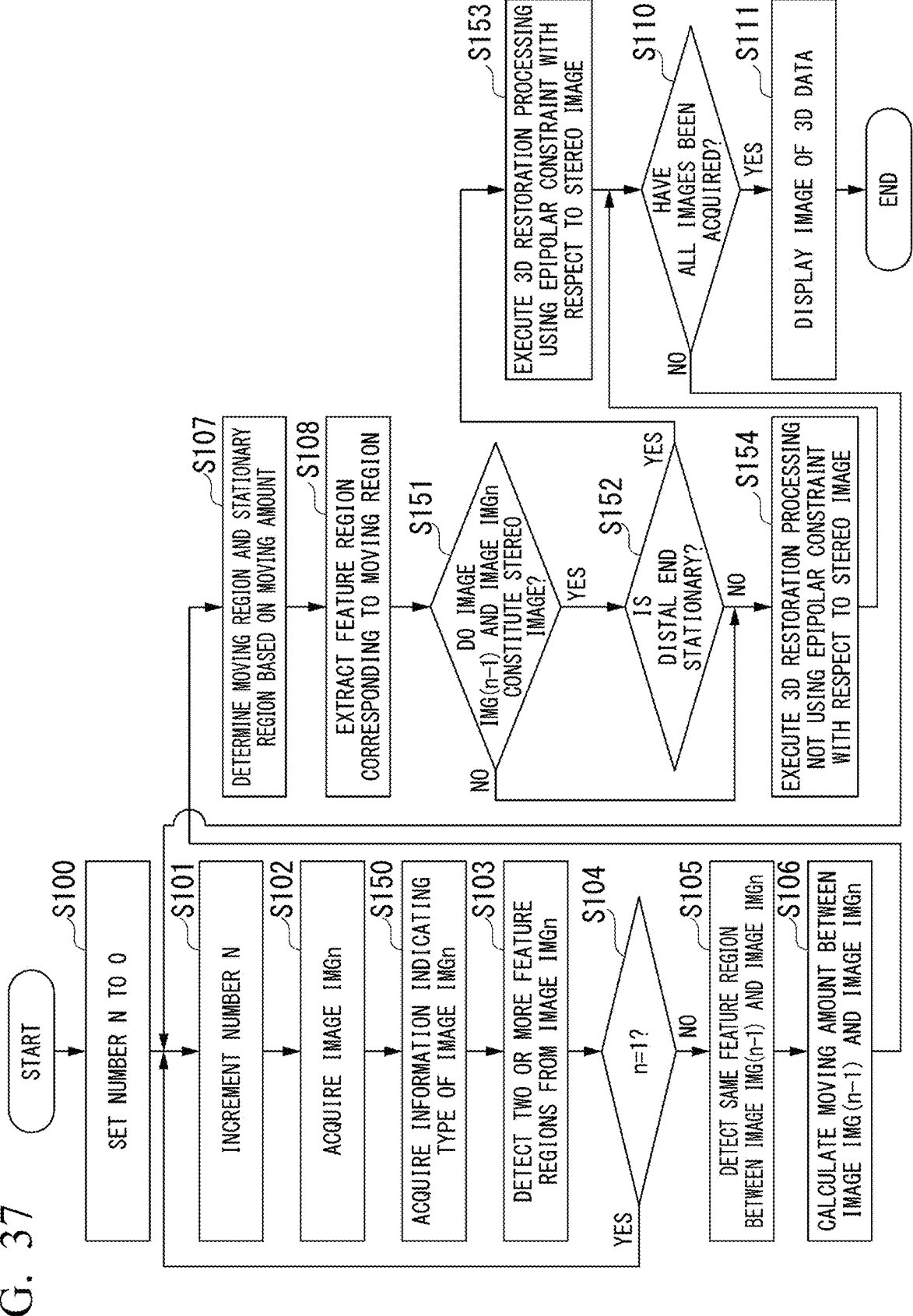
FIG. 37 is a flow chart showing a procedure of 3D data generation processing in the fourth embodiment of the present invention.

Processing executed by the endoscope device 1 will be described by using FIG. 37. FIG. 37 shows a procedure of 3D data generation processing executed by the endoscope device 1. The same processing as that shown in FIG. 7 will not be described.

The image acquisition unit 181 acquires the image IMGn from the RAM 14 in Step S102. The image IMGn is a left image or a right image.

After Step S102, the control unit 180 acquires information indicating the type of the image IMGn acquired in Step S102 from the RAM 14 (Step S150). The information indicates the left image or the right image. The control unit 180 generates the information indicating the type of the image IMGn based on a control signal used for setting the imaging optical path. Alternatively, the control unit 180 generates the information indicating the type of the image IMGn based on a result of image processing that uses the parallax between the first objective optical system 53 and the second objective optical system 54. The information indicating the type of the image IMGn is associated with the number n and is stored on the RAM 14 in advance.

After Step S108, the 3D restoration unit 184 determines whether the image IMG(n−1) and the image IMGn constitute a stereo image (Step S151).

In the following descriptions, the left image is expressed as IL, and the right image is expressed as IR. For example, the left image and the right image are alternately acquired as follows.

$I_L$ (n=1), $I_R$ (n=2), $I_L$ (n=3), $I_R$ (n=4), . . . .

When the number n is 5, the image IMG(n−1) is the right image IR and the image IMGn is the left image IL. At this time, the 3D restoration unit 184 determines that the image IMG(n−1) and the image IMGn constitute a stereo image.

When the 3D restoration unit 184 determines that the image IMG(n−1) and the image IMGn constitute a stereo image in Step S151, the 3D restoration unit 184 determines whether the distal end 20 is stationary (Step S152).

When the distal end 20 is moving, the entire region seen in the image IMG(n−1) or the image IMGn moves. Therefore, the region determination unit 183 determines that all the small regions of the image IMGn are moving regions in Step S107. In this case, the 3D restoration unit 184 determines that the distal end 20 is not stationary in Step S152.

When the distal end 20 is stationary, the region determination unit 183 determines that at least some of the small regions of the image IMGn are stationary regions in Step S107. In this case, the 3D restoration unit 184 determines that the distal end 20 is stationary in Step S152.

When the 3D restoration unit 184 determines that the distal end 20 is stationary in Step S152, the 3D restoration unit 184 uses a stereo image and executes the 3D restoration processing by following the epipolar constraint. This processing is similar to Step S140. At this time, the 3D restoration unit 184 uses the feature region corresponding to the moving region (Step S153). After Step S153, Step S110 is executed.

When the 3D restoration unit 184 determines that the image IMG(n−1) and the image IMGn do not constitute a stereo image in Step S151 or determines that the distal end 20 is not stationary in Step S152, the 3D restoration unit 184 executes the 3D restoration processing without following the epipolar constraint. At this time, the 3D restoration unit 184 executes the 3D restoration processing by using the feature region corresponding to the moving region (Step S154). After Step S154, Step S110 is executed.

Step S154 is the same as Step S109 shown in FIG. 7. The type of images used in the 3D restoration processing in Step S154 is different from that of images used in the 3D restoration processing in Step S109.

In the first embodiment, the imaging device 28 generates a single-eye image based on an optical image formed by a single-eye optical adaptor. The 3D restoration unit 184 executes the 3D restoration processing in Step S109 by using single-eye images regardless of the number n.

In the fourth embodiment, the 3D restoration unit 184 may execute the 3D restoration processing by using only left images at all times. When the image IMGn is a right image, the 3D restoration unit 184 may skip the 3D restoration processing. Alternatively, the 3D restoration unit 184 may execute the 3D restoration processing by using only right images at all times. When the image IMGn is a left image, the 3D restoration unit 184 may skip the 3D restoration processing.

The 3D restoration unit 184 may switch images used in the 3D restoration processing in accordance with the type of the image IMGn. In other words, the 3D restoration unit 184 may execute the 3D restoration processing by using only left images and then may execute the 3D restoration processing by using only right images. The 3D restoration unit 184 generates a first 3D shape in the 3D restoration processing that uses only left images. The 3D restoration unit 184 generates a second 3D shape in the 3D restoration processing that uses only right images. When the consistency between the first 3D shape and the second 3D shape is secured, the 3D restoration unit 184 may integrate the first 3D shape and the second 3D shape. For example, when Step S153 is executed, the consistency between the first 3D shape and the second 3D shape is secured.

It is predicted that the optical-path-setting unit 55 has difficulty in switching imaging optical paths by following a first pattern described below in terms of heat generation and the durability of the shutter when the endoscope device 1 is actually used. The first pattern indicates the type of images to be generated. According to the first pattern, images are switched for each frame, and a left image $I_L$ and a right image $I_R$ are alternately generated.

A first pattern: $I_L$, $I_R$, $I_L$, $I_R$, . . . .

Therefore, it is assumed that the optical-path-setting unit 55 switches imaging optical paths by following a second pattern described below. The second pattern indicates the type of images to be generated. According to the second pattern, images are switched only at a specific timing.

A second pattern: $I_L$, $I_L$, $I_L$, . . . , $I_L$, $I_R$, $I_L$, $I_R$, $I_L$, $I_L$, $I_L$, . . . .

For example, a user inputs a switching instruction to switch imaging optical paths into the endoscope device 1 by operating the operation unit 4 or a touch panel. When the user has input the switching instruction into the endoscope device 1, the control unit 180 causes the optical-path-setting unit 55 to switch imaging optical paths. Alternatively, the control unit 180 detects movement of the distal end 20 by using only a left or right image. When the movement of the distal end 20 has not been detected, the control unit 180 causes the optical-path-setting unit 55 to switch imaging optical paths.

When the user has input the switching instruction into the endoscope device 1 or the control unit 180 has not detected the movement of the distal end 20, imaging optical paths are switched. On the other hand, when the user has not input the switching instruction into the endoscope device 1 or the control unit 180 has detected the movement of the distal end 20, the imaging device 28 generates only a left or right image. In a case in which the second pattern is used, Step S154 is basically executed. In such a case, Step S153 is executed, for example, at a timing at which the user inputs the switching instruction into the endoscope device 1.

The 3D restoration unit 184 may use the first 3D shape and the second 3D shape described above to enhance the accuracy of a 3D shape by following the epipolar constraint at a timing at which Step S153 is executed. Alternatively, the 3D restoration unit 184 may use the first 3D shape and the second 3D shape described above to finalize or update the scale of a subject by following the epipolar constraint at a timing at which Step S153 is executed.

Figure 38:
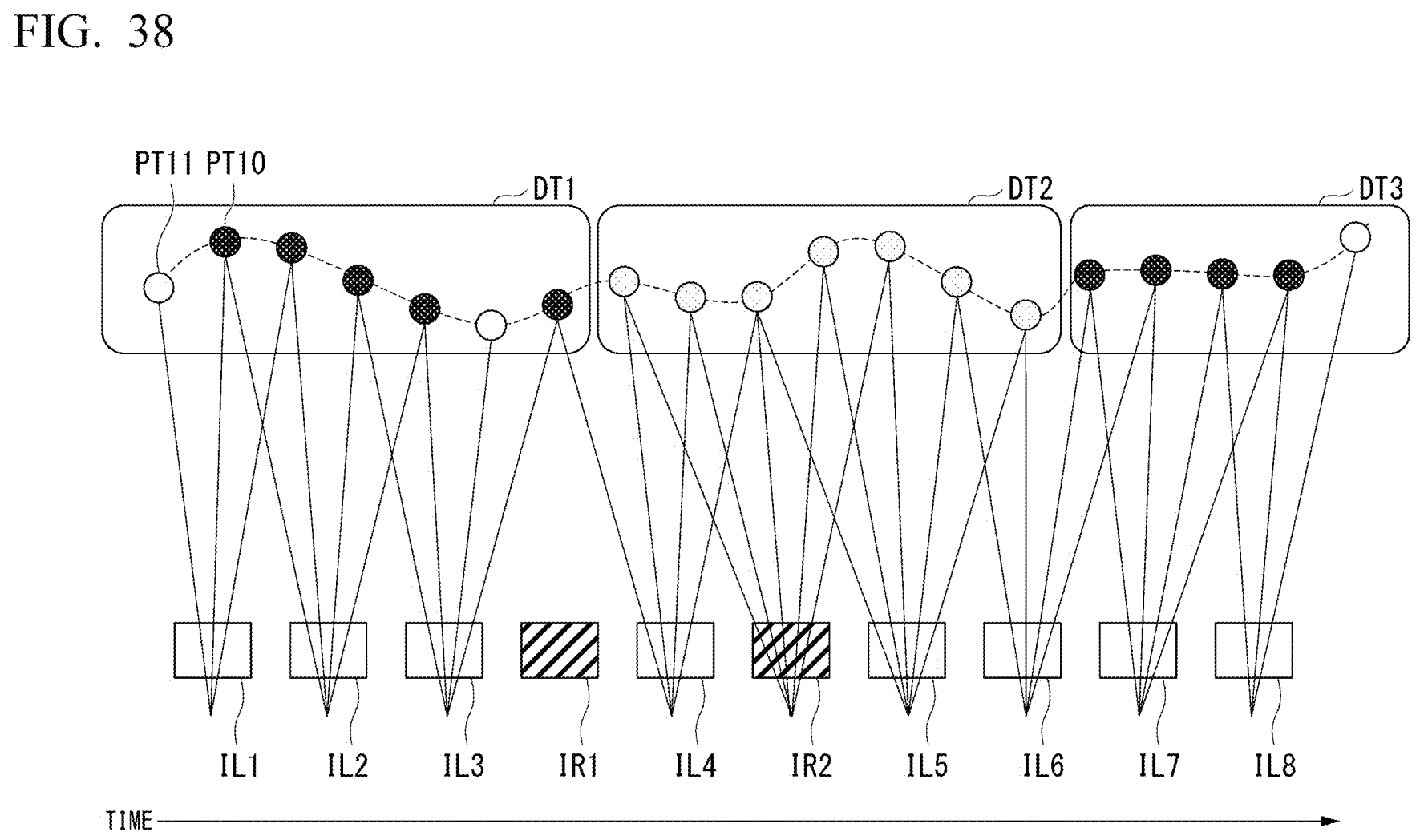

Details of the 3D restoration processing in the fourth embodiment will be described by using FIG. 38. Left images IL1 to IL8 and right images IR1 and IR2 are generated at different time points. These images constitute stereo images. Time passes from the left to the right in FIG. 38.

The 3D restoration unit 184 executes the 3D restoration processing and generates 3D data DT1, 3D data DT2, and 3D data DT3. Points included in the 3D data and images used to generate the points are associated by lines. For example, a left image IL1 and a left image IL2 are used to generate a point PT10. A point PT11 is seen only in the left image IL1, and 3D data at the point PT11 are lost.

It is assumed that the distal end 20 moves between a first timing and a second timing and moves between the second timing and a third timing. The imaging device 28 generates a left image IL3 at the first timing, generates a right image IR1 at the second timing, and generates a left image IL4 at the third timing.

It is assumed that the distal end 20 does not move between the third timing and a fourth timing and does not move between the fourth timing and a fifth timing. The imaging device 28 generates the left image IL4 at the third timing, generates a right image IR2 at the fourth timing, and generates a left image IL5 at the fifth timing.

While the left images IL1 to IL3 are generated, the imaging optical path is set to the first optical path L1. The imaging device 28 does not generate a right image that constitutes a stereo image with the left image IL1, IL2, or IL3. Therefore, the 3D restoration unit 184 executes Step S154.

After the left image IL3 is generated, the imaging optical path is set to the second optical path L2 and the imaging device 28 generates a right image IR1. The distal end 20 moves between a timing at which the imaging device 28 generates the left image IL3 and a timing at which the imaging device 28 generates the right image IR1. In this case, the right image IR1 is determined to be inappropriate for the 3D restoration processing and is not used in the 3D restoration processing. Processing of determining whether the right image IR1 is appropriate for the 3D restoration processing is not shown in FIG. 37.

After the right image IR1 is generated, the imaging optical path is set to the first optical path L1 and the imaging device 28 generates the left image IL4. The 3D restoration unit 184 executes Step S152 and determines whether the distal end 20 is stationary. The 3D restoration unit 184 determines that the distal end 20 is moving and executes Step S154. At this time, data of the right end in the 3D data DT1 shown in FIG. 38 and data of the left end in the 3D data DT2 shown in FIG. 38 are connected.

After the left image IL4 is generated, the imaging optical path is set to the second optical path L2 and the imaging device 28 generates a right image IR2. The distal end 20 does not move between a timing at which the imaging device 28 generates the left image IL4 and a timing at which the imaging device 28 generates the right image IR2. In this case, the 3D restoration unit 184 executes Step S153. The 3D restoration processing that uses the epipolar constraint is executed, and the scale of the already generated 3D data is uniquely determined.

After the right image IR2 is generated, the imaging optical path is set to the first optical path L1 and the imaging device 28 generates the left image IL5. The 3D restoration unit 184 executes Step S152 and determines whether the distal end 20 is stationary. The 3D restoration unit 184 determines that the distal end 20 is not moving and executes Step S153.

Thereafter, left images IL6 to IL8 are generated. The imaging device 28 does not generate a right image that constitutes a stereo image with the left image IL6, IL7, or IL8. Therefore, the 3D restoration unit 184 executes Step S154. At this time, the 3D data DT2 and the 3D data DT3 shown in FIG. 38 are connected.

In the fourth embodiment, the endoscope device 1 acquires a left image and a right image in a time-division manner by using the stereo optical adaptor 30 and uses the left image and the right image in the 3D restoration processing. Therefore, the endoscope device 1 can stably execute the 3D restoration processing with high accuracy, compared to the first embodiment in which a single-eye optical adaptor is used.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An inspection state notification method of notifying a user of a state of an inspection inside a turbine by using a processor, the method comprising:

acquiring two or more images of a component inside the turbine, wherein the component includes a first object capable of moving inside the turbine and a second object that is stationary inside the turbine, wherein the two or more images are generated by an imaging apparatus including a tubular insertion unit that acquires an optical image inside the turbine, wherein the insertion unit is inserted into the turbine through a hole formed in the turbine, wherein a moving direction of the insertion unit when the insertion unit is inserted into the turbine is different from a moving direction of the first object, and wherein a relative position of the first object to the insertion unit is different between timings at which the imaging apparatus generates images while the first object moves;

detecting two or more correspondence regions that are the same regions of the component in at least two images included in the two or more images;

determining whether at least part of a region of each of the two or more images is a change region or a non-change region, wherein the change region is a region of the component of which coordinates in an image generated by the imaging apparatus change, and wherein the non-change region is a region of the component of which coordinates in an image generated by the imaging apparatus do not change; and executing processing of notifying the user of inspection state information based on one of the non-change region or the change region.

2. The inspection state notification method according to claim 1, wherein, after the two or more correspondence regions are detected, determination as to whether the at least part of the region is the change region or the non-change region is executed.

3. The inspection state notification method according to claim 1, wherein the first object includes a rotor blade, and wherein the second object includes a stator blade or a shroud.

4. The inspection state notification method according to claim 1, wherein part of the first object is concealed by the second object in the two or more images.

5. The inspection state notification method according to claim 4, wherein the second object includes an object that conceals part of the first object in the two or more images, and wherein the second object includes an object, part of which is concealed by the first object in the two or more images.

6. The inspection state notification method according to claim 1, wherein the imaging apparatus generates the two or more images at two or more different timings, and wherein determination as to whether the at least part of the region is the change region or the non-change region is executed based on a moving amount of each of the correspondence regions between at least two images included in the two or more images.

7. The inspection state notification method according to claim 1, wherein determination as to whether the at least part of the region is the change region or the non-change region is executed based on a difference of a pixel value between at least two images included in the two or more images.

8. The inspection state notification method according to claim 1, wherein determination as to whether the at least part of the region is the change region or the non-change region is executed by determining a subject seen in one image included in the two or more images.

9. The inspection state notification method according to claim 1, further comprising:

determining a position of the insertion unit inside the turbine by analyzing an image generated by the imaging apparatus, and wherein executing the processing of notifying the user of the inspection state information includes notifying the user of information indicating a change of the position of the insertion unit when the position has changed.

10. The inspection state notification method according to claim 1, further comprising:

calculating an area of the non-change region in an image included in the two or more images; and wherein executing the processing of notifying the user of the inspection state information includes notifying the user of an alert when the area is larger than a predetermined value.

11. The inspection state notification method according to claim 1, wherein the method further comprises:

determining a region of the first object in an image generated by the imaging apparatus based on the change region; and determining whether the first object has rotated once inside the turbine when the region of the first object that has been already observed is determined, and wherein executing the processing of notifying the user of the inspection state information includes notifying the user of information indicating that the first object has rotated once inside the turbine when it is determined that the first object has rotated once inside the turbine.

12. The inspection state notification method according to claim 1, wherein the first object rotates inside the turbine due to a driving force generated by a driving device, wherein detection of the two or more correspondence regions, determination as to whether the at least part of the region is the change region or the non-change region, and generation of the three-dimensional data are repeatedly executed while the first object rotates, and wherein the generation of the three-dimensional data is stopped and the detection of the two or more correspondence regions and the determination as to whether the at least part of the region is the change region or the non-change region are continued when the rotation of the first object has been stopped.

13. The inspection state notification method according to claim 12, wherein the generation of the three-dimensional data is restarted when the first object starts to rotate again.

14. The inspection state notification method according to claim 12, further comprising determining a rotation state of the first object by using an image included in the two or more images.

15. The inspection state notification method according to claim 12, further comprising determining a rotation state of the first object by monitoring a state of the driving device.

16. The inspection state notification method according to claim 1, wherein the insertion unit is fixed inside the turbine.

17. The inspection state notification method according to claim 1, wherein the imaging apparatus is a borescope.

18. An inspection state notification system that notifies a user of a state of an inspection inside a turbine, the system comprising:

an imaging apparatus including a tubular insertion unit that acquires an optical image inside the turbine, wherein the imaging apparatus is configured to generate two or more images of a component inside the turbine, wherein the component includes a first object capable of moving inside the turbine and a second object that is stationary inside the turbine, wherein the insertion unit is inserted into the turbine through a hole formed in the turbine, wherein a moving direction of the insertion unit when the insertion unit is inserted into the turbine is different from a moving direction of the first object, and wherein a relative position of the first object to the insertion unit is different between timings at which the imaging apparatus generates images while the first object moves; and a three-dimensional data generation device including a processor comprising hardware, the processor being configured to:

acquire the two or more images;

detect two or more correspondence regions that are the same regions of the component in at least two images included in the two or more images;

determine whether at least part of a region of each of the two or more images is a change region or a non-change region, wherein the change region is a region of the component of which coordinates in an image generated by the imaging apparatus change, and wherein the non-change region is a region of the component of which coordinates in an image generated by the imaging apparatus do not change; and execute processing of notifying the user of inspection state information based on the non-change region or the change region.

19. A non-transitory computer-readable recording medium storing a program causing a computer to execute processing of notifying a user of a state of an inspection inside a turbine, the processing comprising:

acquiring two or more images of a component inside the turbine, wherein the component includes a first object capable of moving inside the turbine and a second object that is stationary inside the turbine, wherein the two or more images are generated by an imaging apparatus including a tubular insertion unit that acquires an optical image inside the turbine, wherein the insertion unit is inserted into the turbine through a hole formed in the turbine, wherein a moving direction of the insertion unit when the insertion unit is inserted into the turbine is different from a moving direction of the first object, and wherein a relative position of the first object to the insertion unit is different between timings at which the imaging apparatus generates images while the first object moves;

detecting two or more correspondence regions that are the same regions of the component in at least two images included in the two or more images;

determining whether at least part of a region of each of the two or more images is a change region or a non-change region, wherein the change region is a region of the component of which coordinates in an image generated by the imaging apparatus change, and wherein the non-change region is a region of the component of which coordinates in an image generated by the imaging apparatus do not change; and executing processing of notifying the user of inspection state information based on the non-change region or the change region.

* * * * *